(12) United States Patent
Yokokawa et al.

(10) Patent No.: US 11,765,004 B2
(45) Date of Patent: *Sep. 19, 2023

(54) TRANSMISSION DEVICE, RECEPTION DEVICE, AND COMMUNICATION SYSTEM

(71) Applicant: Sony Group Corporation, Tokyo (JP)

(72) Inventors: Takashi Yokokawa, Kanagawa (JP); Hironobu Konishi, Kanagawa (JP)

(73) Assignee: Sony Group Corporation, Tokyo (JP)

(*) Notice: Subject to any disclaimer, the term of this patent is extended or adjusted under 35 U.S.C. 154(b) by 44 days.

This patent is subject to a terminal disclaimer.

(21) Appl. No.: 17/507,154

(22) Filed: Oct. 21, 2021

(65) Prior Publication Data
US 2022/0060357 A1 Feb. 24, 2022

Related U.S. Application Data

(63) Continuation of application No. 15/523,768, filed as application No. PCT/JP2015/080516 on Oct. 29, 2015, now Pat. No. 11,233,680.

(30) Foreign Application Priority Data

Dec. 9, 2014 (JP) ................. 2014-249340

(51) Int. Cl.
H04L 25/49 (2006.01)
H04L 7/033 (2006.01)
H04L 25/02 (2006.01)

(52) U.S. Cl.
CPC .......... *H04L 25/4908* (2013.01); *H04L 7/033* (2013.01); *H04L 25/0272* (2013.01);
(Continued)

(58) Field of Classification Search
CPC .................................. H04L 25/4908
(Continued)

(56) References Cited

U.S. PATENT DOCUMENTS 11,233,680 B2 * 1/2022 Yokokawa .......... H04L 25/0272
2004/0105344 A1 6/2004 Davies et al.
(Continued)

FOREIGN PATENT DOCUMENTS

CN 1266560 A 9/2000
CN 101796747 A 8/2010
(Continued)

OTHER PUBLICATIONS

Extended European Search Report dated Jul. 19, 2018 for corresponding European Application No. 15868441.5.
(Continued)

Primary Examiner — Lihong Yu
(74) Attorney, Agent, or Firm — Michael Best & Friedrich LLP

(57) ABSTRACT

A transmission device of the disclosure includes: a generator unit that generates, on the basis of a control signal, a transmission symbol signal that indicates a sequence of transmission symbols; an output control unit that generates an output control signal on the basis of the transmission symbol signal; and a driver unit that generates, on the basis of the output control signal, a first output signal, a second output signal, and a third output signal. The generator unit generates the transmission symbol signal on the basis of the control signal, to allow the first output signal, the second output signal, and the third output signal to exchange signal patterns with one another.

15 Claims, 41 Drawing Sheets

(52) U.S. Cl.
CPC .......... *H04L 25/49* (2013.01); *H04L 25/4917* (2013.01); *H04L 25/4923* (2013.01); *H04L 25/0282* (2013.01); *H04L 25/0294* (2013.01); *H04L 25/0298* (2013.01)

(58) Field of Classification Search
USPC ......................................................... 375/295
See application file for complete search history.

(56) References Cited

U.S. PATENT DOCUMENTS

| | | |
|---|---|---|
| 2014/0003543 A1 | 1/2014 | Wiley et al. |
| 2014/0112401 A1 | 4/2014 | Wiley et al. |
| 2014/0222674 A1 | 8/2014 | Fox et al. |

FOREIGN PATENT DOCUMENTS

| | | |
|---|---|---|
| CN | 101848047 A | 9/2010 |
| JP | 2010-520715 A | 6/2010 |
| JP | 2011-517159 A | 5/2011 |
| JP | 2013-183242 A | 9/2013 |

OTHER PUBLICATIONS

Chinese Office Action dated Nov. 27, 2019 for corresponding Chinese Application No. 201580065373X.

\* cited by examiner

[ FIG. 1 ]
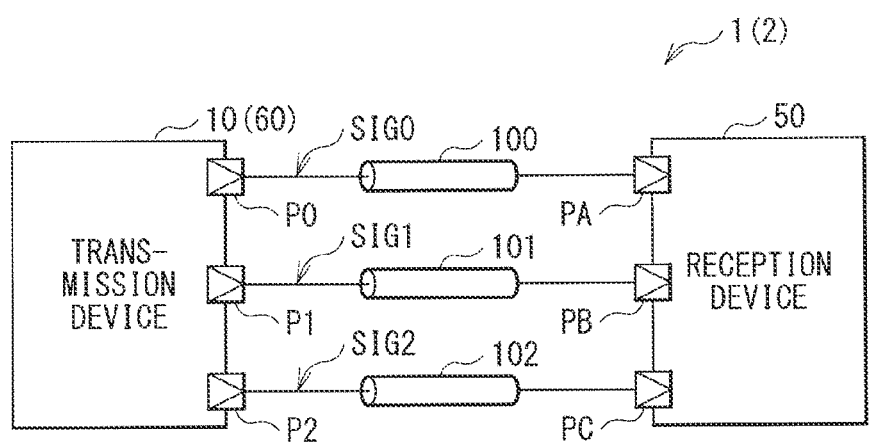
[ FIG. 2 ]
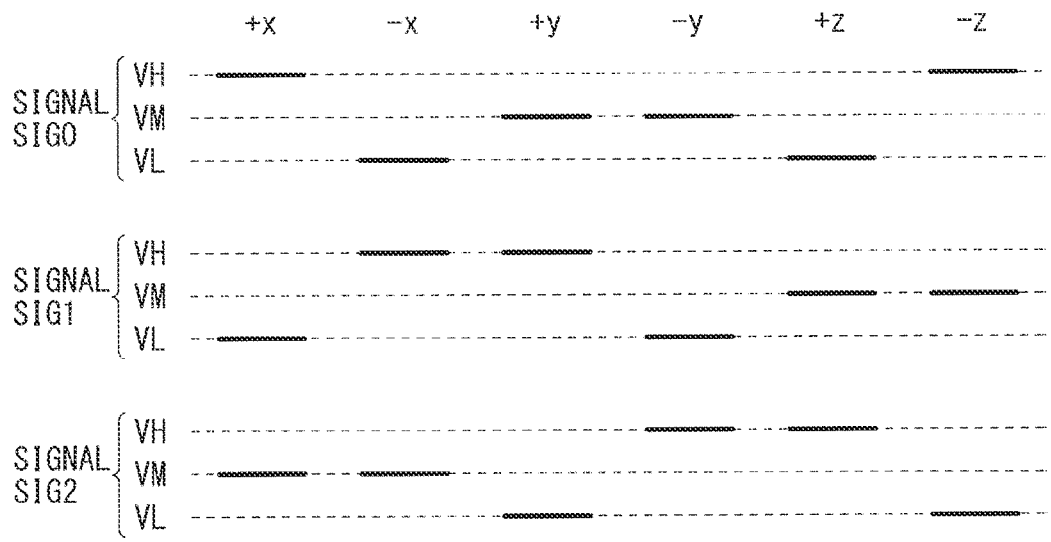

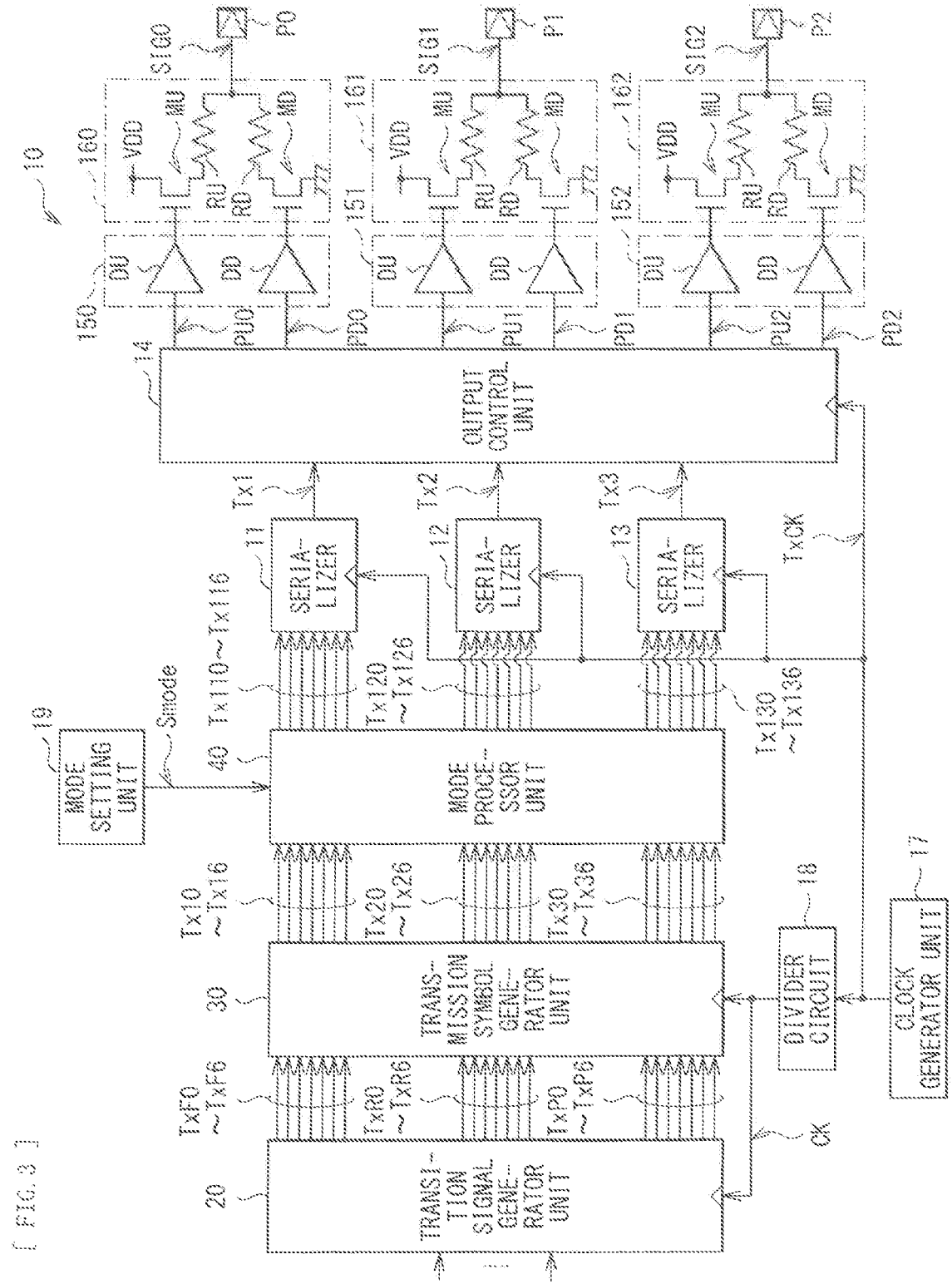
[FIG. 3]

[ FIG. 4 ]
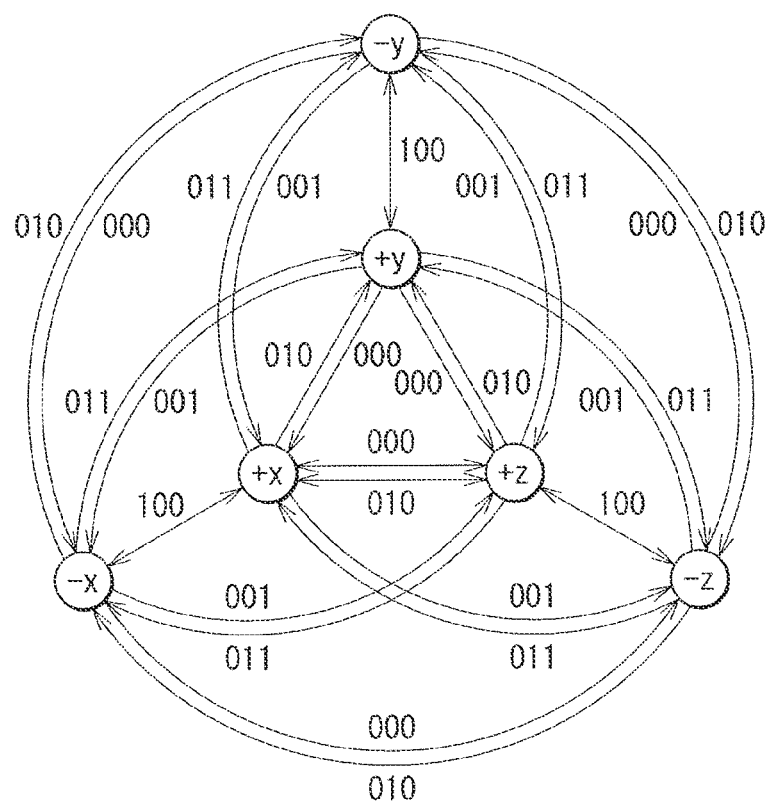

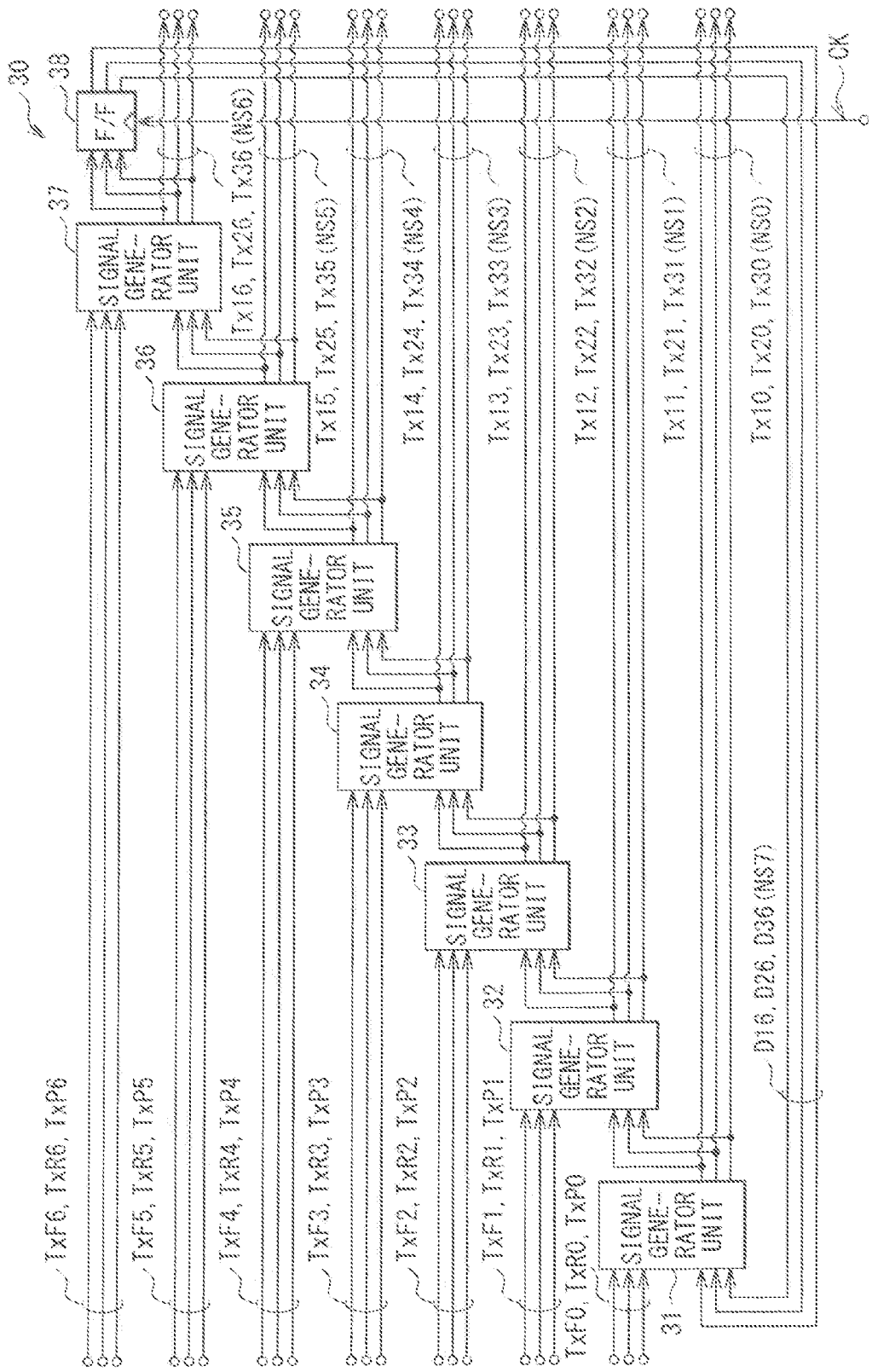

[FIG. 6]
| SYMBOL | SYMBOL SIGNAL Tx10 | SYMBOL SIGNAL Tx20 | SYMBOL SIGNAL Tx30 |
|---|---|---|---|
| +x | 1 | 0 | 0 |
| -x | 0 | 1 | 1 |
| +y | 0 | 1 | 0 |
| -y | 1 | 0 | 1 |
| +z | 0 | 0 | 1 |
| -z | 1 | 1 | 0 |
[FIG. 7A]
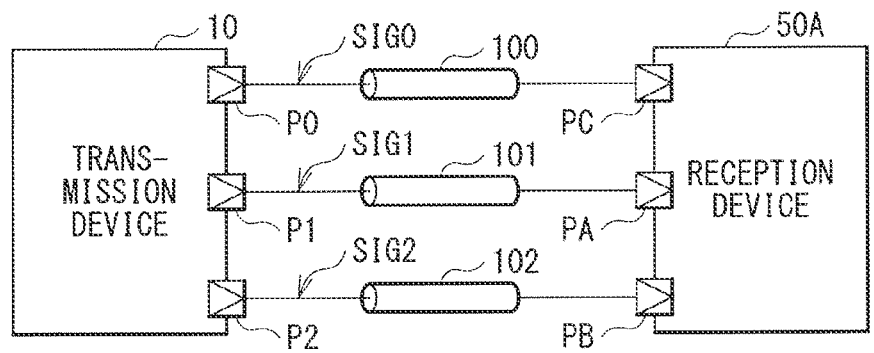
[FIG. 7B]
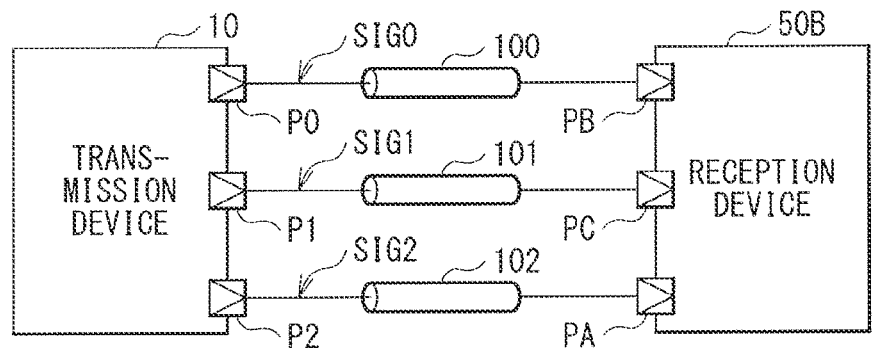

[FIG. 7C]
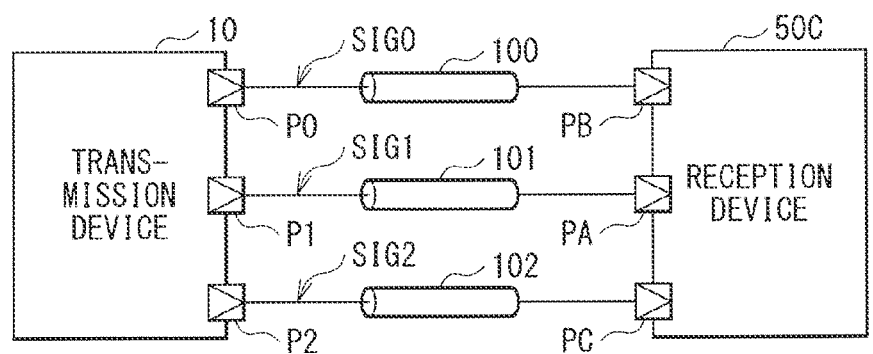
[FIG. 7D]
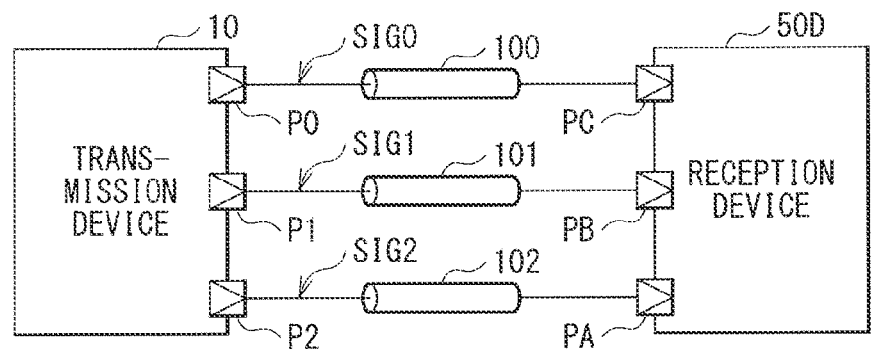
[FIG. 7E]
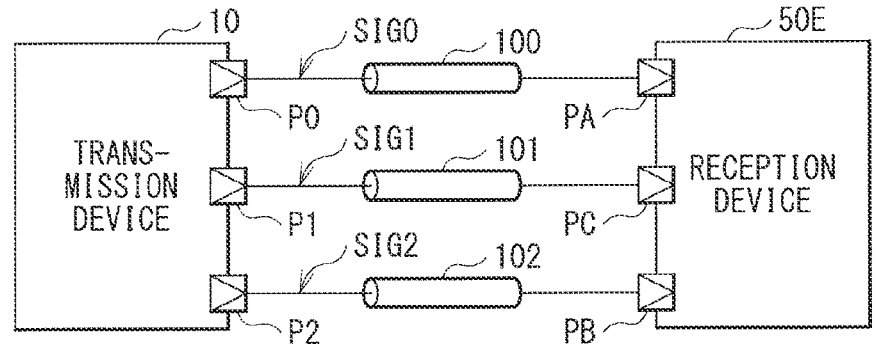

[FIG. 8]
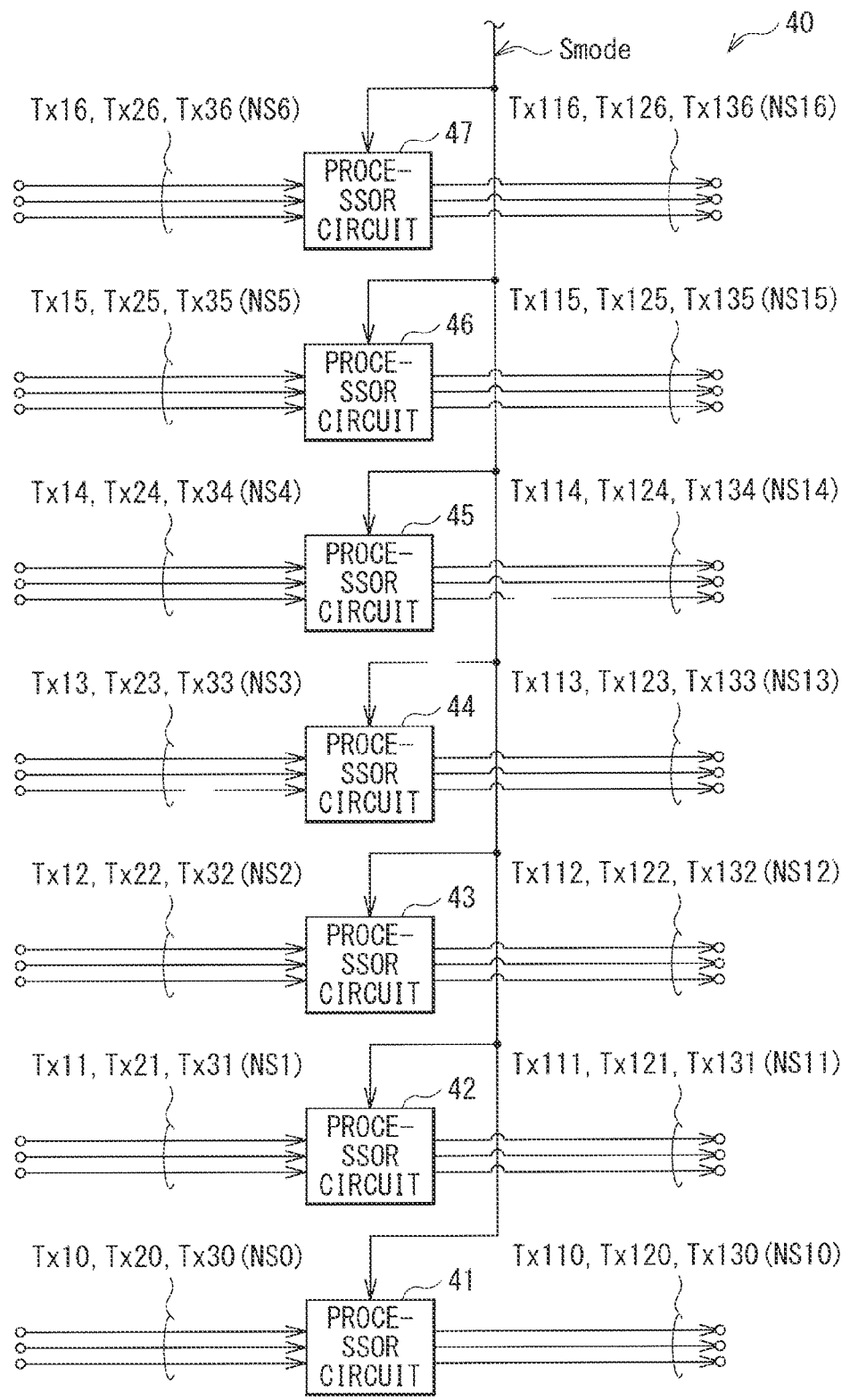

[ FIG. 9 ]
| OPERATION MODE | SYMBOL SIGNAL Tx110 | SYMBOL SIGNAL Tx120 | SYMBOL SIGNAL Tx130 |
|---|---|---|---|
| M1 | Tx10 | Tx20 | Tx30 |
| M2 | Tx30 | Tx10 | Tx20 |
| M3 | Tx20 | Tx30 | Tx10 |
| M4 | $\overline{Tx10}$ | $\overline{Tx30}$ | $\overline{Tx20}$ |
| M5 | $\overline{Tx20}$ | $\overline{Tx10}$ | $\overline{Tx30}$ |
| M6 | $\overline{Tx30}$ | $\overline{Tx20}$ | $\overline{Tx10}$ |
[ FIG. 10 ]
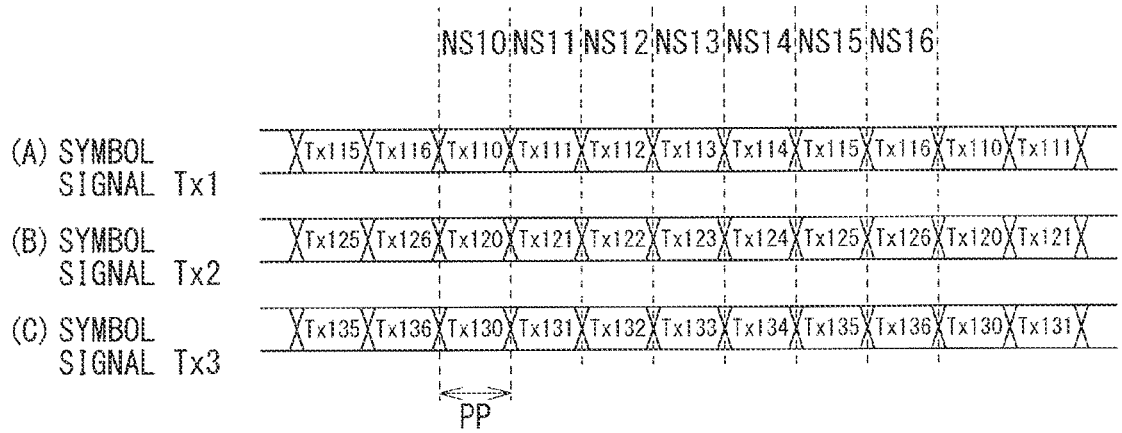

[ FIG. 11 ]

| SYMBOL SIGNAL Tx1 | SYMBOL SIGNAL Tx2 | SYMBOL SIGNAL Tx3 | SIGNAL PU0 | SIGNAL PD0 | SIGNAL PU1 | SIGNAL PD1 | SIGNAL PU2 | SIGNAL PD2 | SIGNAL SIG0 | SIGNAL SIG1 | SIGNAL SIG2 |
|---|---|---|---|---|---|---|---|---|---|---|---|
| 1 | 0 | 0 | 1 | 0 | 0 | 1 | 0 | 0 | VH | VL | VM |
| 0 | 1 | 1 | 0 | 1 | 1 | 0 | 0 | 0 | VL | VH | VM |
| 0 | 1 | 0 | 0 | 0 | 1 | 0 | 0 | 1 | VM | VH | VL |
| 1 | 0 | 1 | 0 | 0 | 0 | 1 | 1 | 0 | VM | VL | VH |
| 0 | 0 | 1 | 0 | 1 | 0 | 0 | 1 | 0 | VL | VM | VH |
| 1 | 1 | 0 | 1 | 0 | 0 | 0 | 0 | 1 | VH | VM | VL |

[ FIG. 12 ]
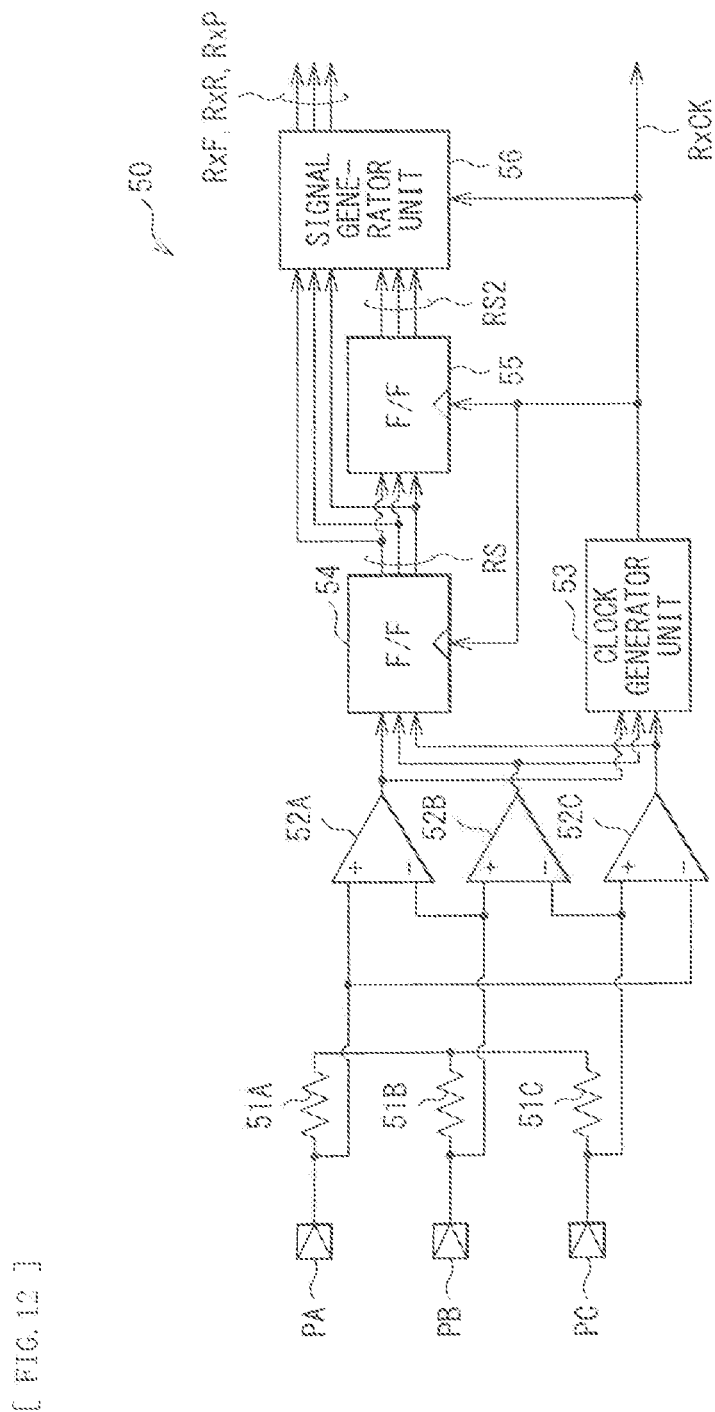

[ FIG. 13 ]
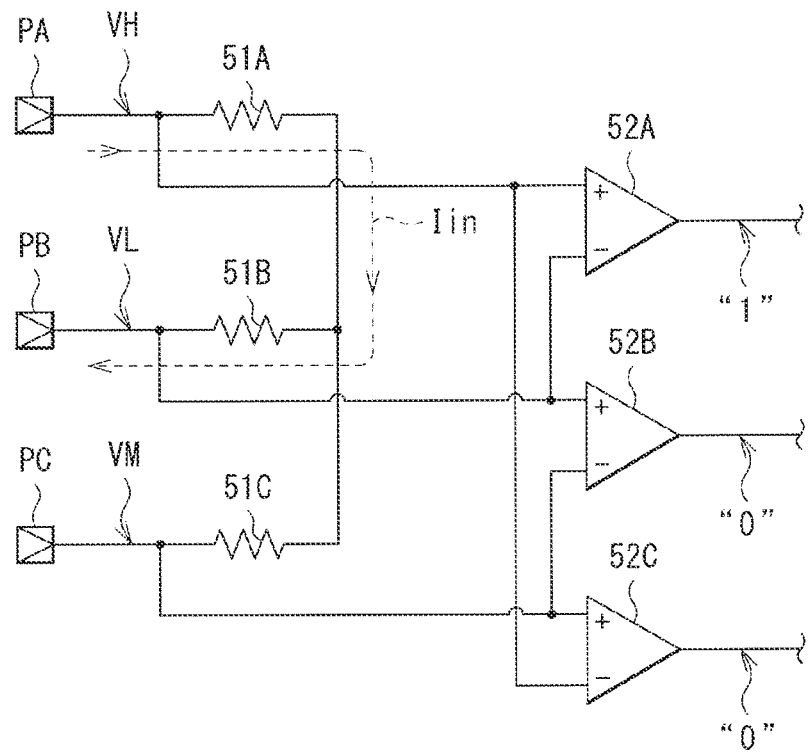
[ FIG. 14 ]
| SYMBOL SIGNAL Tx1 | SYMBOL SIGNAL Tx2 | SYMBOL SIGNAL Tx3 | SIGNAL SIG0 | SIGNAL SIG1 | SIGNAL SIG2 |
|---|---|---|---|---|---|
| 1 | 0 | 0 | 1 | 0 | 1/2 |
| 0 | 1 | 1 | 0 | 1 | 1/2 |
| 0 | 1 | 0 | 1/2 | 1 | 0 |
| 1 | 0 | 1 | 1/2 | 0 | 1 |
| 0 | 0 | 1 | 0 | 1/2 | 1 |
| 1 | 1 | 0 | 1 | 1/2 | 0 |

[FIG. 15]

| OPERA-TION MODE | SIGNAL SIG0 | SIGNAL SIG1 | SIGNAL SIG2 | SIGNAL SIGA | SIGNAL SIGB | SIGNAL SIGC |
|---|---|---|---|---|---|---|
| M1 | $1+\frac{(Tx10-Tx30)}{2}$ | $1+\frac{(Tx20-Tx10)}{2}$ | $1+\frac{(Tx30-Tx20)}{2}$ | $1+\frac{(Tx10-Tx30)}{2}$ | $1+\frac{(Tx20-Tx10)}{2}$ | $1+\frac{(Tx30-Tx20)}{2}$ |
| M2 | $1+\frac{(Tx30-Tx20)}{2}$ | $1+\frac{(Tx10-Tx30)}{2}$ | $1+\frac{(Tx20-Tx10)}{2}$ | $1+\frac{(Tx10-Tx30)}{2}$ | $1+\frac{(Tx20-Tx10)}{2}$ | $1+\frac{(Tx30-Tx20)}{2}$ |
| M3 | $1+\frac{(Tx20-Tx10)}{2}$ | $1+\frac{(Tx30-Tx20)}{2}$ | $1+\frac{(Tx10-Tx30)}{2}$ | $1+\frac{(Tx10-Tx30)}{2}$ | $1+\frac{(Tx20-Tx10)}{2}$ | $1+\frac{(Tx30-Tx20)}{2}$ |
| M4 | $1+\frac{(Tx20-Tx10)}{2}$ | $1+\frac{(Tx10-Tx30)}{2}$ | $1+\frac{(Tx30-Tx20)}{2}$ | $1+\frac{(Tx10-Tx30)}{2}$ | $1+\frac{(Tx20-Tx10)}{2}$ | $1+\frac{(Tx30-Tx20)}{2}$ |
| M5 | $1+\frac{(Tx30-Tx20)}{2}$ | $1+\frac{(Tx20-Tx10)}{2}$ | $1+\frac{(Tx10-Tx30)}{2}$ | $1+\frac{(Tx10-Tx30)}{2}$ | $1+\frac{(Tx20-Tx10)}{2}$ | $1+\frac{(Tx30-Tx20)}{2}$ |
| M6 | $1+\frac{(Tx10-Tx30)}{2}$ | $1+\frac{(Tx30-Tx20)}{2}$ | $1+\frac{(Tx20-Tx10)}{2}$ | $1+\frac{(Tx10-Tx30)}{2}$ | $1+\frac{(Tx20-Tx10)}{2}$ | $1+\frac{(Tx30-Tx20)}{2}$ |

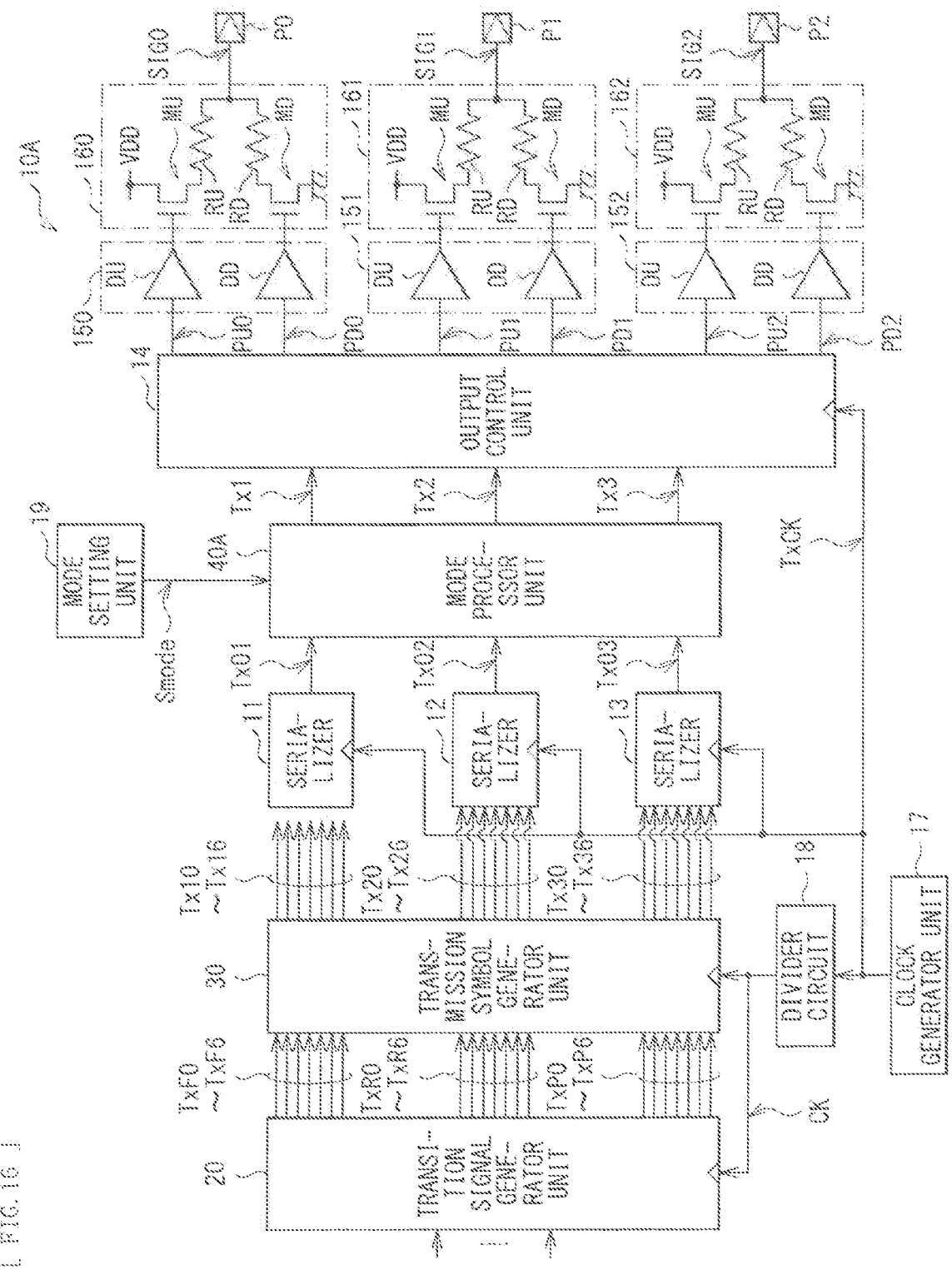
[FIG. 16]

[ FIG. 17 ]

| OPERATION MODE | SYMBOL SIGNAL Tx1 | SYMBOL SIGNAL Tx2 | SYMBOL SIGNAL Tx3 |
|---|---|---|---|
| M1 | Tx01 | Tx02 | Tx03 |
| M2 | Tx03 | Tx01 | Tx02 |
| M3 | Tx02 | Tx03 | Tx01 |
| M4 | $\overline{Tx01}$ | $\overline{Tx03}$ | $\overline{Tx02}$ |
| M5 | $\overline{Tx02}$ | $\overline{Tx01}$ | $\overline{Tx03}$ |
| M6 | $\overline{Tx03}$ | $\overline{Tx02}$ | $\overline{Tx01}$ |

[FIG. 18]
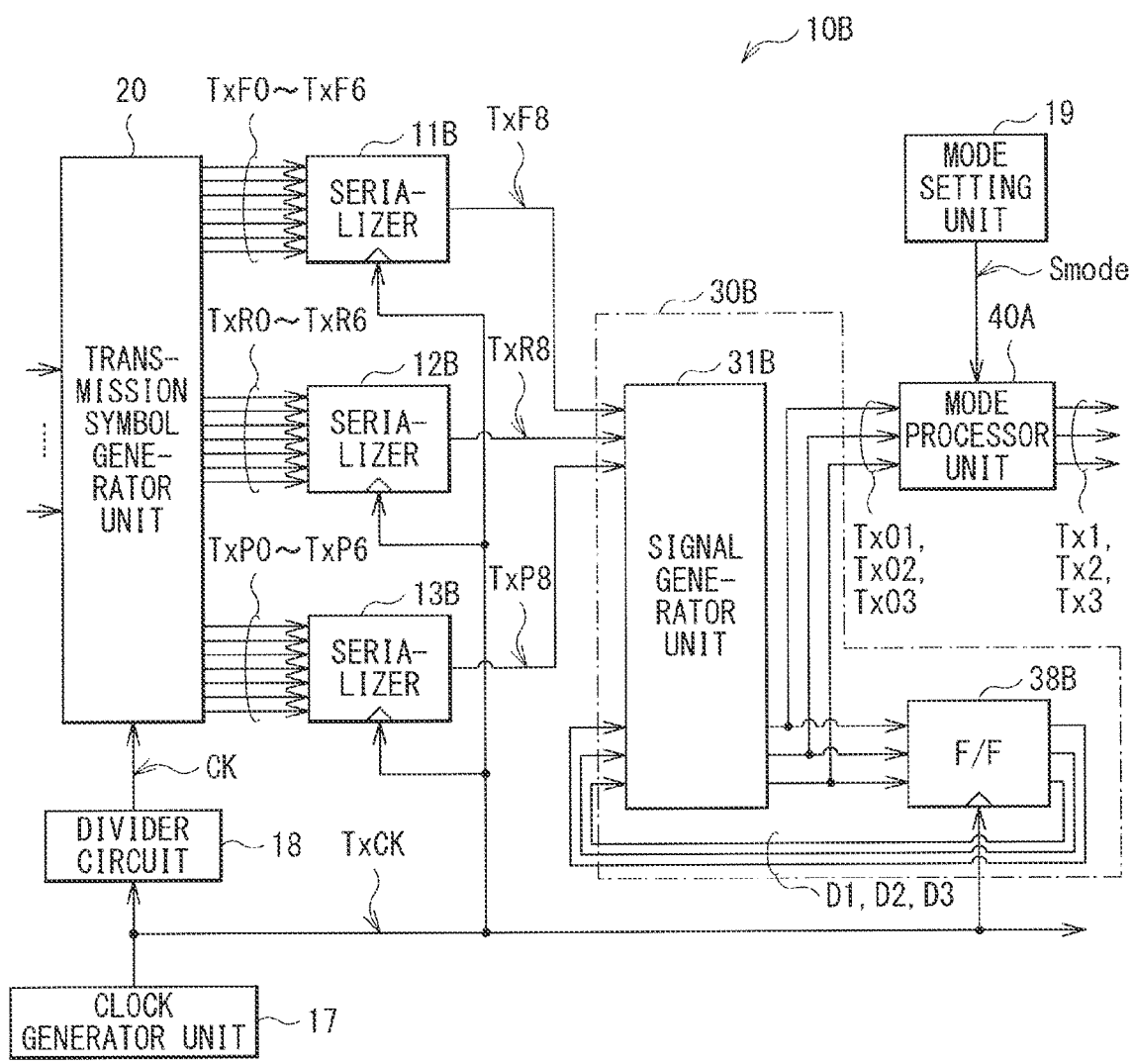

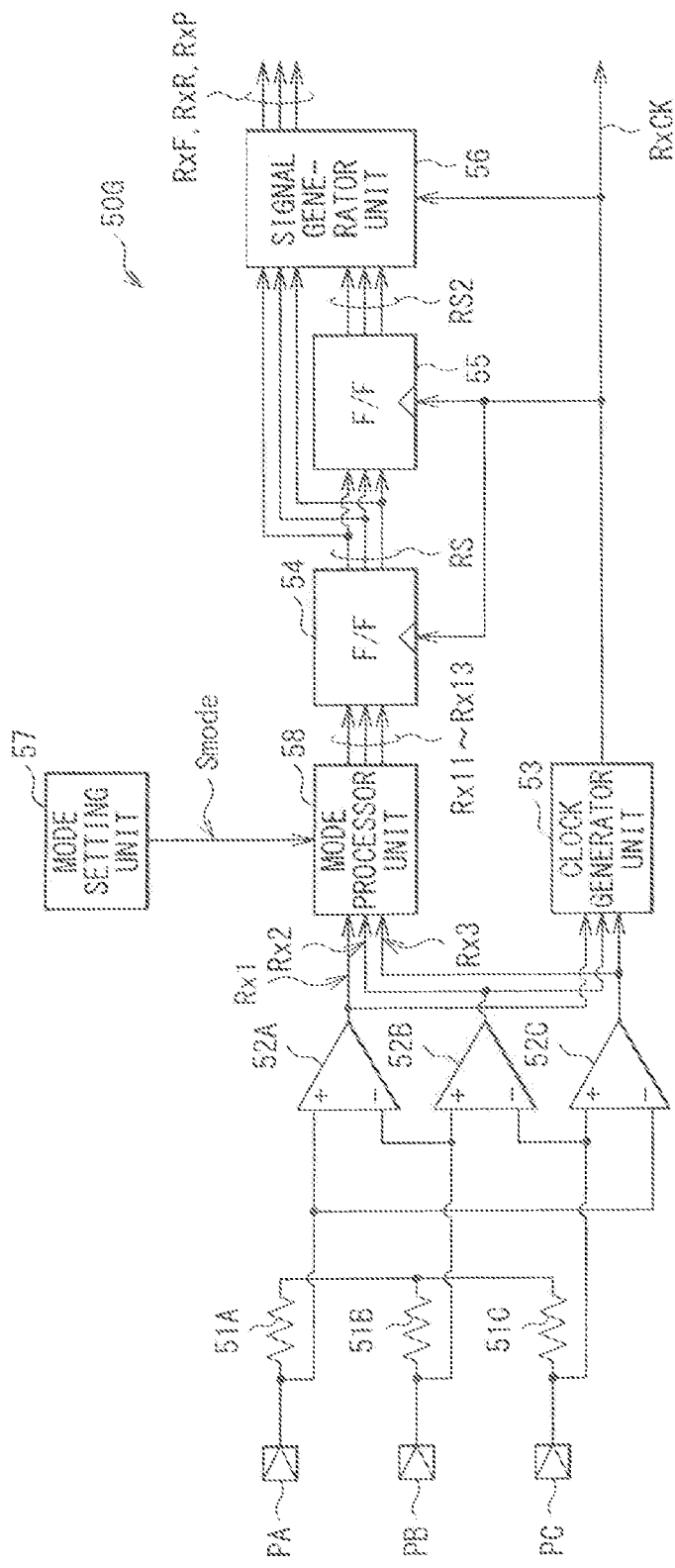
[ FIG. 19 ]

[ FIG. 20 ]

| OPERATION MODE | SIGNAL Rx11 | SIGNAL Rx12 | SIGNAL Rx13 |
|---|---|---|---|
| M1 | Rx1 | Rx2 | Rx3 |
| M2 | Rx3 | Rx1 | Rx2 |
| M3 | Rx2 | Rx3 | Rx1 |
| M4 | $\overline{Rx1}$ | $\overline{Rx3}$ | $\overline{Rx2}$ |
| M5 | $\overline{Rx2}$ | $\overline{Rx1}$ | $\overline{Rx3}$ |
| M6 | $\overline{Rx3}$ | $\overline{Rx2}$ | $\overline{Rx1}$ |

[ FIG. 21 ]

| OPERATION MODE | Rx1 | Rx2 | Rx3 | Rx11 | Rx12 | Rx13 |
|---|---|---|---|---|---|---|
| M1 | SIG0-SIG1 | SIG1-SIG2 | SIG2-SIG0 | SIG0-SIG1 | SIG1-SIG2 | SIG2-SIG0 |
| M2 | SIG1-SIG2 | SIG2-SIG0 | SIG0-SIG1 | SIG0-SIG1 | SIG1-SIG2 | SIG2-SIG0 |
| M3 | SIG2-SIG0 | SIG0-SIG1 | SIG1-SIG2 | SIG0-SIG1 | SIG1-SIG2 | SIG2-SIG0 |
| M4 | SIG1-SIG0 | SIG0-SIG2 | SIG2-SIG1 | SIG0-SIG1 | SIG1-SIG2 | SIG2-SIG0 |
| M5 | SIG2-SIG1 | SIG1-SIG0 | SIG0-SIG2 | SIG0-SIG1 | SIG1-SIG2 | SIG2-SIG0 |
| M6 | SIG0-SIG2 | SIG2-SIG1 | SIG1-SIG0 | SIG0-SIG1 | SIG1-SIG2 | SIG2-SIG0 |

[ FIG. 22 ]
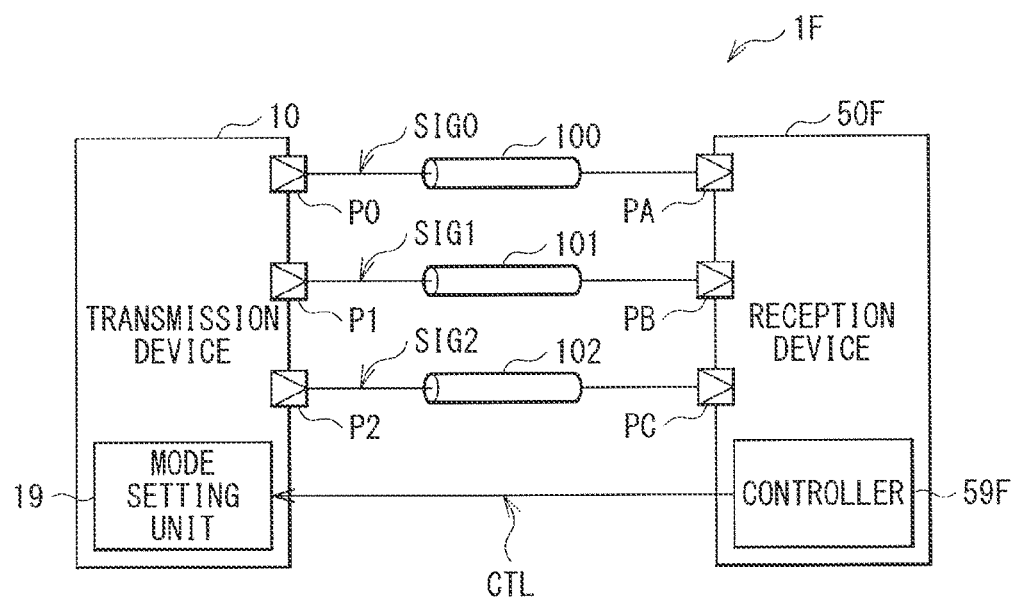
[ FIG. 23 ]
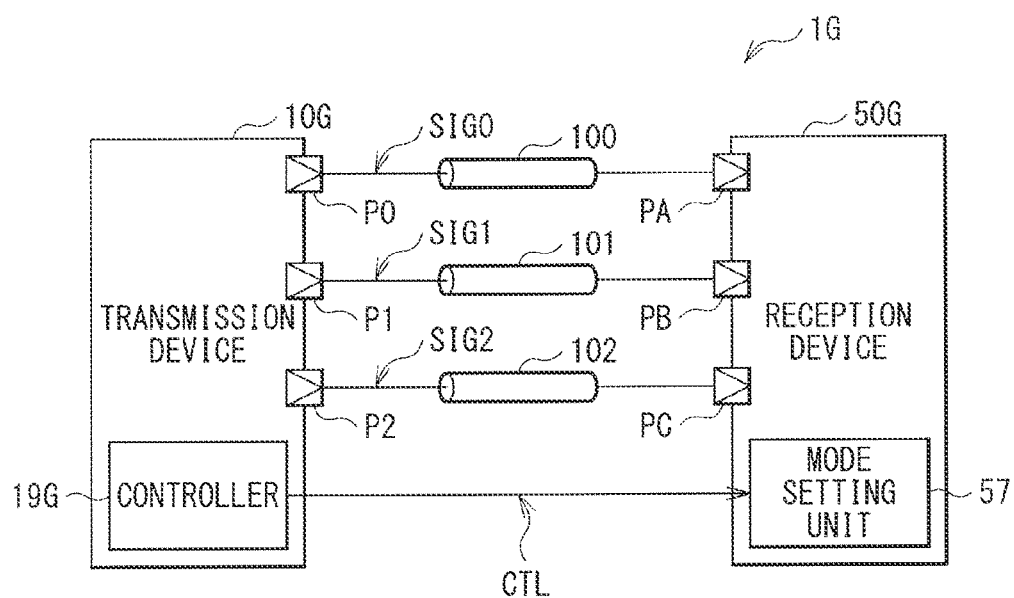

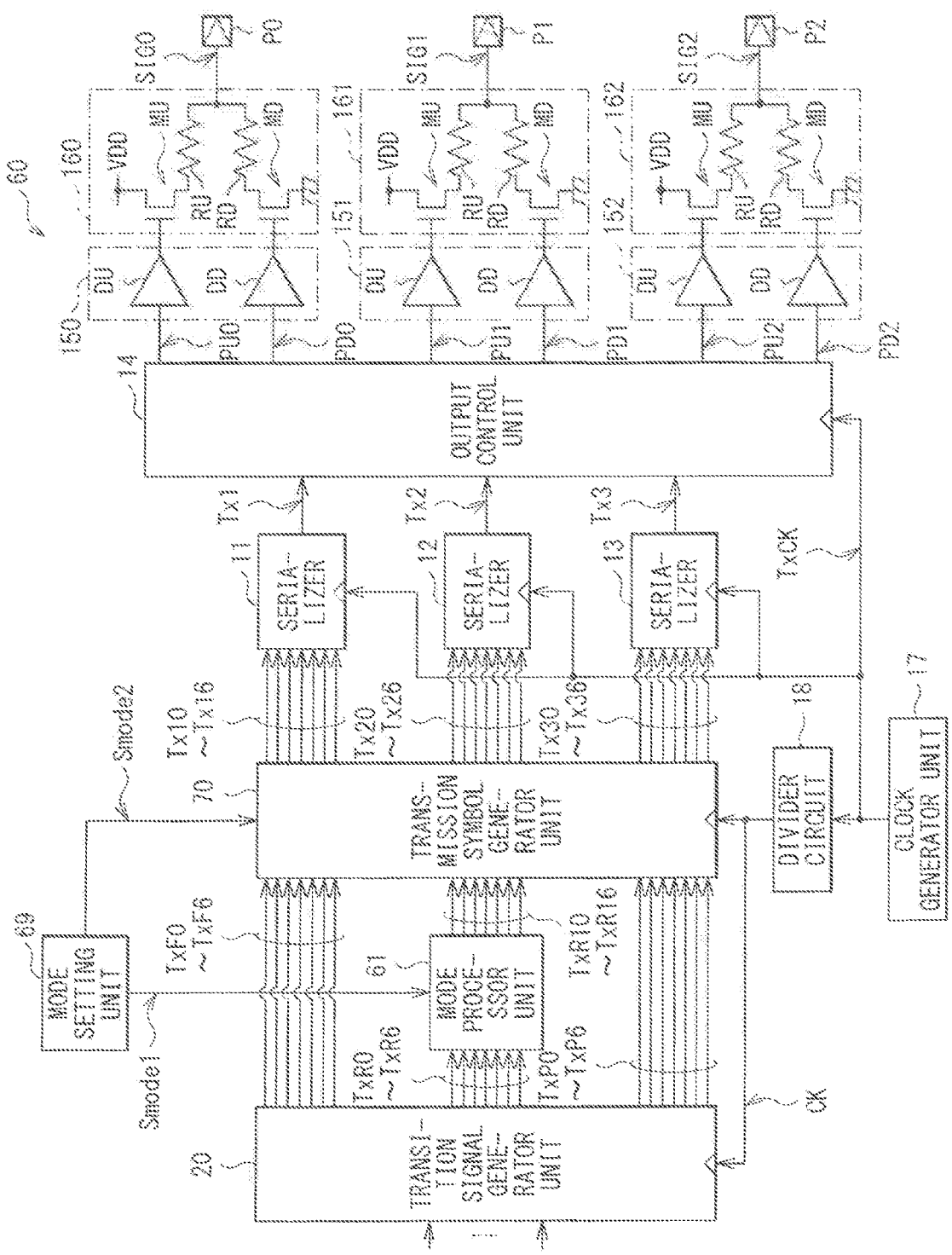
[FIG. 24]

[FIG. 25]
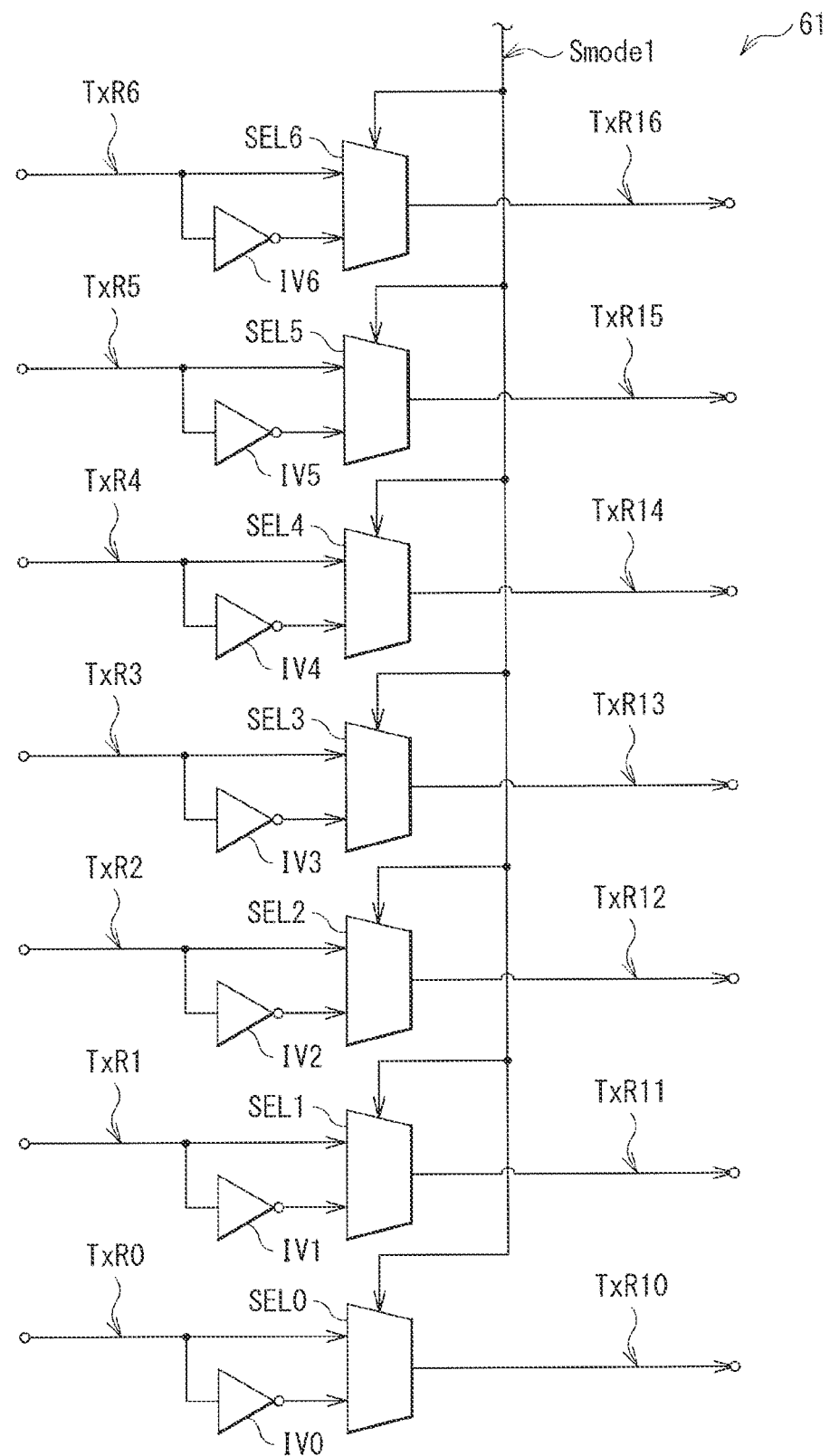

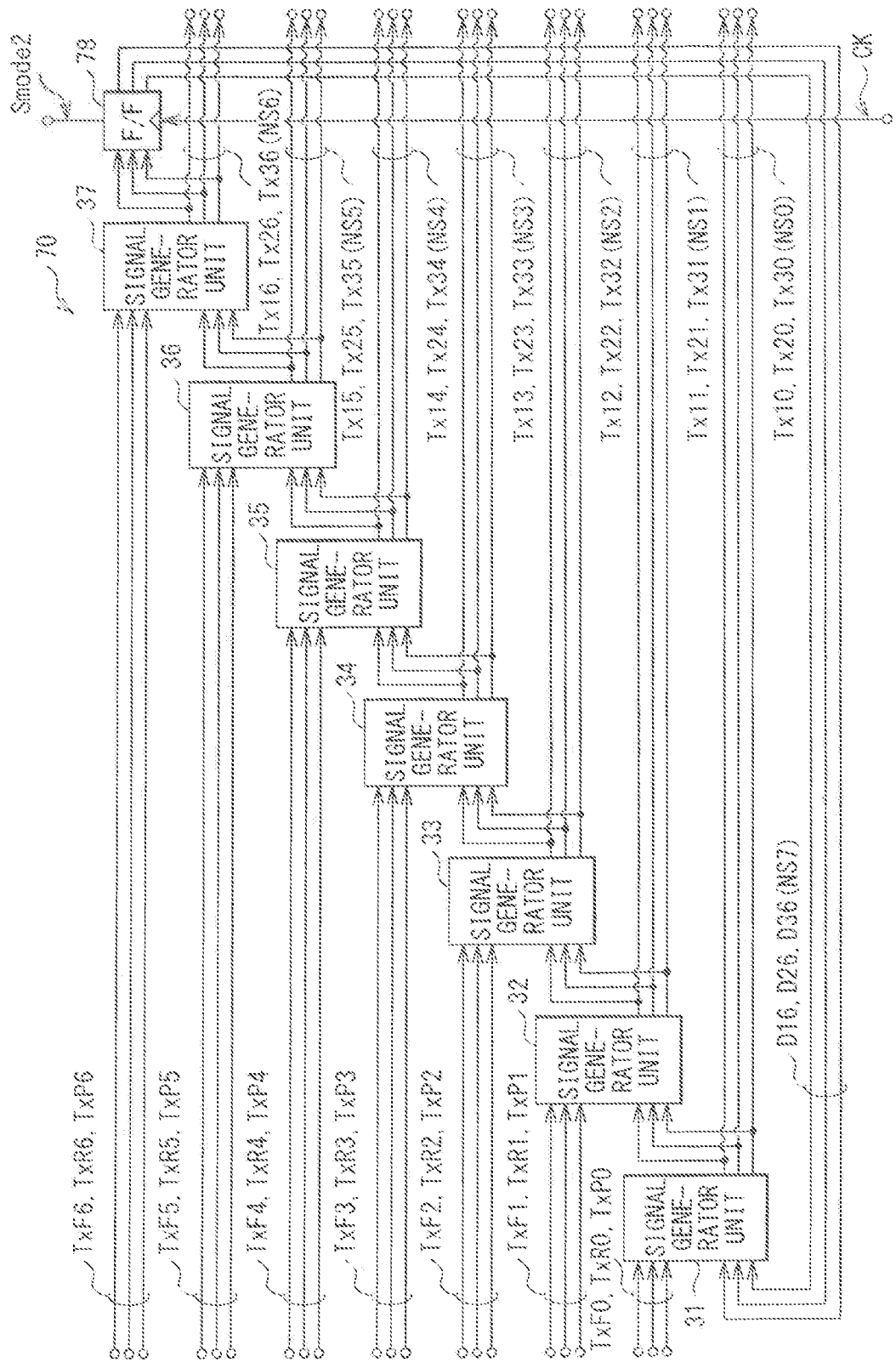
[ FIG. 26 ]

[ FIG. 27 ]

| OPERATION MODE | TRANSITION SIGNAL TxR10 | INITIAL SYMBOL |
|---|---|---|
| M1 | TxR0 | +x |
| M2 | TxR0 | +y |
| M3 | TxR0 | +z |
| M4 | $\overline{TxR0}$ | −x |
| M5 | $\overline{TxR0}$ | −y |
| M6 | $\overline{TxR0}$ | −z |

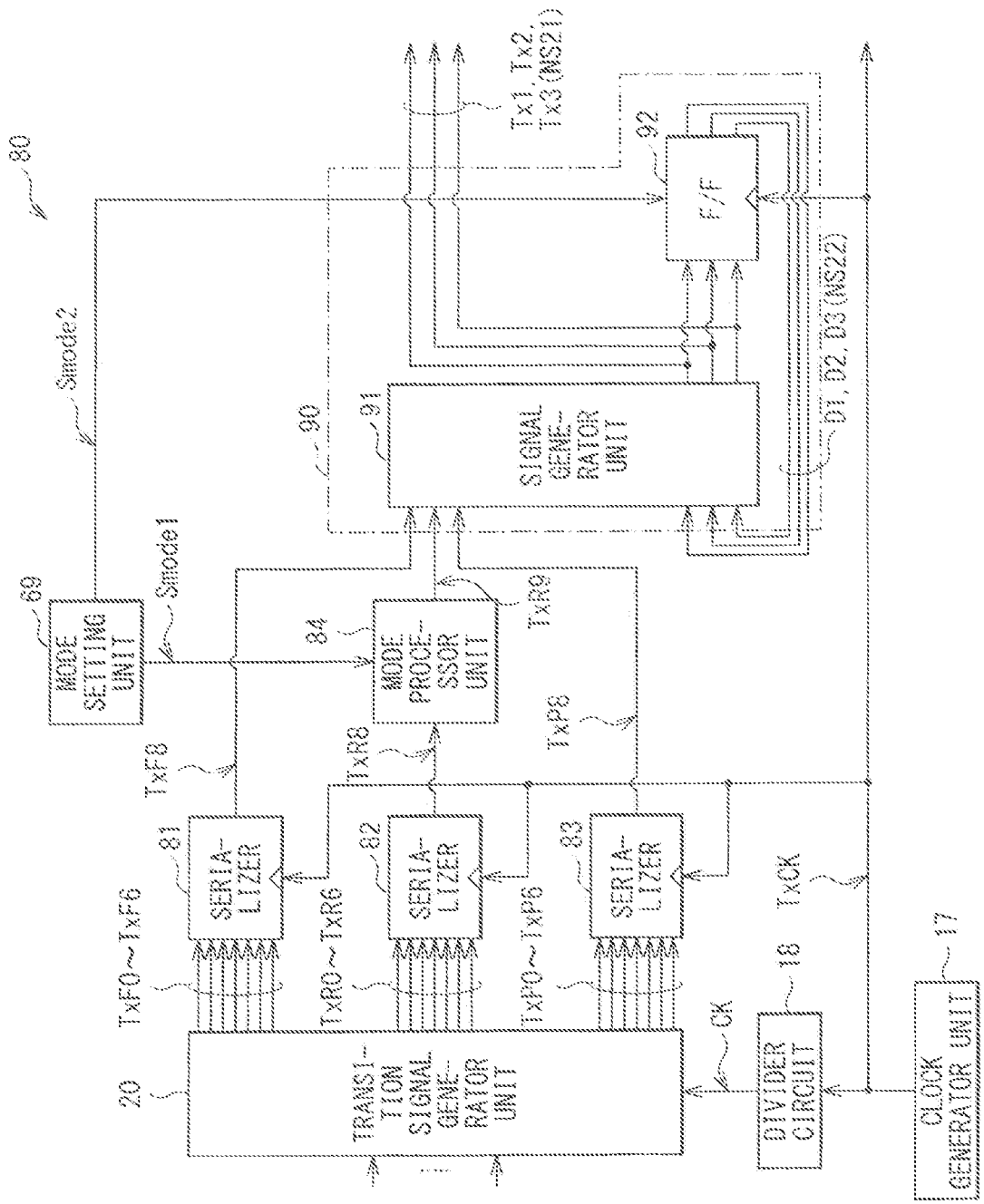
[ FIG. 28 ]

[ FIG. 29 ]
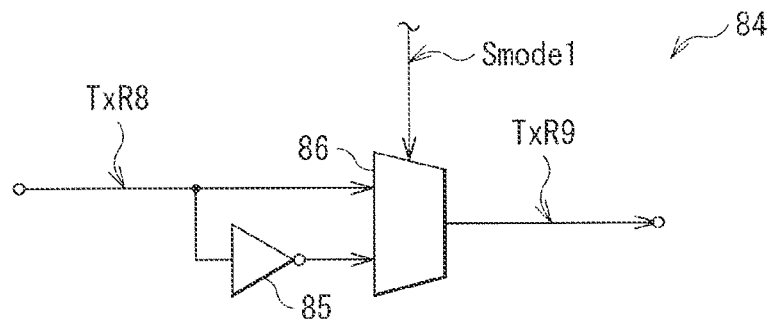
[ FIG. 30 ]
| OPERATION MODE | TRANSITION SIGNAL TxR9 | INITIAL SYMBOL |
|---|---|---|
| M1 | TxR8 | +x |
| M2 | TxR8 | +y |
| M3 | TxR8 | +z |
| M4 | $\overline{TxR8}$ | −x |
| M5 | $\overline{TxR8}$ | −y |
| M6 | $\overline{TxR8}$ | −z |

[ FIG. 31A ]

| TxF8, TxR8, TxP8 | NS22=+x | NS22=-x | NS22=+y | NS22=-y | NS22=+z | NS22=-z |
|---|---|---|---|---|---|---|
| 000 | +z | -z | +x | -x | +y | -y |
| 001 | -z | +z | -x | +x | -y | +y |
| 010 | +y | -y | +z | -z | +x | -x |
| 011 | -y | +y | -z | +z | -x | +x |
| 1xx | -x | +x | -y | +y | -z | +z |

[ FIG. 31B ]

| TxF8, TxR8, TxP8 | NS22=+x | NS22=-x | NS22=+y | NS22=-y | NS22=+z | NS22=-z |
|---|---|---|---|---|---|---|
| 010 | +z | -z | +x | -x | +y | -y |
| 011 | -z | +z | -x | +x | -y | +y |
| 000 | +y | -y | +z | -z | +x | -x |
| 001 | -y | +y | -z | +z | -x | +x |
| 1xx | -x | +x | -y | +y | -z | +z |

[ FIG. 32 ]

| TRANS-MISSION SYMBOL | SIG0 | SIG1 | SIG2 | STATE ON TRANS-MISSION SIDE | OPERATION MODE M1 STATE ON RECEPTION SIDE | OPERATION MODE M1 RECEPTION SYMBOL | OPERATION MODE M2 STATE ON RECEPTION SIDE | OPERATION MODE M2 RECEPTION SYMBOL | OPERATION MODE M3 STATE ON RECEPTION SIDE | OPERATION MODE M3 RECEPTION SYMBOL | OPERATION MODE M4 STATE ON RECEPTION SIDE | OPERATION MODE M4 RECEPTION SYMBOL | OPERATION MODE M5 STATE ON RECEPTION SIDE | OPERATION MODE M5 RECEPTION SYMBOL | OPERATION MODE M6 STATE ON RECEPTION SIDE | OPERATION MODE M6 RECEPTION SYMBOL |
|---|---|---|---|---|---|---|---|---|---|---|---|---|---|---|---|---|
| +x | VH | VL | VM | P0toP1 | AtoB | +x | CtoA | +z | BtoC | +y | BtoA | -x | CtoB | -y | AtoC | -z |
| -x | VL | VH | VM | P1toP0 | BtoA | -x | AtoC | -z | CtoB | -y | AtoB | +x | BtoC | +y | CtoA | +z |
| +y | VM | VH | VL | P1toP2 | BtoC | +y | AtoB | +x | CtoA | +z | AtoC | -z | BtoA | -x | CtoB | -y |
| -y | VM | VL | VH | P2toP1 | CtoB | -y | BtoA | -x | AtoC | -z | CtoA | +z | AtoB | +x | BtoC | +y |
| +z | VL | VM | VH | P2toP0 | CtoA | +z | BtoC | +y | AtoB | +x | CtoB | -y | AtoC | -z | BtoA | -x |
| -z | VH | VM | VL | P0toP2 | AtoC | -z | CtoB | -y | BtoA | -x | BtoC | +y | CtoA | +z | AtoB | +x |

[ FIG. 33 ]

| | 0 | 1 | 2 | 3 | 4 | 5 | 6 | 7 | 8 | 9 | 10 |
|---|---|---|---|---|---|---|---|---|---|---|---|
| TxF8, TxR8, TxP3 | — | 000 | 000 | 000 | 001 | 000 | 000 | 000 | 001 | 001 | 001 |
| TRANSMISSION SYMBOL | +x | +z | +y | +x | −z | −y | −x | −z | +y | −x | +z |
| STATE ON TRANSMISSION SIDE | P0toP1 | P2toP0 | P1toP2 | P0toP1 | P0toP2 | P2toP1 | P1toP0 | P0toP2 | P1toP0 | P1toP2 | P2toP0 |
| STATE ON RECEPTION SIDE | AtoB | CtoA | BtoC | AtoB | AtoC | CtoB | BtoA | AtoC | BtoC | BtoA | CtoA |
| RECEPTION SYMBOL | +x | +z | +y | +x | −z | −y | −x | −z | +y | −x | +z |

| | 11 | 12 | 13 | 14 | 15 | 16 | 17 | 18 | 19 | 20 |
|---|---|---|---|---|---|---|---|---|---|---|
| TxF8, TxR8, TxP8 | 001 | 001 | 010 | 010 | 010 | 011 | 010 | 010 | 010 | 011 |
| TRANSMISSION SYMBOL | −y | +x | +y | +z | +x | −y | −z | −x | −y | +z |
| STATE ON TRANSMISSION SIDE | P2toP1 | P0toP1 | P1toP2 | P2toP0 | P0toP0 | P2toP1 | P0toP1 | P1toP2 | P2toP1 | P1toP0 |
| STATE ON RECEPTION SIDE | CtoB | AtoB | BtoC | CtoA | AtoB | CtoB | AtoC | BtoA | CtoB | CtoA |
| RECEPTION SYMBOL | −y | +x | +y | +z | +x | −y | −z | −x | −y | +z |

| | 21 | 22 | 23 | 24 | 25 | 26 | 27 | 28 | 29 | 30 |
|---|---|---|---|---|---|---|---|---|---|---|
| TxF8, TxR8, TxP8 | 011 | 1xx | 1xx | 011 | 1xx | 1xx | 011 | 1xx | 1xx | 011 |
| TRANSMISSION SYMBOL | −x | +x | −x | +y | −y | +y | −z | +z | −z | +x |
| STATE ON TRANSMISSION SIDE | P1toP0 | P0toP1 | P1toP0 | P0toP1 | P1toP2 | P2toP1 | P0toP2 | P2toP0 | P2toP0 | P0toP2 |
| STATE ON RECEPTION SIDE | BtoA | AtoB | BtoA | AtoB | CtoB | BtoC | AtoC | CtoA | CtoA | AtoC |
| RECEPTION SYMBOL | −x | +x | −x | +y | −y | +y | −z | +z | −z | +x |

[FIG. 34]

| | 0 | 1 | 2 | 3 | 4 | 5 | 6 | 7 | 8 | 9 | 10 |
|---|---|---|---|---|---|---|---|---|---|---|---|
| TxF8,TxR8,TxP8 | — | 000 | 000 | 000 | 001 | 000 | 000 | 000 | 001 | 001 | 001 |
| TRANSMISSION SYMBOL | | +x | +z | +y | -x | -z | -y | -x | +z | -y | +x |
| STATE ON TRANSMISSION SIDE | P1toP2 | P0toP1 | P2toP0 | P1toP0 | P1toP2 | P0toP2 | P2toP1 | P1toP0 | P2toP0 | P2toP1 | P0toP1 |
| STATE ON RECEPTION SIDE | AtoB | CtoA | BtoC | AtoB | AtoC | CtoB | BtoA | AtoC | BtoC | BtoA | CtoA |
| RECEPTION SYMBOL | +x | +z | +y | +x | -z | -y | -x | -z | +y | -x | +z |

| | 11 | 12 | 13 | 14 | 15 | 16 | 17 | 18 | 19 | 20 |
|---|---|---|---|---|---|---|---|---|---|---|
| TxF8,TxR8,TxP8 | 001 | 001 | 010 | 010 | 010 | 011 | 010 | 010 | 010 | 011 |
| TRANSMISSION SYMBOL | -z | +y | +z | +x | +y | -z | -x | -y | -z | +x |
| STATE ON TRANSMISSION SIDE | P0toP2 | P1toP2 | P2toP1 | P0toP0 | P1toP1 | P0toP2 | P2toP2 | P1toP0 | P0toP1 | P2toP0 |
| STATE ON RECEPTION SIDE | CtoB | AtoB | BtoC | CtoA | AtoB | CtoB | AtoC | BtoA | CtoB | CtoC |
| RECEPTION SYMBOL | -y | +x | +z | +y | +x | -y | -x | -y | -y | +z |

| | 21 | 22 | 23 | 24 | 25 | 26 | 27 | 28 | 29 | 30 |
|---|---|---|---|---|---|---|---|---|---|---|
| TxF8,TxR8,TxP8 | 011 | 1xx | 1xx | 011 | 1xx | 1xx | 011 | 1xx | 1xx | 011 |
| TRANSMISSION SYMBOL | -y | +y | -x | +z | -z | +z | -x | +x | -x | +y |
| STATE ON TRANSMISSION SIDE | P2toP1 | P1toP2 | P2toP0 | P0toP1 | P0toP2 | P2toP0 | P1toP0 | P0toP1 | P1toP0 | P1toP2 |
| STATE ON RECEPTION SIDE | BtoA | AtoB | BtoC | CtoA | AtoB | BtoC | AtoC | CtoA | AtoC | AtoB |
| RECEPTION SYMBOL | -x | +x | -x | +y | -y | +y | -z | +z | -z | +x |

[ FIG. 35A ]
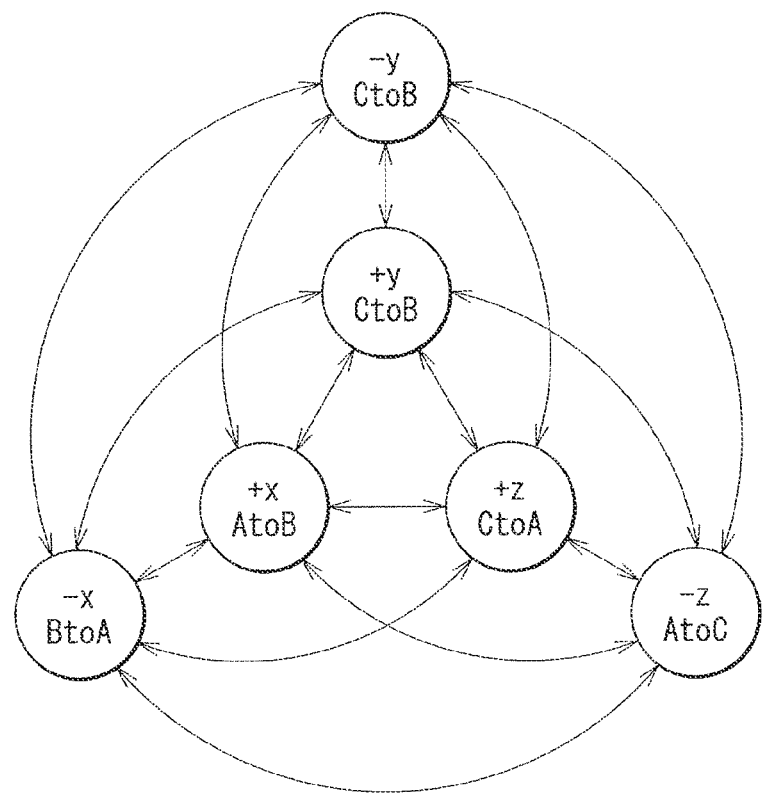
[ FIG. 35B ]
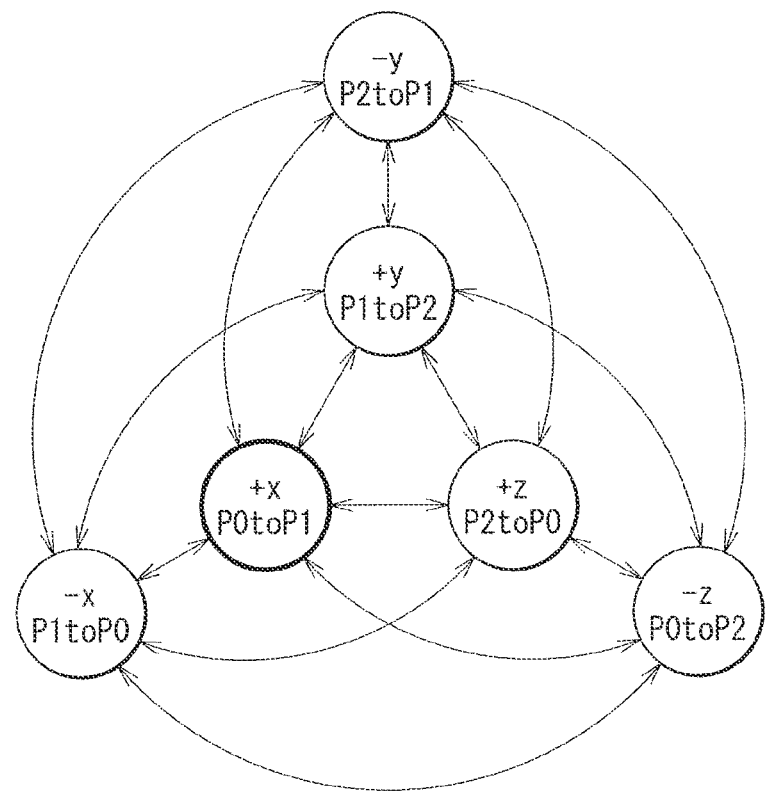

[FIG. 35C]
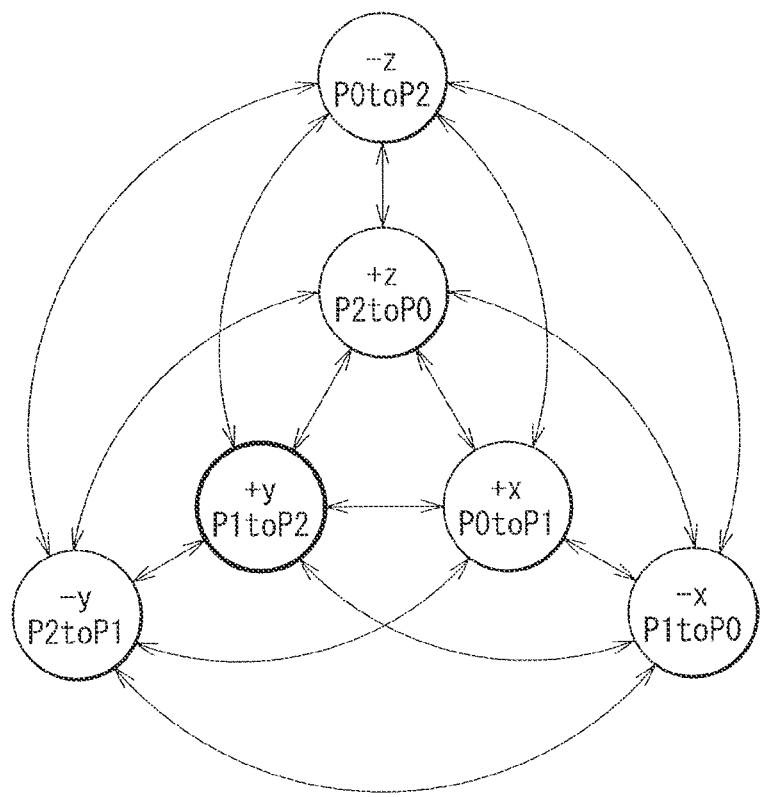
[FIG. 35D]
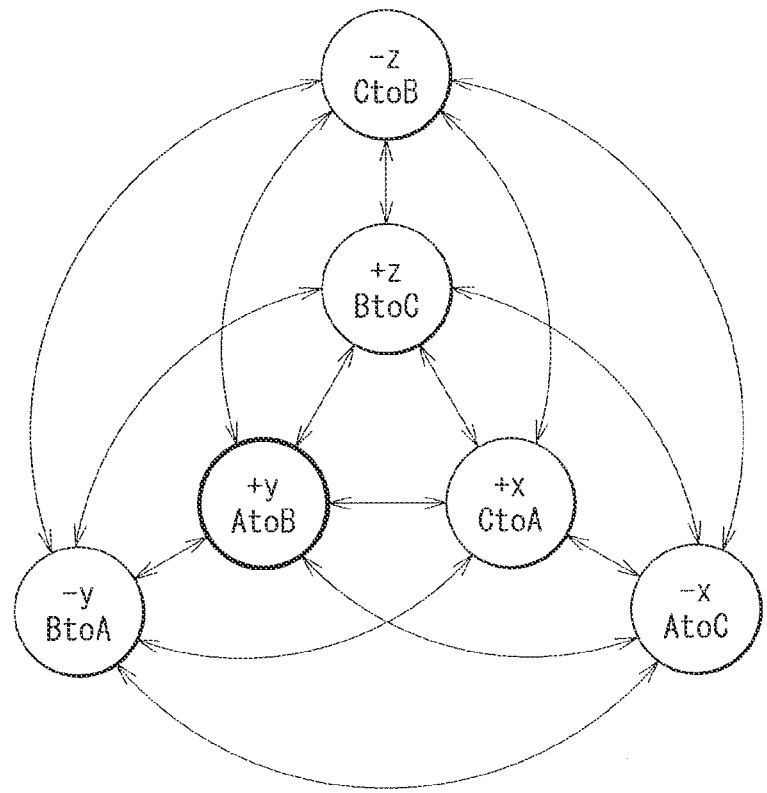

[ FIG. 36 ]

| | 0 | 1 | 2 | 3 | 4 | 5 | 6 | 7 | 8 | 9 | 10 |
|---|---|---|---|---|---|---|---|---|---|---|---|
| TxF8, TxR8, TxP8 | — | 000 | 000 | 000 | 001 | 000 | 000 | 000 | 001 | 001 | 001 |
| TRANSMISSION SYMBOL | +z | +y | +x | +z | -y | -x | -z | -y | +x | -z | +y |
| STATE ON TRANSMISSION SIDE | P2toP0 | P1toP2 | P0toP1 | P2toP0 | P2toP1 | P1toP0 | P0toP2 | P2toP1 | P0toP1 | P0toP2 | P1toP2 |
| STATE ON RECEPTION SIDE | AtoB | CtoA | BtoC | AtoB | AtoC | CtoB | BtoA | AtoC | BtoC | BtoA | CtoA |
| RECEPTION SYMBOL | +x | +z | +y | +x | -z | -y | -x | -z | +y | -x | +z |

| | 11 | 12 | 13 | 14 | 15 | 16 | 17 | 18 | 19 | 20 |
|---|---|---|---|---|---|---|---|---|---|---|
| TxF8, TxR8, TxP8 | 001 | 001 | 010 | 010 | 010 | 011 | 010 | 010 | 010 | 011 |
| TRANSMISSION SYMBOL | -x | +z | +x | +y | +z | -x | -y | -z | -x | +y |
| STATE ON TRANSMISSION SIDE | P1toP0 | P2toP0 | P0toP1 | P1toP2 | P2toP0 | P1toP0 | P2toP1 | P0toP2 | P0toP1 | P1toP2 |
| STATE ON RECEPTION SIDE | CtoB | AtoB | BtoC | CtoA | AtoB | CtoB | AtoC | BtoA | BtoC | CtoA |
| RECEPTION SYMBOL | -y | +x | +y | +z | +x | -y | -z | -x | -y | +z |

| | 21 | 22 | 23 | 24 | 25 | 26 | 27 | 28 | 29 | 30 |
|---|---|---|---|---|---|---|---|---|---|---|
| TxF8, TxR8, TxP8 | 011 | 1xx | 1xx | 011 | 1xx | 1xx | 011 | 1xx | 1xx | 011 |
| TRANSMISSION SYMBOL | -z | +z | -z | +x | -x | +x | -y | +y | -y | +z |
| STATE ON TRANSMISSION SIDE | P0toP2 | P2toP0 | P0toP2 | P2toP1 | P1toP0 | P0toP1 | P1toP2 | P2toP1 | P1toP0 | P2toP0 |
| STATE ON RECEPTION SIDE | BtoA | AtoB | BtoA | CtoB | CtoB | CtoA | AtoC | CtoA | AtoC | AtoB |
| RECEPTION SYMBOL | -x | +x | -x | +y | -y | +y | -z | +z | -z | +x |

[ FIG. 37 ]

| | 0 | 1 | 2 | 3 | 4 | 5 | 6 | 7 | 8 | 9 | 10 |
|---|---|---|---|---|---|---|---|---|---|---|---|
| TxF8, TxR8, TxP8 | — | 000 | 000 | 000 | 001 | 000 | 000 | 000 | 001 | 001 | 001 |
| TRANSMISSION SYMBOL | −x | −y | −z | −x | +y | +z | +x | +y | −z | +x | −y |
| STATE ON TRANSMISSION SIDE | P1toP0 | P2toP1 | P0toP2 | P1toP0 | P1toP2 | P2toP0 | P0toP1 | P1toP2 | P0toP2 | P0toP1 | P2toP1 |
| STATE ON RECEPTION SIDE | AtoB | CtoA | BtoC | AtoB | AtoC | CtoB | BtoA | AtoC | BtoC | BtoA | CtoA |
| RECEPTION SYMBOL | +x | +z | +y | +x | −z | −y | −x | −z | +y | −x | +z |

| | 11 | 12 | 13 | 14 | 15 | 16 | 17 | 18 | 19 | 20 |
|---|---|---|---|---|---|---|---|---|---|---|
| TxF8, TxR8, TxP8 | 001 | 001 | 010 | 010 | 010 | 011 | 010 | 010 | 010 | 011 |
| TRANSMISSION SYMBOL | +z | −x | −z | −y | −x | +z | +y | +x | +z | −y |
| STATE ON TRANSMISSION SIDE | P2toP0 | P1toP0 | P0toP2 | P2toP0 | P1toP2 | P2toP0 | P1toP2 | P2toP0 | P2toP0 | P2toP0 |
| STATE ON RECEPTION SIDE | CtoB | AtoB | BtoC | CtoA | AtoB | CtoB | AtoC | BtoA | CtoB | CtoA |
| RECEPTION SYMBOL | −y | +x | +y | +z | +x | −y | −z | −x | −y | +z |

| | 21 | 22 | 23 | 24 | 25 | 26 | 27 | 28 | 29 | 30 |
|---|---|---|---|---|---|---|---|---|---|---|
| TxF8, TxR8, TxP8 | 011 | 1xx | 1xx | 011 | 1xx | 1xx | 011 | 1xx | 1xx | 011 |
| TRANSMISSION SYMBOL | +x | −x | +x | −z | +z | −z | +y | −y | +y | −x |
| STATE ON TRANSMISSION SIDE | P0toP1 | P1toP0 | P0toP2 | P0toP0 | P2toP2 | P0toP0 | P1toP1 | P2toP2 | P1toP0 | P1toP2 |
| STATE ON RECEPTION SIDE | BtoA | AtoB | BtoC | CtoC | BtoB | AtoA | AtoC | CtoA | AtoB | AtoB |
| RECEPTION SYMBOL | −x | +x | +y | −z | −y | +z | −z | +z | −z | +x |

[ FIG. 38A ]
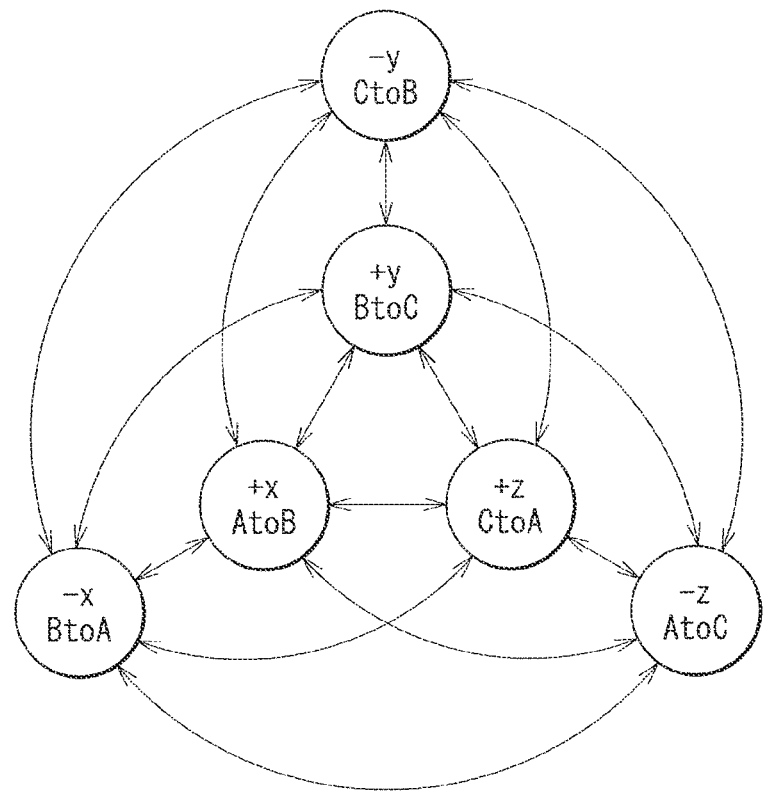
[ FIG. 38B ]
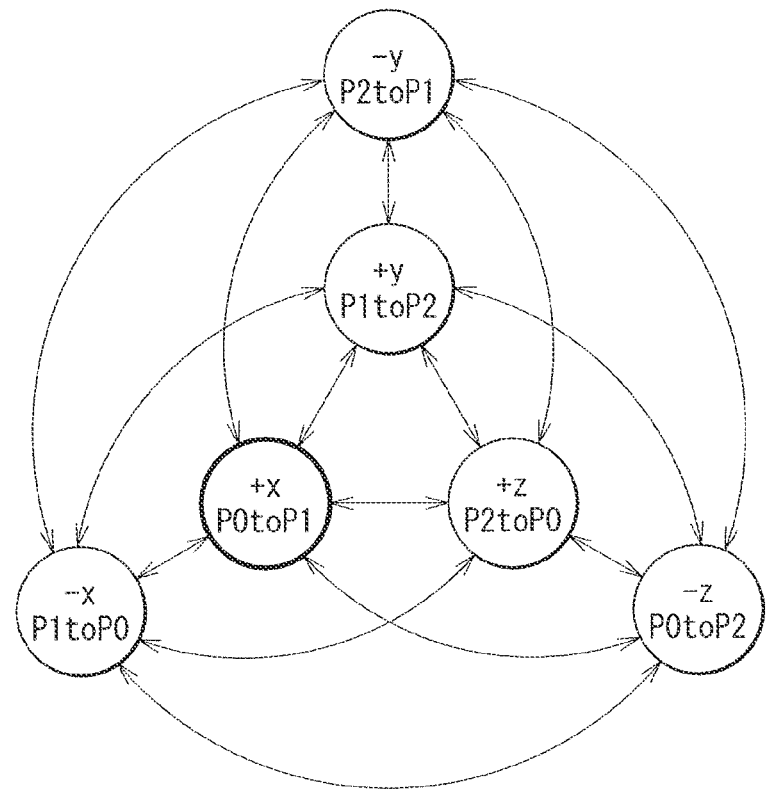

[ FIG. 38C ]
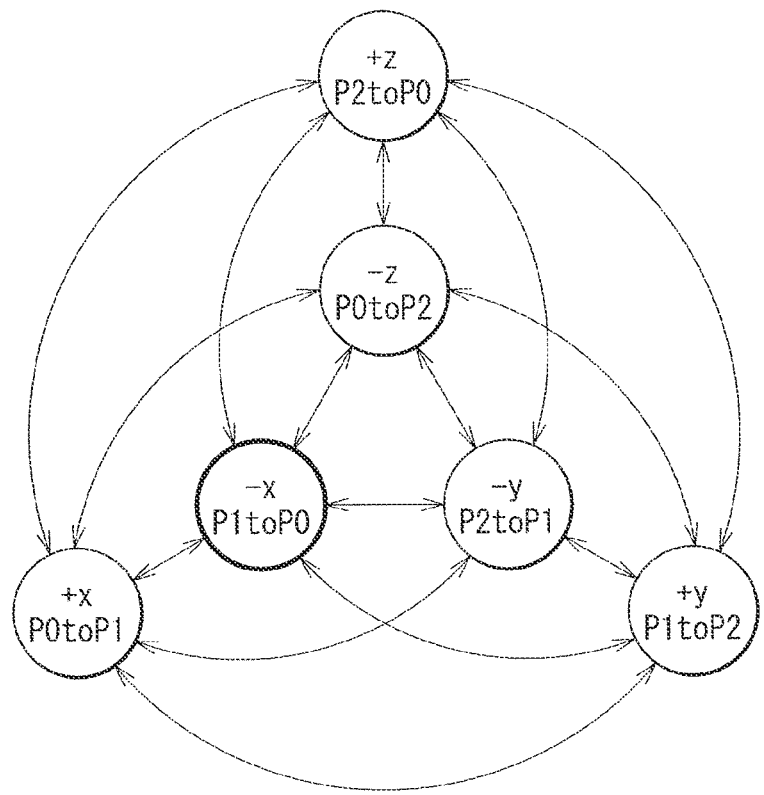
[ FIG. 38D ]
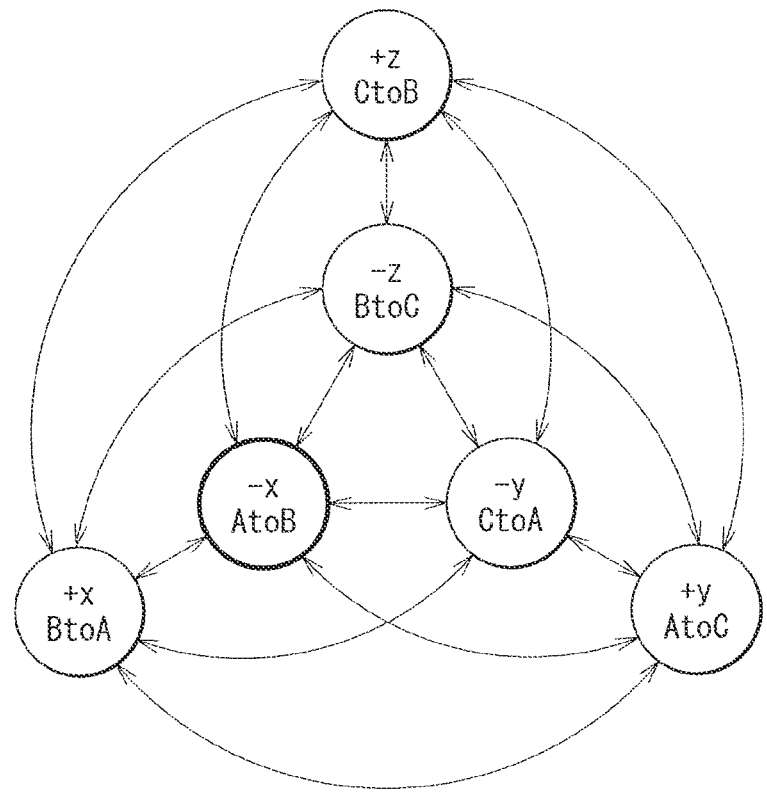

[ FIG. 39 ]

| | 0 | 1 | 2 | 3 | 4 | 5 | 6 | 7 | 8 | 9 | 10 |
|---|---|---|---|---|---|---|---|---|---|---|---|
| TxF8, TxR8, TxP8 | — | 000 | 000 | 000 | 001 | 000 | 000 | 000 | 001 | 001 | 001 |
| TRANSMISSION SYMBOL | −y | −z | −x | −y | +z | +x | +y | +z | −x | +y | −z |
| STATE ON TRANSMISSION SIDE | P2toP1 | P0toP0 | P1toP1 | P2toP2 | P2toP1 | P0toP2 | P1toP0 | P2toP1 | P1toP0 | P1toP2 | P0toP2 |
| STATE ON RECEPTION SIDE | AtoB | CtoA | BtoC | AtoB | AtoC | CtoB | BtoA | AtoC | BtoC | BtoA | CtoA |
| RECEPTION SYMBOL | +x | +z | +y | +x | −z | −y | −x | −z | +y | −x | +z |

| | 11 | 12 | 13 | 14 | 15 | 16 | 17 | 18 | 19 | 20 |
|---|---|---|---|---|---|---|---|---|---|---|
| TxF8, TxR8, TxP8 | 001 | 001 | 010 | 010 | 010 | 011 | 010 | 010 | 010 | 011 |
| TRANSMISSION SYMBOL | +x | −y | −x | −z | −y | +x | +z | +y | +x | −z |
| STATE ON TRANSMISSION SIDE | P0toP1 | P2toP1 | P1toP0 | P0toP0 | P1toP2 | P2toP0 | P2toP2 | P1toP2 | P0toP2 | P0toP2 |
| STATE ON RECEPTION SIDE | CtoB | AtoB | BtoC | CtoA | AtoB | CtoB | AtoC | BtoA | CtoB | CtoA |
| RECEPTION SYMBOL | −y | +x | +y | +z | −x | −y | −z | −x | −y | +z |

| | 21 | 22 | 23 | 24 | 25 | 26 | 27 | 28 | 29 | 30 |
|---|---|---|---|---|---|---|---|---|---|---|
| TxF8, TxR8, TxP8 | 011 | 1xx | 1xx | 011 | 1xx | 1xx | 011 | 1xx | 1xx | 011 |
| TRANSMISSION SYMBOL | +y | −y | +y | −x | +x | −x | +z | −z | +z | −y |
| STATE ON TRANSMISSION SIDE | P1toP2 | P2toP1 | P1toP0 | P0toP2 | P1toP0 | P0toP0 | P2toP0 | P0toP0 | P2toP0 | P2toP1 |
| STATE ON RECEPTION SIDE | BtoA | AtoB | BtoA | BtoC | CtoB | BtoC | AtoC | CtoA | AtoC | AtoB |
| RECEPTION SYMBOL | −x | +x | −x | +y | −y | +x | −z | +z | −z | +x |

[FIG. 40]

| | 0 | 1 | 2 | 3 | 4 | 5 | 6 | 7 | 8 | 9 | 10 |
|---|---|---|---|---|---|---|---|---|---|---|---|
| TxF8, TxR8, TxP8 | -- | 000 | 000 | 000 | 001 | 000 | 000 | 000 | 001 | 001 | 001 |
| TRANSMISSION SYMBOL | -- | -x | -y | -z | +x | +y | +z | +x | -y | +z | -x |
| STATE ON TRANSMISSION SIDE | P0toP2 | P1toP0 | P2toP1 | P0toP2 | P0toP1 | P1toP2 | P2toP0 | P0toP1 | P2toP1 | P2toP0 | P1toP0 |
| STATE ON RECEPTION SIDE | AtoB | CtoA | BtoC | AtoB | AtoC | CtoB | BtoA | AtoC | BtoC | BtoA | CtoA |
| RECEPTION SYMBOL | +x | +z | +y | +x | -z | -y | -x | -z | +y | -x | +z |

| | 11 | 12 | 13 | 14 | 15 | 16 | 17 | 18 | 19 | 20 |
|---|---|---|---|---|---|---|---|---|---|---|
| TxF8, TxR8, TxP8 | 001 | 001 | 010 | 010 | 010 | 011 | 010 | 010 | 010 | 011 |
| TRANSMISSION SYMBOL | +y | -z | -y | -x | -z | +y | +x | +z | +y | -x |
| STATE ON TRANSMISSION SIDE | P1toP2 | P0toP2 | P2toP0 | P1toP0 | P0toP0 | P0toP2 | P0toP2 | P2toP1 | P0toP1 | P1toP0 |
| STATE ON RECEPTION SIDE | CtoB | AtoB | BtoA | CtoA | AtoB | CtoB | AtoC | BtoA | CtoB | CtoA |
| RECEPTION SYMBOL | -y | +x | +y | +z | +x | -y | -z | -x | -y | +z |

| | 21 | 22 | 23 | 24 | 25 | 26 | 27 | 28 | 29 | 30 |
|---|---|---|---|---|---|---|---|---|---|---|
| TxF8, TxR8, TxP8 | 011 | 1xx | 1xx | 011 | 1xx | 1xx | 011 | 1xx | 1xx | 011 |
| TRANSMISSION SYMBOL | +z | -z | +z | -y | +y | -y | +x | -x | +x | -z |
| STATE ON TRANSMISSION SIDE | P2toP0 | P0toP0 | P2toP0 | P2toP2 | P1toP1 | P2toP2 | P1toP1 | P1toP1 | P0toP0 | P1toP2 |
| STATE ON RECEPTION SIDE | BtoA | AtoB | BtoA | BtoC | CtoB | BtoC | AtoC | CtoA | AtoB | AtoB |
| RECEPTION SYMBOL | -x | +x | +y | +y | -y | +y | -z | +z | +x | +x |

[ FIG. 41 ]
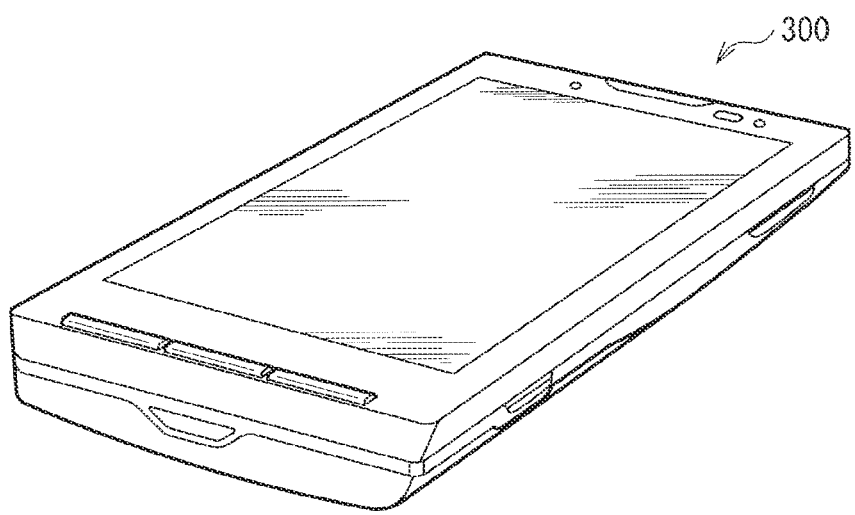

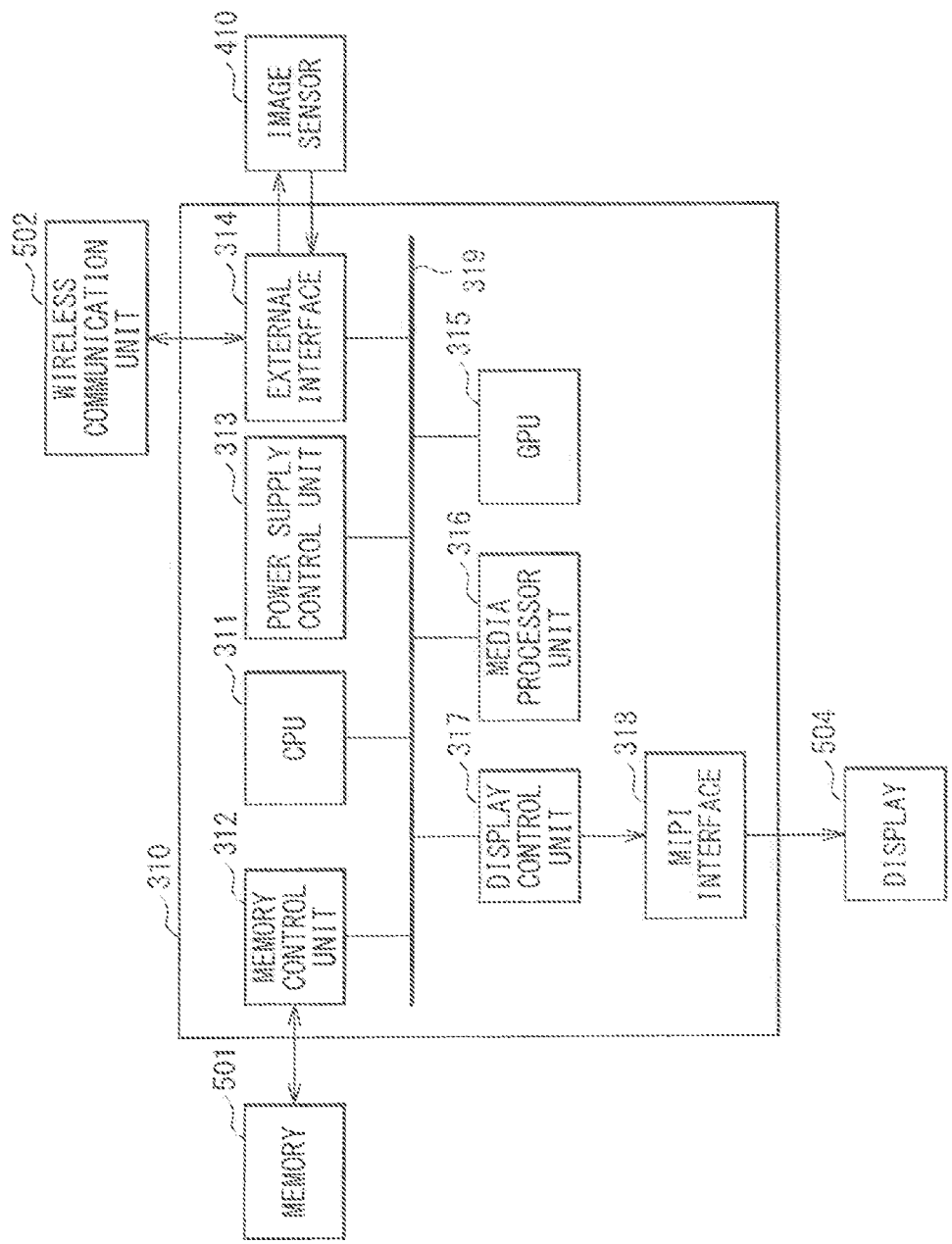
[ FIG. 42 ]

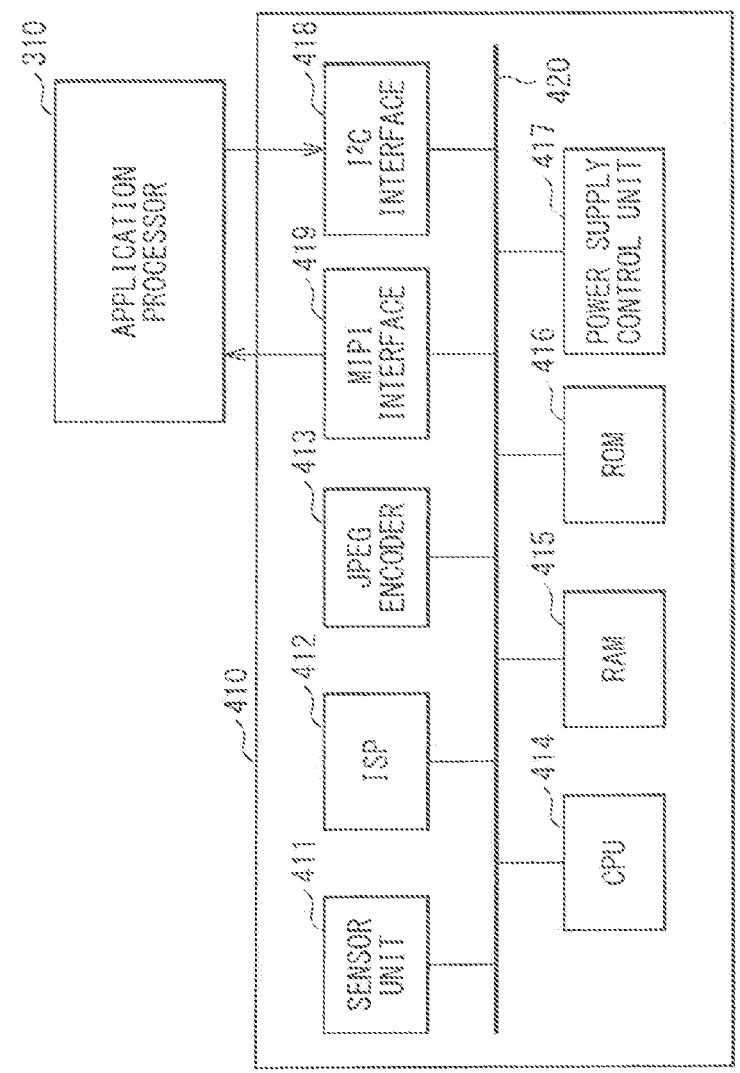
[ FIG. 43 ]

[FIG. 44]
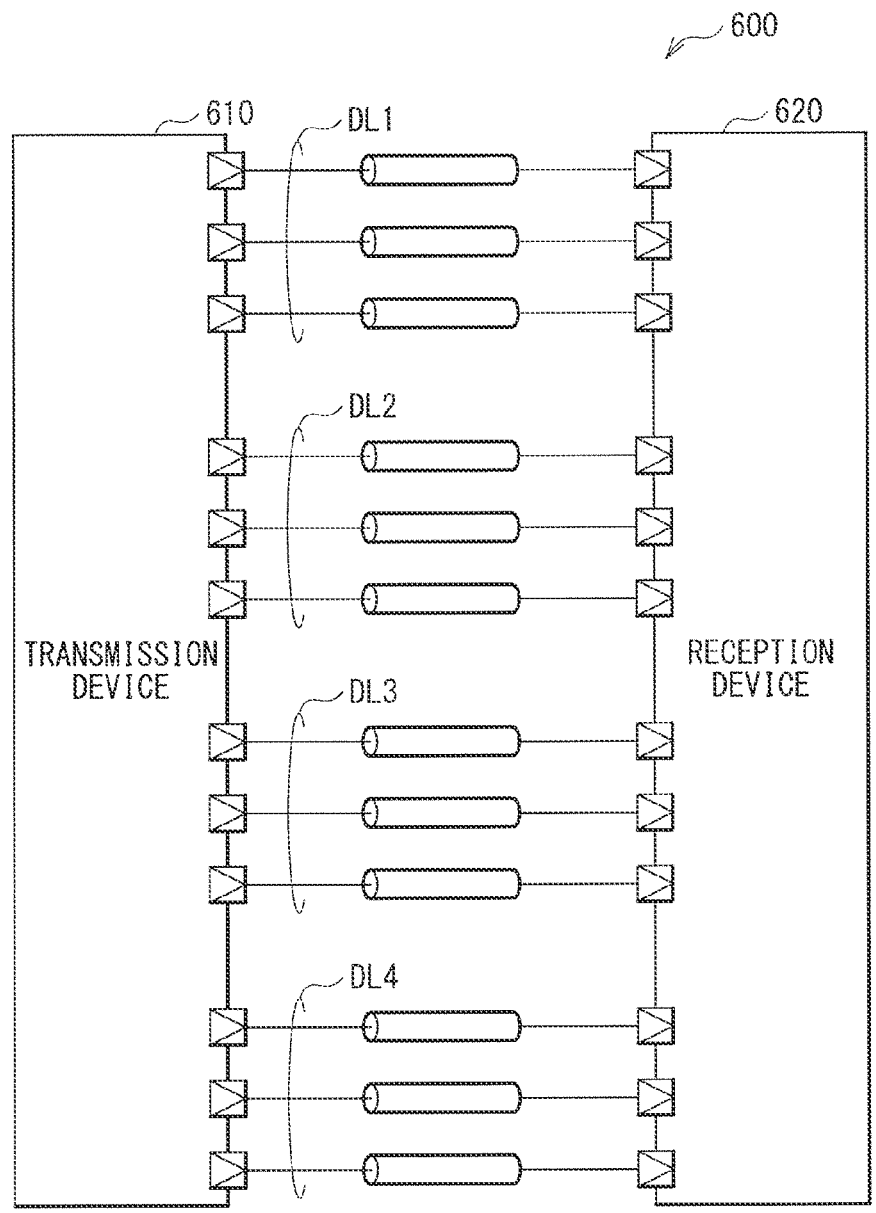

TRANSMISSION DEVICE, RECEPTION DEVICE, AND COMMUNICATION SYSTEM

CROSS REFERENCES TO RELATED APPLICATIONS

The present application is a Continuation Application of U.S. patent application Ser. No. 15/523,768 filed May 2, 2017, which is a 371 National Stage Entry of International Application No.: PCT/JP2015/080516, filed on Oct. 29, 2015, which in turn claims priority from Japanese Application No. 2014-249340, filed on Dec. 9, 2014, the entire contents of which are incorporated herein by reference.

TECHNICAL FIELD

The disclosure relates to a transmission device that performs signal transmission, a reception device that performs signal reception, and a communication system that performs signal transmission and reception.

BACKGROUND ART

With higher functionalization and multifunctionalization of electronic apparatuses in recent years, the electronic apparatuses are equipped with various devices such as semiconductor chips, sensors, and display devices. Among these devices, data exchange is performed in a large amount. The amount of data has been increasing in accordance with the higher functionalization and the multifunctionalization of the electronic apparatuses. Accordingly, the data exchange is often carried out with utilization of a high-speed interface that is able to transmit and receive data at a speed of, for example, several Gbps.

Regarding methods of increasing transmission capacity even more, various techniques have been disclosed. For example, PTLs 1 and 2 disclose communication systems in which data exchange is carried out with utilization of three signals each having three voltage levels.

CITATION LIST

Patent Literature

PTL 1: Japanese Unexamined Patent Application Publication (Translation of PCT Application) No. 2011-517159
PTL 2: Japanese Unexamined Patent Application Publication (Translation of PCT Application) No. 2010-520715

SUMMARY OF THE INVENTION

As described, in the communication system, larger transmission capacity is desired, with expectation of a further increase in the transmission capacity.

It is therefore desirable to provide a transmission device, a reception device, and a communication system that make it possible to increase transmission capacity.

A first transmission device according to an embodiment of the disclosure includes a generator unit, an output control unit, and a driver unit. The generator unit generates, on the basis of a control signal, a transmission symbol signal that indicates a sequence of transmission symbols. The output control unit generates an output control signal on the basis of the transmission symbol signal. The driver unit generates, on the basis of the output control signal, a first output signal, a second output signal, and a third output signal. The generator unit generates the transmission symbol signal on the basis of the control signal, to allow the first output signal, the second output signal, and the third output signal to exchange signal patterns with one another.

A second transmission device according to an embodiment of the disclosure includes a symbol generator unit and an output unit. The symbol generator unit generates a symbol signal on the basis of a transition signal that indicates a transition in a sequence of transmission symbols. The symbol generator unit is configured to be able to set the transmission symbol at a head of the sequence. The output unit generates, on the basis of the symbol signal, a first output signal, a second output signal, and a third output signal.

A reception device according to an embodiment of the disclosure includes a receiver unit and a processor unit. The receiver unit generates, on the basis of a first input signal, a second input signal, and a third input signal, a first symbol signal that indicates a sequence of symbols. The processor unit generates, as a second symbol, on the basis of a control signal and on a basis of the first symbol signal, the first symbol signal that would be generated on a condition that the first input signal, the second input signal, and the third input signal exchange signal patterns with one another.

A communication system according to an embodiment of the disclosure includes a transmission device and a reception device. The transmission device generates, on the basis of a control signal, a plurality of sets of three output signals. The reception device receives the plurality of sets of the output signals. The transmission device is configured to be able to allow, on the basis of the control signal, the three output signals to exchange signal patterns with one another, in each of the plurality of sets of the output signals.

In the first transmission device according to the embodiment of the disclosure, on the basis of the control signal, generated is the transmission symbol signal. On the basis of the transmission symbol signal, generated are the first output signal, the second output signal, and the third output signal. The transmission symbol signal is generated to allow the first output signal, the second output signal, and the third output signal to exchange the signal patterns with one another.

In the second transmission device according to the embodiment of the disclosure, in the symbol generator unit, the symbol signal is generated on the basis of the transition signal that indicates the transition in the sequence of the transmission symbols. In the output unit, on the basis of the symbol signal, generated are the first output signal, the second output signal, and the third output signal. The symbol generator unit is configured to be able to set the transmission symbol at the head of the sequence of the transmission symbols.

In the reception device according to the embodiment of the disclosure, the first symbol signal is generated on the basis of the first input signal, the second input signal, and the third input signal. On the basis of the first symbol signal and on the basis of the control signal, generated is the second symbol signal. At this occasion, as the second symbol signal, generated is the first symbol signal that would be generated on the condition that the first input signal, the second input signal, and the third input signal exchange the signal patterns with one another.

In the communication system according to the embodiment of the disclosure, the plurality of sets of the transmission signals are generated, and transmitted from the transmission device to the reception device. At this occasion, the transmission device is configured to be able to allow, on the basis of the control signal, the three output signals to exchange the signal patterns with one another, in each set.

According to the first transmission device of the embodiment of the disclosure, the first transmission symbol is generated to allow the first output signal, the second output signal, and the third output signal to exchange the signal patterns with one another. Hence, it is possible to increase the transmission capacity.

According to the second transmission device of the embodiment of the disclosure, the configuration is so made as to be able to set the transmission symbol at the head of the sequence. Hence, it is possible to increase the transmission capacity.

According to the reception device of the embodiment of the disclosure, as the second symbol signal, generated is the first symbol signal that would be generated on the condition that the first input signal, the second input signal, and the third input signal exchange the signal patterns with one another. Hence, it is possible to increase the transmission capacity.

According to the communication system of the embodiment of the disclosure, the configuration is so made as to be able to allow, on the basis of the control signal, the three output signal to exchange the signal patterns with one another, in each set. Hence, it is possible to increase the transmission capacity.

It is to be noted that effects of the disclosure are not necessarily limited to the effects described above, and may include any of effects that are described herein.

BRIEF DESCRIPTION OF DRAWING

FIG. 1 is a block diagram that illustrates one configuration example of a communication system according to one example embodiment of the disclosure.

FIG. 2 is a descriptive diagram that illustrates voltage states of signals transmitted and received by the communication system illustrated in FIG. 1.

FIG. 3 is a block diagram that illustrates one configuration example of a transmission device according to a first embodiment.

FIG. 4 is a descriptive diagram that illustrates transitions of symbols.

FIG. 5 is a block diagram that illustrates one configuration example of a transmission symbol generator unit illustrated in FIG. 3.

FIG. 6 is a table that summarizes one operation example of the transmission symbol generator unit illustrated in FIG. 3.

FIG. 7A is a block diagram that illustrates one configuration example of another communication system that utilizes the transmission device illustrated in FIG. 3.

FIG. 7B is a block diagram that illustrates one configuration example of another communication system that utilizes the transmission device illustrated in FIG. 3.

FIG. 7C is a block diagram that illustrates one configuration example of another communication system that utilizes the transmission device illustrated in FIG. 3.

FIG. 7D is a block diagram that illustrates one configuration example of another communication system that utilizes the transmission device illustrated in FIG. 3.

FIG. 7E is a block diagram that illustrates one configuration example of another communication system that utilizes the transmission device illustrated in FIG. 3.

FIG. 8 is a block diagram that illustrates one configuration example of a mode processor unit illustrated in FIG. 3.

FIG. 9 is a table that summarizes one operation example of the mode processor unit illustrated in FIG. 3.

FIG. 10 is a timing waveform chart that illustrates one operation example of serializers illustrated in FIG. 3.

FIG. 11 is a table that summarizes one operation example of the transmission device illustrated in FIG. 3.

FIG. 12 is a block diagram that illustrates one configuration example of a reception device illustrated in FIG. 1.

FIG. 13 is a descriptive diagram that illustrates one example of reception operation of the reception device illustrated in FIG. 12.

FIG. 14 is another table that summarizes one operation example of the transmission device illustrated in FIG. 3.

FIG. 15 is a table that summarizes one operation example of the communication system.

FIG. 16 is a block diagram that illustrates one configuration example of a transmission device according to a modification example of the first embodiment.

FIG. 17 is a table that summarizes one operation example of a mode processor unit illustrated in FIG. 16.

FIG. 18 is a block diagram that illustrates one configuration example of a main part of a transmission device according to another modification example of the first embodiment.

FIG. 19 is a block diagram that illustrates one configuration example of a reception device according to another modification example of the first embodiment.

FIG. 20 is a table that summarizes one operation example of a mode processor unit illustrated in FIG. 19.

FIG. 21 is a table that summarizes one operation example of the reception device illustrated in FIG. 19.

FIG. 22 is a block diagram that illustrates one configuration example of a communication system according to another modification example of the first embodiment.

FIG. 23 is a block diagram that illustrates one configuration example of a communication system according to another modification example of the first embodiment.

FIG. 24 is a block diagram that illustrates one configuration example of a transmission device according to a second embodiment.

FIG. 25 is a block diagram that illustrates one configuration example of a mode processor unit illustrated in FIG. 24.

FIG. 26 is a block diagram that illustrates one configuration example of a transmission symbol generator unit illustrated in FIG. 24.

FIG. 27 is a table that summarizes one operation example of the mode processor unit and the transmission symbol generator unit that are illustrated in FIG. 24.

FIG. 28 is another block diagram that illustrates one configuration example of the transmission device according to the second embodiment.

FIG. 29 is a block diagram that illustrates one configuration example of a mode processor unit illustrated in FIG. 28.

FIG. 30 is a table that summarizes one operation example of the mode processor unit and a transmission symbol generator unit that are illustrated in FIG. 28.

FIG. 31A is a table that summarizes another operation example of the mode processor unit and the transmission symbol generator unit that are illustrated in FIG. 28.

FIG. 31B is a table that summarizes another operation example of the mode processor unit and the transmission symbol generator unit that are illustrated in FIG. 28.

FIG. 32 is a table that summarizes one operation example of the communication system.

FIG. 33 is a table that summarizes another operation example of the communication system.

FIG. 34 is a table that summarizes another operation example of the communication system.

FIG. 35A is a descriptive diagram that illustrates the transitions of the symbols.

FIG. 35B is a descriptive diagram that illustrates the transitions of the symbols.

FIG. 35C is a descriptive diagram that illustrates the transitions of the symbols.

FIG. 35D is a descriptive diagram that illustrates the transitions of the symbols.

FIG. 36 is a table that summarizes another operation example of the communication system.

FIG. 37 is a table that summarizes another operation example of the communication system.

FIG. 38A is a descriptive diagram that illustrates the transitions of the symbols.

FIG. 38B is a descriptive diagram that illustrates the transitions of the symbols.

FIG. 38C is a descriptive diagram that illustrates the transitions of the symbols.

FIG. 38D is a descriptive diagram that illustrates the transitions of the symbols.

FIG. 39 is a table that summarizes another operation example of the communication system.

FIG. 40 is a table that summarizes another operation example of the communication system.

FIG. 41 is a perspective view of an external appearance and a configuration of a smartphone to which the communication system according to the example embodiment is applied.

FIG. 42 is a block diagram that illustrates one configuration example of an application processor to which the communication system according to the example embodiment is applied.

FIG. 43 is a block diagram that illustrates one configuration example of an image sensor to which the communication system according to the example embodiment is applied.

FIG. 44 is a block diagram that illustrates an example of a communication system with four sets of three signals.

MODES FOR CARRYING OUT THE INVENTION

In the following, some embodiments of the disclosure are described in detail with reference to the drawings. It is to be noted that description is made in the following order.
1. First Embodiment
2. Second Embodiment
3. Application Example

1. FIRST EMBODIMENT

Configuration Example

FIG. 1 illustrates one configuration example of a communication system (a communication system 1) to which a transmission device according to a first embodiment is applied. The communication system 1 may perform communication with utilization of a signal having three voltage levels.

The communication system 1 includes a transmission device 10 and a reception device 50. The transmission device 10 may include three output terminals P0 to P2. The reception device 50 may include three input terminals PA to PC. Moreover, the output terminal P0 of the transmission device 10 and the input terminal PA of the reception device 50 may be coupled to each other through a transmission path 100. The output terminal P1 of the transmission device 10 and the input terminal PB of the reception device 50 may be coupled to each other through a transmission path 101. The output terminal P2 of the transmission device 10 and the input terminal PC of the reception device 50 may be coupled to each other through a transmission path 102. The transmission device 10 may output a signal SIG0 from the output terminal P0, output a signal SIG1 from the output terminal P1, and output a signal SIG2 from the output terminal P2. Moreover, the reception device 50 may receive the signal SIG0 through the input terminal PA, receive the signal SIG1 through the input terminal PB, and receive the signal SIG2 through the input terminal PB. Characteristic impedance of the transmission paths 100 to 102 that transmit the signals may be 50 [Ω] in this example. The signals SIG0, SIG1, and SIG2 may each make transitions among the three voltage levels (a high level voltage VH, a medium level voltage VM, and a low level voltage VL). The transmission device 10 may be configured to be able to transmit the signals to the various reception devices 50 that differ in the order of the input terminals PA to PC, as described later.

FIG. 2 illustrates voltage states of the signals SIG0, SIG1, and SIG2 when the transmission device 10 and the reception device 50 are coupled as illustrated in FIG. 1. The transmission device 10 may transmit six symbols "+x", "−x", "+y", "−y", "+z", and "−z" with utilization of the three signals SIG0, SIG1, and SIG2. For example, in a case of the transmission of the symbol "+x", the transmission device 10 may allow the signal SIG0 to be the high level voltage VH, allow the signal SIG1 to be the low level voltage VL, and allow the signal SIG2 to be the medium level voltage VM. In a case of the transmission of the symbol "−x", the transmission device 10 may allow the signal SIG0 to be the low level voltage VL, allow the signal SIG1 to be the high level voltage VH, and allow the signal SIG2 to be the medium level voltage VM. In a case of the transmission of the symbol "+y", the transmission device 10 may allow the signal SIG0 to be the medium level voltage VM, allow the signal SIG1 to be the high level voltage VH, and allow the signal SIG2 to be the low level voltage VL. In a case of the transmission of the symbol "−y", the transmission device 10 may allow the signal SIG0 to be the medium level voltage VM, allow the signal SIG1 to be the low level voltage VL, and allow the signal SIG2 to be the high level voltage VH. In a case of the transmission of the symbol "+z", the transmission device 10 may allow the signal SIG0 to be the low level voltage VL, allow the signal SIG1 to be the medium level voltage VM, and allow the signal SIG2 to be the high level voltage VH. In a case of the transmission of the symbol "−z", the transmission device 10 may allow the signal SIG0 to be the high level voltage VH, allow the signal SIG1 to be the medium level voltage VM, and allow the signal SIG2 to be the low level voltage VL.

FIG. 3 illustrates one configuration example of the transmission device 10. The transmission device 10 may include a clock generator unit 17, a divider circuit 18, a transition signal generator unit 20, a transmission symbol generator unit 30, a mode setting unit 19, a mode processor unit 40, serializers 11 to 13, an output control unit 14, pre-driver units 150 to 152, and driver units 160 to 162.

The clock generator unit 17 may generate a clock TxCK. A frequency of the clock TxCK may be, for example, about 2 [GHz]. The clock generator unit 17 may be constituted by, for example, a PLL (Phase Locked Loop), and generate the clock TxCK on the basis of a reference clock (not illustrated) supplied from, for example, outside of the transmission device 10. Moreover, the clock generator unit 17 may supply the clock TxCK to the divider circuit 18, the serializers 11 to 13, and the output control unit 14.

The divider circuit 18 may perform division operation on the basis of the clock TxCK, to generate a clock CK. The divider circuit 18 may perform, in this example, the division operation by seven. In other words, a frequency of the clock CK may be, in this example, about 285 [MHz] (=2 [GHz]/7). Moreover, the divider circuit 18 may supply the clock CK to the transition signal generator unit 20 and the transmission symbol generator unit 30.

The transition signal generator unit 20 may generate transition signals TxF0 to TxF6, TxR0 to TxR6, and TxP0 to TxP6, on the basis of an inputted signal and the clock CK. Here, a single set of the transition signals TxF0, TxR0, and TxP0 may indicate a transition of a symbol in a sequence of symbols to be transmitted by the transmission device 10. Similarly, a single set of the transition signals TxF1, TxR1, and TxP1 may indicate the transition of the symbol. A single set of the transition signals TxF2, TxR2, and TxP2 may indicate the transition of the symbol. A single set of the transition signals TxF3, TxR3, and TxP3 may indicate the transition of the symbol. A single set of the transition signals TxF4, TxR4, and TxP4 may indicate the transition of the symbol. A single set of the transition signals TxF5, TxR5, and TxP5 may indicate the transition of the symbol. A single set of the transition signals TxF6, TxR6, and TxP6 may indicate the transition of the symbol. In other words, the transition signal generator unit 20 may generate seven sets of the transition signals. In the following, the term "transition signals TxF, TxR, and TxP" is utilized, as appropriate, to denote any one of the seven sets of the transition signals.

FIG. 4 illustrates relation between the transition signals TxF, TxR, and TxP, and the transitions of the symbol. A three-digit numerical value assigned to each of the transitions indicates values of the transition signals TxF, TxR, and TxP in the order named.

The transition signal TxF (Flip) may allow the symbol to make the transition between "+x" and "−x", allow the symbol to make the transition between "+y" and "−y", and allow the symbol to make the transition between "+z" and "−z". In one specific example, in a case in which the transition signal TxF is "1", the transition may be made so as to change polarity of the symbol (e.g., from "+x" to "−x"). In a case in which the transition signal TxF is "0", no such transition may be made.

The transition signals TxR (Rotation) and TxP (Polarity) may allow the symbol to make the transition between "+x" and other than "−x", between "+y" and other than "−y", or "+z" and other than "−z", in a case in which the transition signal TxF is "0". In one specific example, in a case in which the transition signals TxR and TxP are respectively "1" and "0", the transition may be made in a clockwise direction (e.g., from "+x" to "+y") in FIG. 4, with the polarity of the symbol being maintained. In a case in which the transition signals TxR and TxP are respectively "1" and "1", the transition may be made in the clockwise direction (e.g., from "+x" to "−y") in FIG. 4, with the polarity of the symbol being changed. Moreover, in a case in which the transition signals TxR and TxP are respectively "0" and "0", the transition may be made in a counterclockwise direction (e.g., from "+x" to "+z") in FIG. 4, with the polarity of the symbol being maintained. In a case in which the transition signals TxR and TxP are respectively "0" and "1", the transition may be made in the counterclockwise direction (e.g., from "+x" to "−z") in FIG. 4, with the polarity of the symbol being changed.

The transition signal generator unit 20 may generate the seven sets of the transition signals TxF, TxR, and TxP as described. Moreover, the transition signal generator unit 20 may supply the seven sets of the transition signals TxF, TxR, and TxP (the transition signals TxF0 to TxF6, TxR0 to TxR6, and TxP0 to TxP6) to the transmission symbol generator unit 30.

The transmission symbol generator unit 30 may generate symbol signals Tx10 to Tx16, Tx20 to Tx26, and Tx30 to Tx36, on the basis of the transition signals TxF0 to TxF6, TxR0 to TxR6, and TxP0 to TxP6 and on the basis of the clock CK. Here, a single set of the symbol signals Tx10, Tx20, and Tx30 may indicate any one of the six symbols "+x", "−x", "+y", "−y", "+z", and "−z". Similarly, a single set of the symbol signals Tx11, Tx21, Tx31 may indicate any one of the six symbols. A single set of the symbol signals Tx12, Tx22, and Tx32 may indicate any one of the six symbols. A single set of the symbol signals Tx13, Tx23, and Tx33 may indicate any one of the six symbols. A single set of the symbol signals Tx14, Tx24, and Tx34 may indicate any one of the six symbols. A single set of the symbol signals Tx15, Tx25, and Tx35 may indicate any one of the six symbols. A single set of the symbol signals Tx16, Tx26, and Tx36 may indicate any one of the six symbols. In other words, the transmission symbol generator unit 30 may generate seven sets of the symbol signals, on the basis of the seven sets of the transition signals.

FIG. 5 illustrates one configuration example of the transmission symbol generator unit 30. The transmission symbol generator unit 30 may include seven signal generator units 31 to 37, and a flip flop (F/F) 38.

The signal generator unit 31 may generate the single set of the symbol signals Tx10, Tx20, and Tx30, on the basis of the single set of the transition signals TxF0, TxR0, and TxP0 and on the basis of a single set of symbol signals D16, D26, and D36. In one specific example, the signal generator unit 31 may obtain a symbol NS0 after the transition, as illustrated in FIG. 4, on the basis of a symbol NS7 indicated by the single set of the symbol signals D16, D26, and D36 and on the basis of the single set of the transition signals TxF0, TxR0, and TxP0. In other words, the single set of the transition signals TxF0, TxR0, and TxP0 may indicate the transition from the symbol NS7 to the symbol NS0. Moreover, the signal generator unit 31 may output the symbol NS0 generated, as the single set of the symbol signals Tx10, Tx20, and Tx30.

FIG. 6 illustrates one configuration example of the symbol signals Tx10, Tx20, and Tx30. In this example, the six symbols "+x", "−x", "+y", "−y", "+z", and "−z" may be associated, as summarized in FIG. 6, with the three-bit symbol signals Tx10, T20, and Tx30.

Similarly, the signal generator unit 32 may generate the single set of the symbol signals Tx11, Tx21, and Tx31 (a symbol NS1), on the basis of the single set of the transition signals TxF1, TxR1, and TxP1 and on the basis of the single set of the symbol signals Tx10, Tx20, and Tx30 (the symbol NS0). The signal generator unit 33 may generate the single set of the symbol signals Tx12, Tx22, and Tx32 (a symbol NS2), on the basis of the single set of the transition signals TxF2, TxR2, and TxP2 and on the basis of the single set of the symbol signals Tx11, Tx21, and Tx31 (the symbol NS1). The symbol generator unit 34 may generate the single set of the symbol signals Tx13, Tx23, and Tx33 (a symbol NS3), on the basis of the single set of the transition signals TxF3, TxR3, and TxP3 and on the basis of the single set of the symbol signals Tx12, Tx22, and Tx32 (the symbol NS2). The signal generator unit 35 may generate the single set of the symbol signals Tx14, Tx24, and Tx34 (a symbol NS4), on the basis of the single set of the transition signals TxF4, TxR4, and TxP4 and on the basis of the single set of the symbol signals Tx13, Tx23, and Tx33 (the symbol NS3). The signal generator unit 36 may generate the single set of the symbol signals Tx15, Tx25, and Tx35 (a symbol NS5), on the basis of the single set of the transition signals TxF5, TxR5, and TxP5 and on the basis of the single set of the symbol signals Tx14, Tx24, and Tx34 (the symbol NS4). The signal generator unit 37 may generate the single set of the symbol signals Tx16, Tx26, and Tx36 (a symbol NS6), on the basis of the single set of the transition signals TxF6, TxR6, and TxP6 and on the basis of the single set of the symbol signals Tx15, Tx25, and Tx35 (the symbol NS5). Thus, the signal generator units 31 to 37 may be sequentially coupled to one another.

The flip flop 38 may perform, on the basis of the clock CK, samplings of the single set of the symbol signals Tx16, Tx26, and Tx36, and output results of the samplings as the single set of the symbol signals D16, D26, and D36, respectively. In other words, the flip flop 38 may allow the symbol NS6 indicated by the single set of the symbol signals Tx16, Tx26, and Tx36 to be delayed by a term of one clock of the clock CK, to output the resultant symbol as the single set of the symbol signals D16, D26, and D36 (a symbol NS7).

With this configuration, in the transmission symbol generator unit 30, in a certain term of cycles of the clock CK, the signal generator units 31 to 37 may sequentially generate the symbols NS0 to NS6. Moreover, the flip flop 38 may supply the symbol NS6 generated by the signal generator unit 37, in a next term of the cycles, as the symbol NS7, to the signal generator unit 31.

The mode setting unit 19 (FIG. 3) may supply a mode signal Smode to the mode processor unit 40, to set an operation mode of the transmission device 10.

The mode processor unit 40 may generate symbol signals Tx110 to Tx116, Tx120 to Tx126, and Tx130 to Tx136, on the basis of the mode signal Smode and on the basis of the symbol signals Tx10 to Tx16, Tx20 to Tx26, and Tx30 to Tx36. In one specific example, the mode processor unit 40 may generate the symbol signals Tx110 to Tx116, Tx120 to Tx126, and Tx130 to Tx136, to allow the signals SIG0, SIG1, and SIG2 to exchange signal patterns with one another in accordance with the mode signal Smode.

In other words, since the transmission device 10 and the reception device 50 may be supplied by various vendors, there may be a case in which the order of the output terminals P0 to P2 and the order of the input terminals PA to PC do not correspond to each other in this order. Moreover, for example, in a case in which the transmission device 10 is mounted on a front surface of a printed circuit board while the reception device 50 is mounted on a rear surface of the printed circuit board, there may be a case in which the order of the output terminals P0 to P2 and the order of the input terminals PA to PC do not correspond to each other in this order. Accordingly, in the communication system 1, the mode processor unit 40 may generate the symbol signals Tx110 to Tx116, Tx120 to Tx126, and Tx130 to Tx136, on the basis of the symbol signals Tx10 to Tx16, Tx20 to Tx26, and Tx30 to Tx36, to allow the signals SIG0, SIG1, and SIG2 to exchange the signal patterns with one another. In this way, in the communication system 1, it is possible to perform signal transmission, regardless of the order of the input terminals PA to PC of the reception device 50, without crossing of wirings between the transmission device 10 and the reception device 50.

The mode setting unit 19 may be so constituted that the mode setting unit 19 includes, for example, a resistor. The mode setting unit 19 may set the operation modes M1 to M6 of the mode processor unit 40, on the basis of an instruction from an undepicted controller.

The operation mode M1 may be a mode used in a case in which the input terminals of the reception device 50 are arranged in the order: the input terminals PA, PB, and PC (FIG. 1).

The operation mode M2 may be a mode used in a case in which the input terminals of the reception device 50 are arranged in the order: the input terminals PC, PA, and PB (FIG. 7A). In this case, the output terminal P0 of the transmission device 10 and the input terminal PC of the reception device 50 may be coupled to each other through the transmission path 100. The output terminal P1 of the transmission device 10 and the input terminal PA of the reception device 50 may be coupled to each other through the transmission path 101. The output terminal P2 of the transmission device 10 and the input terminal PB of the reception device 50 may be coupled to each other through the transmission path 102.

The operation mode M3 may be a mode used in a case in which the input terminals of the reception device 50 are arranged in the order: the input terminals PB, PC, and PA (FIG. 7B). In this case, the output terminal P0 of the transmission device 10 and the input terminal PB of the reception device 50 may be coupled to each other through the transmission path 100. The output terminal P1 of the transmission device 10 and the input terminal PC of the reception device 50 may be coupled to each other through the transmission path 101. The output terminal P2 of the transmission device 10 and the input terminal PA of the reception device 50 may be coupled to each other through the transmission path 102.

The operation mode M4 may be a mode used in a case in which the input terminals of the reception device 50 are arranged in the order: the input terminals PB, PA, and PC (FIG. 7C). In this case, the output terminal P0 of the transmission device 10 and the input terminal PB of the reception device 50 may be coupled to each other through the transmission path 100. The output terminal P1 of the transmission device 10 and the input terminal PA of the reception device 50 may be coupled to each other through the transmission path 101. The output terminal P2 of the transmission device 10 and the input terminal PC of the reception device 50 may be coupled to each other through the transmission path 102.

The operation mode M5 may be a mode used in a case in which the input terminals of the reception device 50 are arranged in the order: the input terminals PC, PB, and PA (FIG. 7D). In this case, the output terminal P0 of the transmission device 10 and the input terminal PC of the reception device 50 may be coupled to each other through the transmission path 100. The output terminal P1 of the transmission device 10 and the input terminal PB of the reception device 50 may be coupled to each other though the transmission path 101. The output terminal P2 of the transmission device 10 and the input terminal PA of the reception device 50 may be coupled to each other through the transmission path 102.

The operation mode M6 may be a mode used in a case in which the input terminals of the reception device 50 are arranged in the order: the input terminals PA, PC, and PB (FIG. 7E). In this case, the output terminal P0 of the transmission device 10 and the input terminal PA of the reception device 50 may be coupled to each other through the transmission path 100. The output terminal P1 of the transmission device 10 and the input terminal PC of the reception device 50 may be coupled to each other through the transmission path 101. The output terminal P2 of the transmission device 10 and the input terminal PB of the reception device 50 may be coupled to each other through the transmission path 102.

The mode setting unit 19 may transmit, with the use of the mode signal Smode, to the mode processor unit 40, an operation mode out of the operation modes M1 to M6 that corresponds to the coupling between the output terminals P0, P1, and P2 of the transmission device 10 and the input terminals PA, PB, and PC of the reception device 50.

FIG. 8 illustrates one configuration example of the mode processor unit 40. The mode processor unit 40 may include processor circuits 41 to 47. The processor circuit 41 may generate the symbol signals Tx110, Tx120, and Tx130 (the symbol NS10), on the basis of the symbol signals Tx10, Tx20, and Tx30 (the symbol NS0) and on the basis of the mode signal Smode. Similarly, the processor circuit 42 may generate the symbol signals Tx111, Tx121, and Tx131 (the symbol NS11), on the basis of the symbol signals Tx11, Tx21, and Tx31 (the symbol NS1) and on the basis of the mode signal Smode. The processor circuit 43 may generate the symbol signals Tx112, Tx122, and Tx132 (the symbol signal NS12), on the basis of the symbol signals Tx12, Tx22, and Tx32 (the symbol NS2) and on the basis of the mode signal Smode. The processor circuit 44 may generate the symbol signals Tx113, Tx123, and Tx133 (the symbol signal NS13), on the basis of the symbol signals Tx13, Tx23, and Tx33 (the symbol NS3) and on the basis of the mode signal Smode. The processor circuit 45 may generate the symbol signal Tx114, Tx124, and Tx134 (the symbol NS14), on the basis of the symbol signals Tx14, Tx24, and Tx34 (the symbol NS4) and on the basis of the mode signal Smode. The processor circuit 46 may generate the symbol signal Tx115, Tx125, and Tx135 (the symbol NS15), on the basis of the symbol signals Tx15, Tx25, and Tx35 (the symbol NS5) and on the basis of the mode signal Smode. The processor circuit 47 may generate the symbol signals Tx116, Tx126, and Tx136 (the symbol signal NS16), on the basis of the symbol signals Tx16, Tx26, and Tx36 (the symbol NS6) and on the basis of the mode signal Smode.

FIG. 9 illustrates one operation example of the processor circuit 41. In the operation mode M1, the processor circuit 41 may output the symbol signal Tx10 as the symbol signal Tx110, output the symbol signal Tx20 as the symbol signal Tx120, and output the symbol signal Tx30 as the symbol signal Tx130. Moreover, in the operation mode M2, the processor circuit 41 may output the symbol signal Tx30 as the symbol signal Tx110, output the symbol signal Tx10 as the symbol signal Tx120, and output the symbol signal Tx20 as the symbol signal Tx130. Furthermore, in the operation mode M3, the processor circuit 41 may output the symbol signal Tx20 as the symbol signal Tx110, output the symbol signal Tx30 as the symbol signal Tx120, and output the symbol signal Tx10 as the symbol signal Tx130. In addition, in the operation mode M4, the processor circuit 41 may output an inverted signal of the symbol signal Tx10 as the symbol signal Tx110, output an inverted signal of the symbol signal Tx30 as the symbol signal Tx120, and output an inverted signal of the symbol signal Tx20 as the symbol signal Tx130. Moreover, in the operation mode M5, the processor circuit 41 may output the inverted signal of the symbol signal Tx20 as the symbol signal Tx110, output the inverted signal of the symbol signal Tx10 as the symbol signal Tx120, and output the inverted signal of the symbol signal Tx30 as the symbol signal Tx130. Furthermore, in the operation mode M6, the processor circuit 41 may output the inverted signal of the symbol signal Tx30 as the symbol signal Tx110, output the inverted signal of the symbol signal Tx20 as the symbol signal Tx120, and output the inverted signal of the symbol signal Tx10 as the symbol signal Tx130.

As described, in the operation modes M1 to M3, the processor circuit 41 may rearrange the symbol signals Tx10, Tx20, and Tx30, to generate the symbol signals Tx110, Tx120, and Tx130. Moreover, in the operation modes M4 and M6, the processor circuit 41 may rearrange the inverted signal of the symbol signal Tx10, the inverted signal of the symbol signal Tx20, and the inverted signal of the symbol signal Tx30, to generate the symbol signals Tx110, Tx120, and Tx130.

It is to be noted in this example, description is made with the operation of the processor circuit 41 given as an example, but the same may apply to the processor circuits 42 to 47.

The serializer 11 (FIG. 3) may serialize the symbol signals Tx110 to Tx116 in the order named, on the basis of the symbol signals Tx110 to Tx116 and on the basis of the clock TxCK, to generate a symbol signal Tx1. The serializer 12 may serialize the symbol signals Tx120 to Tx126 in the order named, on the basis of the symbol signals Tx120 to Tx126 and on the basis of the clock TxCK, to generate a symbol signal Tx2. The serializer 13 may serialize the symbol signals Tx130 to Tx136 in the order named, on the basis of the symbol signals Tx130 to Tx136 and on the basis of the clock TxCK, to generate a symbol signal Tx3.

FIG. 10 illustrates operation of the serializers 11 to 13, with (A) indicating a waveform of the symbol signal Tx1, with (B) indicating a waveform of the symbol signal Tx2, and with (C) indicating a waveform of the symbol signal Tx3. The serializer 11 may repeatedly output the symbol signals Tx110 to Tx116 in this order. The serializer 12 may repeatedly output the symbol signals Tx120 to Tx126 in this order. The serializer 13 may repeatedly output the symbol signals Tx130 to Tx136 in this order. Thus, the serializers 11 to 13 may repeatedly output the symbols NS10 to NS16 in this order.

The output control unit 14 may generate six signals PU0, PD0, PU1, PD1, PU2, and PD2, on the basis of the symbol signals Tx1, Tx2, and Tx3 and on the basis of the clock TxCK. Moreover, the output control unit 14 may supply the signals PU0 and PD0 to the pre-driver unit 150, supply the signals PU1 and PD1 to the pre-driver unit 151, and supply the signals PU2 and PD2 to the pre-driver unit 152.

The pre-driver unit 150 may drive the driver unit 160 on the basis of the signals PU0 and PD0. The pre-driver unit 151 may drive the driver unit 161 on the basis of the signals PU1 and PD1. The pre-driver unit 152 may drive the driver unit 162 on the basis of the signals PU2 and PD2.

The pre-driver unit 150 may include pre-driver circuits DU and DD. The pre-driver circuit DU may drive a transistor MU (described later) of the driver unit 160 on the basis of the signal PU0. The pre-driver circuit DD may drive a transistor MD (described later) of the driver unit 160 on the basis of the signal PD0. The same may apply to the pre-driver units 151 and 152.

The driver unit 160 may generate the signal SIG0. The driver unit 161 may generate the signal SIG1. The driver unit 162 may generate the signal SIG2.

The driver unit 160 may include the transistors MU and MD, and resistors RU and RD. The transistors MU and MD may be N-channel MOS (Metal Oxide Semiconductor) FETs (Field Effect Transistors). The transistor MU may include a drain supplied with a power supply voltage VDD, a gate supplied with an output signal of the pre-driver circuit DU of the pre-driver unit 150, and a source coupled to one end of the resistor RU. The transistor MD may include a drain coupled to one end of the resistor RD, a gate supplied with an output signal of the pre-driver circuit DD of the pre-driver unit 150, and a source that is grounded. The resistors RU and RD may function as terminators, and be 50 [Ω] each in this example. The resistor RU may have the one end coupled to the source of the transistor MU, and another end coupled to another end of the resistor RD and coupled to an output terminal P0. The resistor RD may have the one end coupled to the drain of the transistor MD, and the other end coupled to the other end of the resistor RU and coupled to the output terminal P0. The same may apply to the driver units 161 and 162.

With this configuration, the output control unit 14, the pre-driver units 150 to 152, and the driver units 160 to 162 may set, on the basis of the symbol signals Tx1 to Tx3, voltages of the output terminals P0 to P2 as the respectively different three voltages (the high level voltage VH, the medium level voltage VM, and the low level voltage VL).

FIG. 11 illustrates one operation example of the transmission device 10. For example, in a case in which the symbol signals Tx1, Tx2, and Tx3 are "100", the output control unit 14 may allow the signals PU0, PD0, PU1, PD1, PU2, and PD2 to be "100100". Accordingly, in the driver unit 160, the transistor MU may be turned on, while the transistor MD may be turned off. This causes the voltage (the signal SIG0) of the output terminal P0 to be set as the high level voltage VH. Moreover, in the driver unit 161, the transistor MU may be turned off, while the transistor MD may be turned on. This causes the voltage (the signal SIG1) of the output terminal P1 to be set as the low level voltage VL. Furthermore, in the driver unit 162, the transistors MU and MD may both be turned off. This causes the voltage (the signal SIG2) of the output terminal P2 to be set as the medium level voltage VM, by resistors MA to 51C of the reception device 50 described below.

FIG. 12 illustrates one configuration example of the reception device 50. The reception device 50 may include the resistors 51A, 51B, and 51C, amplifiers 52A, 52B, and 52C, a clock generator unit 53, flip flops 54 and 55, and a signal generator unit 56.

The resistors 51A, 51B, and 51C may function as terminators in the communication system 1. The resistor 51A may include one end coupled to the input terminal PA, and another end coupled to another end of the resistor 51B and another end of the resistor 51C. The resistor 51B may include one end coupled to the input terminal PB, and the other end coupled to the other ends of the resistors 51A and 51C. The resistor 51C may include one end coupled to the input terminal PC, and the other end coupled to the other ends of the resistors 51A and 51B.

The amplifiers 52A, 52B, and 52C may each output a signal corresponding to a difference between a signal at a positive input terminal and a signal at a negative input terminal. The amplifier 52A may include the positive input terminal that is coupled to the negative input terminal of the amplifier 52C and coupled to the one end of the resistor 51A, and the negative input terminal that is coupled to the positive input terminal of the amplifier 52B and coupled to the one end of the resistor 51B. The amplifier 52B may include the positive input terminal that is coupled to the negative input terminal of the amplifier 52A and coupled to the one end of the resistor 51B, and the negative input terminal that is coupled to the positive input terminal of the amplifier 52C and coupled to the one end of the resistor 51C. The amplifier 52C may include the positive input terminal that is coupled to the negative input terminal of the amplifier 52B and coupled to the one end of the resistor 51C, and the negative input terminal that is coupled to the positive input terminal of the amplifier 52A and coupled to the resistor 51A.

With this configuration, the amplifier 52A may output the signal corresponding to the difference between the signal received by the input terminal PA and the signal received by the input terminal PB. The amplifier 52B may output the signal corresponding to the difference between the signal received by the input terminal PB and the signal received by the input terminal PC. The amplifier 52C may output the signal corresponding to the difference between the signal received by the input terminal PC and the signal received by the input terminal PA.

FIG. 13 may illustrate one operation example of the amplifiers 52A, 52B, and 52C. In this example, the signal received by the input terminal PA may be the high level voltage VH, while the signal received by the input terminal PB may be the low level voltage VL. At this occasion, the voltage of the input terminal PC may be set as the medium level voltage VM by the resistors 51A to 51C. In this case, a current Iin may flow through the input terminal PA, the resistor 51A, the resistor 51B, and the input terminal PB in the order named. Moreover, the positive input terminal of the amplifier 52A may be supplied with the high level voltage VH, while the negative input terminal may be supplied with the low level voltage VL, causing the difference to be positive. Accordingly, the amplifier 52A may output "1". Moreover, the positive input terminal of the amplifier 52B may be supplied with the low level voltage VL, while the negative input terminal may be supplied with the medium level voltage VM, causing the difference to be negative. Accordingly, the amplifier 52B may output "0". Furthermore, the positive input terminal of the amplifier 52C may be supplied with the medium level voltage VM, while the negative input terminal may be supplied with the high level voltage VH, causing the difference to be negative. Accordingly, the amplifier 52C may output "0".

The clock generator unit 53 may generate a clock RxCK on the basis of the output signals of the amplifiers 52A, 52B, and 52C.

The flip flop 54 may allow the output signals of the amplifiers 52A, 52B, and 52C to be delayed by a term of one clock of the clock RxCK, and output the respective resultant signals. The output signals of the flip flop 54 may indicate a symbol RS. Here, the symbol RS may indicate any one of the six symbols "+x", "−x", "+y", "−y", "+z", and "−z", as with the symbols NS0 to NS6.

The flip flop 55 may allow the three output signals of the flip flop 54 to be delayed by the term of one clock of the clock RxCK, and output the respective resultant signals. In other words, the flip flop 55 may allow the symbol RS to be delayed by the term of one clock of the clock RxCK, to generate a symbol RS2. The symbol RS2 may be a precedingly received symbol, and indicate any one of the six symbols "+x", "−x", "+y", "−y", "+z", and "−z", as with the symbol RS.

The signal generator unit 56 may generate transition signals RxF, RxR, and RxP, on the basis of the output signals of the flip flops 54 and 55 and on the basis of the clock RxCK. The transition signals RxF, RxR, and RxP may respectively correspond to the transition signals TxF, TxR, and TxP in the transmission device 10, and indicate the transitions of the symbol. The signal generator unit 56 may identify the transition of the symbol (FIG. 4) on the basis of the symbol RS indicated by the output signals of the flip flop 54 and on the basis of the preceding symbol RS2 indicated by the output signals of the flip flop 55, to generate the transition signals RxF, RxR, and RxP.

Here, the transition signal generator unit 20, the transmission symbol generator unit 30, the mode processor unit 40, and the serializers 11 to 13 correspond to one specific example of a "generator unit" in the disclosure. The mode processor unit 40 corresponds to one specific example of a "processor unit" in the disclosure. The transmission symbol generator unit 30 corresponds to one specific example of a "symbol generator unit" in the disclosure. The symbol signals Tx1, Tx2, and Tx3 correspond to one specific example of a "transmission symbol signal" in the disclosure. The signals PU0, PD0, PU1, PD1, PU2, and PD2 correspond to one specific example of an "output control signal" in the disclosure.

[Operation and Workings]

Description is given next of operation and workings of the communication system 1 according to this embodiment.

[Outline of Overall Operation]

First, description is given on an outline of overall operation of the communication system 1 with reference to FIGS. 3 and 12, and other figures. In the transmission device 10 (FIG. 3), the clock generator unit 17 may generate the clock TxCK. The divider circuit 18 may perform the division operation on the basis of the clock TxCK, to generate the clock CK. The transition signal generator unit 20 may generate the transition signals TxF0 to TxF6, TxR0 to TxR6, and TxP0 to TxP6, on the basis of the inputted signal and on the basis of the clock CK. The transmission symbol generator unit 30 may generate the symbol signals Tx10 to Tx16, Tx20 to Tx26, and Tx30 to Tx36, on the basis of the transition signals TxF0 to TxF6, TxR0 to TxR6, and TxP0 to TxP6 and on the basis of the clock CK. The mode setting unit 19 may supply the mode signal Smode to the mode processor unit 40, to set the operation mode of the transmission device 10. The mode processor unit 40 may generate the symbol signals Tx110 to Tx116, Tx120 to Tx126, and Tx130 to Tx136, on the basis of the mode signal Smode and on the basis of the symbol signals Tx10 to Tx16, Tx20 to Tx26, and Tx30 to Tx36. The serializer 11 may serialize the symbol signals Tx110 to Tx116 in this order, on the basis of the symbol signals Tx110 to Tx116 and on the basis of the clock TxCK, to generate the symbol signal Tx1. The serializer 12 may serialize the symbol signals Tx120 to Tx126 in this order, on the basis of the symbol signals Tx120 to Tx126 and on the basis of the clock TxCK, to generate the symbol signal Tx2. The serializer 13 may serialize the symbol signals Tx130 to Tx136 in this order, on the basis of the symbol signals Tx130 to Tx136 and on the basis of the clock TxCK, to generate the symbol signal Tx3. The output control unit 14 may generate the six signals PU0, PD0, PU1, PD1, PU2, and PD2 on the basis of the symbol signals Tx1, Tx2, and Tx3 and on the basis of the clock TxCK. The pre-driver unit 150 may drive the driver unit 160 on the basis of the signals PU0 and PD0. The driver unit 160 may generate the signal SIG0. The pre-driver unit 151 may drive the driver unit 161 on the basis of the signals PU1 and PD1. The driver unit 161 may generate the signal SIG1. The pre-driver unit 152 may drive the driver unit 162 on the basis of the signals PU2 and PD2. The driver unit 162 may generate the signal SIG2.

In the reception device 50 (FIG. 12), the amplifier 52A may output the signal corresponding to the difference between the signal received by the input terminal PA and the signal received by the input terminal PB. The amplifier 52B may output the signal corresponding to the difference between the signal received by the input terminal PB and the signal received by the input terminal PC. The amplifier 52C may output the signal corresponding to the difference between the signal received by the input terminal PC and the signal received by the input terminal PA. The clock generator unit 53 may generate the clock RxCK on the basis of the output signals of the amplifiers 52A, 52B, and 52C. The flip flop 54 may allow the output signals of the amplifiers 52A, 52B, and 52C to be delayed by the term of one clock of the clock RxCK, and output the respective resultant signals. The flip flop 55 may allow the three output signals of the flip flop 54 to be delayed by the term of one clock of the clock RxCK, and output the respective resultant signals. The signal generator unit 56 may generate the transition signals RxF, RxR, and RxP on the basis of the output signals of the flip flops 54 and 55 and on the basis of the clock RxCK.

[Detailed Operation of Transmission Symbol Generator Unit 30]

The transmission symbol generator unit 30 (FIG. 5) may generate the symbol signals Tx10 to Tx16, Tx20 to Tx26, and Tx30 to Tx36, on the basis of the transition signals TxF0 to TxF6, TxR0 to TxR6, and TxP0 to TxP6 and on the basis of the clock CK. In the following, detailed description is given on this operation.

In the transmission symbol generator unit 30, first, the signal generator unit 31 may generate the single set of the symbol signals Tx10, Tx20, and Tx30 (the symbol NS0), on the basis of the single set of the transition signals TxF0, TxR0, and TxP0 and on the basis of the single set of the symbol signals D16, D26, and D36 (the symbol NS6 in the preceding term of the cycles of the clock CK). The signal generator unit 32 may generate the single set of the symbol signals Tx11, Tx21, and Tx31 (the symbol NS1), on the basis of the single set of the transition signals TxF1, TxR1, and TxP1 and on the basis of the single set of the symbol signals Tx10, Tx20, and Tx30 (the symbol NS0). The signal generator unit 33 may generate the single set of the symbol signals Tx12, Tx22, and Tx32 (the symbol NS2), on the basis of the single set of the transition signals TxF2, TxR2, and TxP2 and on the basis of the single set of the symbol signals Tx11, Tx21, and Tx31 (the symbol NS1). The signal generator unit 34 may generate the single set of the symbol signals Tx13, Tx23, and Tx33 (the symbol NS3), on the basis of the single set of the transition signals TxF3, TxR3, and TxP3 and on the basis of the single set of the symbol signals Tx12, Tx22, and Tx32 (the symbol NS2). The signal generator unit 35 may generate the single set of the symbol signals Tx14, Tx24, and Tx34 (the symbol NS4), on the basis of the single set of the transition signals TxF4, TxR4, and TxP4 and on the basis of the single set of the symbol signals Tx13, Tx23, and Tx33 (the symbol NS3). The signal generator unit 36 may generate the single set of the symbol signals Tx15, Tx25, and Tx35 (the symbol NS5), on the basis of the single set of the transition signals TxF5, TxR5, and TxP5 and on the basis of the single set of the symbol signals Tx14, Tx24, and Tx34 (the symbol NS4). The signal generator unit 37 may generate the single set of the symbol signals Tx16, Tx26, and Tx36 (the symbol NS6), on the basis of the single set of the transition signals TxF6, TxR6, and TxP6 and on the basis of the single set of the symbol signals Tx15, Tx25, and Tx35 (the symbol NS5).

Moreover, the flip flop 38 may allow the single set of the symbol signals Tx16, Tx26, and Tx36 (the symbol NS6) to be delayed by the term of one clock of the clock CK, to output the resultant signals as the single set of the symbol signals D16, D26, and D36.

As described, in the transmission symbol generator unit 30, in a certain term of the cycles of the clock CK, the signal generator units 31 to 37 may sequentially generate the symbols NS0 to NS6. The flip flop 38 may supply the symbol NS6 generated by the signal generator unit 37 to the signal generator unit 31 in the next term of the cycles. In other words, the seven signal generator units 31 to 37 and the single flip flop 38 may constitute a loop, allowing these circuits to operate in each term of the cycles of the clock CK having a low frequency. Hence, in the transmission symbol generator unit 30, it is possible to reduce possibility of occurrence of erroneous operation, even in a case with the frequency of the clock CK (the clock TxCK) being high.

[Detailed Operation of Mode Processor Unit 40]

The mode processor unit 40 may generate the symbol signals Tx110 to Tx116, Tx120 to Tx126, and Tx130 to Tx136, on the basis of the mode signal Smode and on the basis of the symbol signals Tx10 to Tx16, Tx20 to Tx26, and Tx30 to Tx36. In one specific example, the mode processor unit 40 may generate the symbol signals Tx110 to Tx116, Tx120 to Tx126, and Tx130 to Tx136, to allow the signals SIG0, SIG1, and SIG2 to exchange the signal patterns with one another in accordance with the mode signal Smode.

As illustrated in FIG. 10, the serializer 11 may serialize the symbol signals Tx110 to Tx116 in this order, to generate the symbol signal Tx1. The serializer 12 may serialize the symbol signals Tx120 to Tx126 in this order, to generate the symbol signal Tx2. The serializer 13 may serialize the symbol signals Tx130 to Tx136 in this order, to generate the symbol signal Tx3. In one specific example, in a period PP (FIG. 10), the serializers 11, 12, and 13 may output the symbol signals Tx110, Tx120, and Tx130 outputted from the mode processor unit 40 (the processor circuit 41), respectively as the symbol signals Tx1, Tx2, and Tx3. The output control unit 14, the pre-drivers 150 to 152, and the drivers 160 to 162 may generate the signals SIG0, SIG1, and SIG2, on the basis of the symbol signals Tx1, Tx2, and Tx3.

FIG. 14 summarizes operation of the output control unit 14, the pre-drivers 150 to 152, and the drivers 160 to 162. FIG. 14 is an equivalent of FIG. 11, with "1" substituted for the high level voltage VH, with "0" substituted for the low level voltage VL, and with "½" substituted for the medium level voltage VM. In this case, the signals SIG0, SIG1, and SIG2 may be represented by the following expressions with use of the symbol signals Tx1, Tx2, and Tx3.

$SIG0=\{1+(Tx1-Tx3)\}/2$ $SIG1=\{1+(Tx2-Tx1)\}/2$ $SIG2=\{1+(Tx3-Tx2)\}/2$

As described above, in the period PP (FIG. 10), the symbol signals Tx1, Tx2, and Tx3 may be, respectively, the symbol signals Tx110, Tx120, and Tx130. Accordingly, in the period PP, the signals SIG0, SIG1, and SIG2 may be represented by the following expressions with use of the symbol signals Tx110, Tx120, and Tx130.

$SIG0=\{1+(Tx110-Tx130)\}/2$ $SIG1=\{1+(Tx120-Tx110)\}/2$ $SIG2=\{1+(Tx130-Tx120)\}/2$

The processor circuit 41 of the mode processor unit 40 may generate the symbol signals Tx110, Tx120, and Tx130 (the symbol NS10), as illustrated in FIG. 9, on the basis of the symbol signals Tx10, Tx20, and Tx30 and on the basis of the mode signal Smode. In the following, description is made on the operation of the mode processor unit 40 in each operation mode, with the processor circuit 41 given as an example.

FIG. 15 summarizes one operation example of the communication system 1 in each operation mode. Here, the signals SIGA, SIGB, and SIGC respectively indicate the signals received by the input terminals PA, PB, and PC.

In the operation mode M1, as illustrated in FIG. 9, the processor circuit 41 may output the symbol signal Tx10 as the symbol signal Tx110, output the symbol signal Tx20 as the symbol signal Tx120, and output the symbol signal Tx30 as the symbol signal Tx130. Accordingly, the signals SIG0 to SIG2 may be represented by the following expressions with the use of the symbol signals Tx10, Tx20, and Tx30.

$SIG0=\{1+(Tx10-Tx30)\}/2$ $SIG1=\{1+(Tx20-Tx10)\}/2$ $SIG2=\{1+(Tx30-Tx20)\}/2$

In the operation mode M1, as illustrated in FIG. 1, the input terminals of the reception device 50 may be arranged in the order: the input terminals PA, PB, and PC. Accordingly, the signals SIGA, SIGB, and SIGC received by the input terminals PA, PB, and PC may be represented by the following expressions.

$SIGA=SIG0=\{1+(Tx10-Tx30)\}/2$ $SIGB=SIG1=\{1+(Tx20-Tx10)\}/2$ $SIGC=SIG2=\{1+(Tx30-Tx20)\}/2$

In the operation mode M2, as illustrated in FIG. 9, the processor circuit 41 may output the symbol signal Tx30 as the symbol signal Tx110, output the symbol signal Tx10 as the symbol signal Tx120, and output the symbol signal Tx20 as the symbol signal Tx130. Accordingly, the signals SIG0 to SIG2 may be represented by the following expressions with the use of the symbol signals Tx10, Tx20, and Tx30.

$SIG0=\{1+(Tx30-Tx20)\}/2$ $SIG1=\{1+(Tx10-Tx30)\}/2$ $SIG2=\{1+(Tx20-Tx10)\}/2$

In the operation mode M2, as illustrated in FIG. 7A, the input terminals of the reception device 50 may be arranged in the order: the input terminals PC, PA, and PB. Accordingly, the signals SIGA, SIGB, and SIGC received by the input terminals PA, PB, and PC may be represented by the following expressions.

$SIGA=SIG1=\{1+(Tx10-Tx30)\}/2$ $SIGB=SIG2=\{1+(Tx20-Tx10)\}/2$ $SIGC=SIG0=\{1+(Tx30-Tx20)\}/2$

As described, in the operation mode M2, the input terminals PA, PB, and PC of the reception device 50 (the reception device 50A) may be able to receive the same signals as those of the case of the operation mode M1.

In the operation mode M3, as illustrated in FIG. 9, the processor circuit 41 may output the symbol signal Tx20 as the symbol signal Tx110, output the symbol signal Tx30 as the symbol signal Tx120, and output the symbol signal Tx10 as the symbol signal Tx130. Accordingly, the signals SIG0 to SIG2 may be represented by the following expressions with the use of the symbol signals Tx10, Tx20, and Tx30.

$SIG0=\{1+(Tx20-Tx10)\}/2$ $SIG1=\{1+(Tx30-Tx20)\}/2$ $SIG2=\{1+(Tx10-Tx30)\}/2$

In the operation mode M3, as illustrated in FIG. 7B, the input terminals of the reception device 50 (the reception device 50B) may be arranged in the order: the input terminals PB, PC, and PA. Accordingly, the signals SIGA, SIGB, and SIGC received by the input terminals PA, PB, and PC may be represented by the following expressions.

$SIGA=SIG2=\{1+(Tx10-Tx30)\}/2$ $SIGB=SIG0=\{1+(Tx20-Tx10)\}/2$ $SIGC=SIG1=\{1+(Tx30-Tx20)\}/2$

As described, in the operation mode M3, the input terminals PA, PB, and PC of the reception device 50 (the reception device 50B) may be able to receive the same signals as those of the cases such as the operation mode M1.

In the operation mode M4, as illustrated in FIG. 9, the processor circuit 41 may output the inverted signal of the symbol signal Tx10 as the symbol signal Tx110, output the inverted signal of the symbol signal Tx30 as the symbol signal Tx120, and output the inverted signal of the symbol signal Tx20 as the symbol signal Tx130. Accordingly, the signals SIG0 to SIG2 may be represented by the following expressions with the use of the symbol signals Tx10, Tx20, and Tx30.

$SIG0=\{1+(Tx20-Tx10)\}/2$ $SIG1=\{1+(Tx10-Tx30)\}/2$ $SIG2=\{1+(Tx20-Tx30)\}/2$

In the operation mode M4, as illustrated in FIG. 7C, the input terminals of the reception device 50 (the reception device 50C) may be arranged in the order: the input terminals PB, PA, and PC. Accordingly, the signals SIGA, SIGB, and SIGC received by the input terminals PA, PB, and PC may be represented by the following expressions.

$SIGA=SIG1=\{1+(Tx10-Tx30)\}/2$ $SIGB=SIG0\{=1+(Tx20-Tx10)\}/2$ $SIGC=SIG2=\{1+(Tx30-Tx20)\}/2$

As described, in the operation mode M4, the input terminals PA, PB, and PC of the reception device 50 (the reception device 50C) may be able to receive the same signals as those of the cases such as the operation mode M1.

In the operation mode M5, as illustrated in FIG. 9, the processor circuit 41 may output the inverted signal of the symbol signal Tx20 as the symbol signal Tx110, output the inverted signal of the symbol signal Tx10 as the symbol signal Tx120, and output the inverted signal of the symbol signal Tx30 as the symbol signal Tx130. Accordingly, the signals SIG0 to SIG2 may be represented by the following expressions with the use of the symbol signals Tx10, Tx20, and Tx30.

$SIG0=\{1+(Tx30-Tx20)\}/2$ $SIG1=\{1+(Tx20-Tx10)\}/2$ $SIG2=\{1+(Tx10-Tx30)\}/2$

In the operation mode M5, as illustrated in FIG. 7D, the input terminals of the reception device 50 (the reception device 50D) may be arranged in the order: the input terminal PC, PB, and PA. Accordingly, the signals SIGA, SIGB, and SIGC received by the input terminals PA, PB, and PC may be represented by the following expressions.

$SIGA=SIG2=\{1+(Tx10-Tx30)\}/2$ $SIGB=SIG1=\{1+(Tx20-Tx10)\}/2$ $SIGC=SIG0=\{1+(Tx30-Tx20)\}/2$

As described, in the operation mode M5, the input terminals PA, PB, and PC of the reception device 50 (the reception device 50D) may be able to receive the same signals as those of the cases such as the operation mode M1.

In the operation mode M6, as illustrated in FIG. 9, the processor circuit 41 may output the inverted signal of the symbol signal Tx30 as the symbol signal Tx110, output the inverted signal of the symbol signal Tx20 as the symbol signal Tx120, and output the inverted signal of the symbol signal Tx10 as the symbol signal Tx130. Accordingly, the signals SIG0 to SIG2 may be represented by the following expressions with the use of the symbol signals Tx10, Tx20, and Tx30.

$SIG0=\{1+(Tx10-Tx30)\}/2$ $SIG1=\{1+(Tx30-Tx20)\}/2$ $SIG2=\{1+(Tx20-Tx10)\}/2$

In the operation mode M6, as illustrated in FIG. 7E, the input terminals of the reception device 50 (the reception device 50E) may be arranged in the order: the input terminals PA, PC, and PB. Accordingly, the signals SIGA, SIGB, and SIGC received by the input terminals PA, PB, and PC may be represented by the following expressions.

$SIGA=SIG0=\{1+(Tx10-Tx30)\}/2$ $SIGB=SIG2=\{1+(Tx20-Tx10)\}/2$ $SIGC=SIG1=\{1+(Tx30-Tx20)\}/2$

As described, in the operation mode M6, the input terminals PA, PB, and PC of the reception device 50 (the reception device 50E) may be able to receive the same signals as those of the cases such as the operation mode M1.

As described, in the transmission device 10, the mode processor unit 40 is provided, allowing the signals SIG0, SIG1, and SIG2 to exchange the signal patterns with one another. Hence, it is possible to increase the transmission capacity. In other words, but for the mode processor unit 40, some of the wirings between the transmission device 10 and the reception devices 50A to 50E (FIG. 7) would cross one another, causing possibility of a complicated wiring pattern. In this case, for example, signal reflection may occur, causing possibility of lowered waveform quality, and contributing to difficulty in increasing the transmission capacity. In contrast, in the transmission device 10, the mode processor unit 40 is provided, allowing for signal transmission without crossing of the wirings between the transmission device 10 and the reception device 50. As a result, in the communication system 1, it is possible to reduce the possibility of the lowered waveform quality due to, for example, the signal reflection. Hence, it is possible to increase the transmission capacity.

Effects

As described, in this embodiment, the mode processor unit is provided. This allows for the signal transmission without the crossing of the wirings between the transmission device and the reception device. Hence, it is possible to increase the transmission capacity.

Modification Example 1-1

In the forgoing embodiment, the mode processor unit 40 may be provided in a fore stage of the serializers 11 to 13, but this is non-limiting. Instead, for example, as in a transmission device 10A illustrated in FIG. 16, a mode processor unit 40A may be provided in a rear stage of the serializer 11. The transmission device 10A may include the mode processor unit 40A. As summarized in FIG. 17, the mode processor unit 40A may generate the symbol signals Tx1, Tx2, and Tx3, on the basis of symbol signals Tx01, Tx02, and Tx03 outputted from the serializers 11 to 13 and on the basis of the mode signal Smode. In the transmission device 10A, it is possible to reduce circuit scale of the mode processor unit, as compared to the case of the forgoing embodiment (FIG. 8).

Modification Example 1-2

In the forgoing embodiment, the serialization of the symbol signals may be carried out after the generation of the transmission symbols, but this is non-limiting. For example, as in a transmission device 10B illustrated in FIG. 18, the generation of the transmission symbols may be carried out after the serialization of the transition signals. It is to be noted that in FIG. 18, blocks in the rear stage of the output control unit 14 are omitted. The transmission device 10B may include serializers 11B, 12B, and 13B, a transmission symbol generator unit 30B, and the mode processor unit 40A.

The serializer 11B may serialize the transition signals TxF0 to TxF6 in this order, on the basis of the transition signals TxF0 to TxF6 and on the basis of the clock TxCK, to generate a transition signal TxF8. The serializer 12B may serialize the transition signals TxR0 to TxR6 in this order, on the basis of the transition signals TxR0 to TxR6 and on the basis of the clock TxCK, to generate a transition signal TxR8. The serializer 13B may serialize the transition signals TxP0 to TxP6 in this order, on the basis of the transition signals TxP0 to TxP6 and on the basis of the clock TxCK, to generate a transition signal TxP8.

The transmission symbol generator unit 30B may generate the symbol signals Tx01, Tx02, and Tx03, on the basis of the transition signals TxF8, TxR8, and TxP8 and on the basis of the clock CK. The transmission symbol generator unit 30B may include a signal generator unit 31B and a flip flop (F/F) 38B. The signal generator unit 31B may generate the symbol signals Tx01, Tx02, and Tx03, on the basis of the transition signals TxF8, TxR8, and TxP8 and on the basis of the symbol signals D1, D2, and D3, as with the signal generator unit 31, for example. In one specific example, the signal generator unit 31B may obtain the symbol after the transition as illustrated in FIG. 4, on the basis of the symbol indicated by the symbol signals D1, D2, and D3 and on the basis of the transition signals TxF8, TxR8, and TxP8. The signal generator unit 31B may output the resultant symbol as the symbol signals Tx01, Tx02, and Tx03. The flip flop 38B may perform samplings of the symbol signals Tx01, Tx02, and Tx03 on the basis of the clock TxCK. The flip flop 38 may output results of the samplings as the symbol signals D1, D2, and D3.

The mode processor unit 40A may generate the symbol signals Tx1, Tx2, and Tx3, as illustrated in FIG. 18, on the basis of the symbol signals Tx01, Tx02, and Tx03 and on the basis of the mode signal Smode.

As described, the transmission device 10B may be an equivalent of the transmission device 10 (FIG. 3), with a change of the order of the processing of the generation of the transmission symbol and the processing of the serialization. In other words, the serializers 11B to 13B correspond to the serializers 11 to 13 in the transmission device 10, while the mode processor unit 40A corresponds to the mode processor unit 40 in the transmission device 10. Moreover, the transmission symbol generator unit 30B corresponds to the transmission symbol generator unit 30 in the transmission device 10. In the transmission device 10B, it is possible to reduce the circuit scale of the mode processor unit, as compared to the case of the forgoing embodiment (FIG. 8).

Modification Example 1-3

In the forgoing embodiment, the mode processor unit 40 may be provided in the transmission device 10, but this is non-limiting. Instead, for example, as in a reception device 50G illustrated in FIG. 19, the mode processor unit may be provided in the reception device. The reception device 50G may include a mode setting unit 57 and a mode processor unit 58. The mode setting unit 57 may supply, on the basis of an instruction from an undepicted controller, the mode signal Smode to the mode processor unit 58, to set an operation mode of the reception device 50G. As summarized in FIG. 20, as with, for example, the processor circuit 41 according to the forgoing embodiment, in the operation modes M1 to M3, the mode processor unit 58 may rearrange the three signals Rx1, Rx2, and Rx3 supplied from the amplifier 52A, the amplifiers 52B, and 52C, to generate the three signals Rx11, Rx12, and Rx13 and to supply them to the flip flop 54. Moreover, the mode processor unit 58 may rearrange the inverted signals of the three signals Rx1, Rx2, and Rx3 supplied from the amplifiers 52A, 52B, and 52C, to generate the three signals Rx11, Rx12, and Rx13 and to supply them to the flip flop 54.

FIG. 21 illustrates one operation example of the reception device 50G in each operation mode. Here, the term "SIG0-SIG1" indicates, when the positive input terminal of the amplifier 52 (52A, 52B, or 52C) is supplied with SIG0 and the negative input terminal is supplied with SIG1, the output signal of the relevant amplifier 52. The same may apply to the terms "SIG1-SIG2", "SIG2-SIG0", "SIG1-SIG0", "SIG2-SIG1", and "SIG0-SIG2".

In the operation mode M1, as illustrated in FIG. 1, the output terminal P0 of the transmission device 10 and the input terminal PA of the reception device 50G may be coupled to each other. The output terminal P1 of the transmission device 10 and the input terminal PB of reception device 50G may be coupled to each other. The output terminal P2 of the transmission device 10 and the input terminal PC of the reception device 50G may be coupled to each other. Accordingly, the signals Rx1, Rx2, and Rx3 may be represented by the following expressions.

$Rx1=SIG0-SIG1$ $Rx2=SIG1-SIG2$ $Rx3=SIG2-SIG0$

In the operation mode M1, as illustrated in FIG. 20, the signal Rx1 may be outputted as the signal Rx11. The signal Rx2 may be outputted as the signal Rx12. The signal Rx3 may be outputted as the signal Rx13. Accordingly, the signals Rx11 to Rx13 may be represented by the following expressions.

$$Rx11=SIG0-SIG1$$

$$Rx12=SIG1-SIG2$$

$$Rx13=SIG2-SIG0$$

In the operation mode M2, as illustrated in FIG. 7A, the output terminal P0 of the transmission device 10 and the input terminal PC of the reception device 50G may be coupled to each other. The output terminal P1 of the transmission device 10 and the input terminal PA of reception device 50G may be coupled to each other. The output terminal P2 of the transmission device 10 and the input terminal PB of the reception device 50G may be coupled to each other. Accordingly, the signals Rx1, Rx2, and Rx3 may be represented by the following expressions.

$$Rx1=SIG1-SIG2$$

$$Rx2=SIG2-SIG0$$

$$Rx3=SIG0-SIG1$$

In the operation mode M2, as illustrated in FIG. 20, the signal Rx3 may be outputted as the signal Rx11. The signal Rx1 may be outputted as the signal Rx12. The signal Rx2 may be outputted as the signal Rx13. Accordingly, the signals Rx11 to Rx13 may be represented by the following expressions.

$$Rx11=SIG0-SIG1$$

$$Rx12=SIG1-SIG2$$

$$Rx13=SIG2-SIG0$$

As described, in the operation mode M2, the mode processor unit 58 may be able to output the same signals Rx11 to Rx13 as those of the case of the operation mode M1.

The same may apply to the other operation modes M3 to M6. With this configuration as well, it is possible to perform the signal transmission, without the crossing of the wirings between the transmission device and the reception device. Hence, it is possible to increase the transmission capacity.

Modification Example 1-4

In the forgoing embodiment, the mode setting unit 19 may generate the mode signal Smode on the basis of the instruction from the undepicted controller. The controller may be provided in the transmission device 10, or alternatively the controller may be provided in the reception device as in a communication system 1F illustrated in FIG. 22. The communication system 1F includes a transmission device 10F and a reception device 50F. The reception device 50F may include a controller 59F. The controller 59F may supply a control signal CTL to the mode setting unit 19 of the transmission device 10F, on an occasion such as power supply start of the communication system 1F. The mode setting unit 19 may generate the mode signal Smode on the basis of the control signal CTL. As an interface that transmits the control signal CTL, for example, an I²C (Inter-Integrated Circuit) interface may be used. Moreover, for example, the transmission device 10F is provided in an imaging device, a camera control interface (CCI) may be used.

Likewise, the mode processor unit 57 of the reception device 50G according to the modification example 1-2 may generate the mode signal Smode on the basis of the undepicted controller. The controller may be provided in the reception device 50G, or alternatively, the controller may be provided in the transmission device as in a communication system 1G illustrated in FIG. 23. The communication system 1G includes a transmission device 10G and the reception device 50G. The transmission device 10G may include a controller 19G. The controller 19G may supply the control signal CTL to the mode setting unit 57 of the reception device 50G, on the occasion such as the power supply start of the communication system 1G. The mode setting unit 57 may generate the mode signal Smode on the basis of the control signal CTL.

Other Modification Examples

Moreover, two or more of the modification examples as described may be combined.

2. SECOND EMBODIMENT

Description is given next of a communication system 2 according to a second embodiment. This embodiment differs from the forgoing first embodiment in a method to allow the signals SIG0, SIG1, and SIG2 to exchange the signal patterns with one another. It is to be noted that component parts that are substantially same as those of the communication system 1 according to the forgoing first embodiment are denoted by the same reference characters, and description thereof is omitted as appropriate.

As illustrated in FIG. 1, the communication system 2 may include a transmission device 60. The transmission device 60 may be so configured to be able to allow the signals SIG0, SIG1, and SIG2 to exchange the signal patterns with one another.

FIG. 24 illustrates one configuration example of the transmission device 60. The transmission device 60 may include a mode setting unit 69, a mode processor unit 61, and a transmission symbol generator unit 70.

The mode setting unit 69 may supply a mode signal Smode1 to the mode processor unit 61, while supplying a mode signal Smode2 to the transmission symbol generator unit 70, to set the operation modes M1 to M6 of the transmission device 60, as with the mode setting unit 19 according to the forgoing first embodiment.

The mode processor unit 61 may generate transition signals TxR10 to TxR16, on the basis of the mode signal Smode1 and on the basis of the transition signals TxR0 to TxR6.

FIG. 25 illustrates one configuration example of the mode processor unit 61. The mode processor unit 61 may include inverters IV0 to IV6 and selectors SEL0 to SEL6. The inverters IV0 to IV6 may respectively generate inverted signals of the transition signals TxR0 to TxR6. The selector SEL0 may select, on the basis of the mode signal Smode1, either the transition signal TxR0 or an output signal of the inverter IV0 (the inverted signal of the transition signal TxR0), and output the signal selected, as the transition signal TxR10. The selector SEL1 may select, on the basis of the mode signal Smode1, either the transition signal TxR1 or an output signal of the inverter IV1 (the inverted signal of the transition signal TxR1), and output the signal selected, as the transition signal TxR11. The selector SEL2 may select, on the basis of the mode signal Smode1, either the transition signal TxR2 or an output signal of the inverter IV2 (the inverted signal of the transition signal TxR2), and output the signal selected, as the transition signal TxR12. The selector SEL3 may select, on the basis of the mode signal Smode1, either the transition signal TxR3 or an output signal of the inverter IV3 (the inverted signal of the transition signal TxR3), and output the signal selected, as the transition signal TxR13. The selector SEL4 may select, on the basis of the mode signal Smode1, either the transition signal TxR4 or an output signal of the inverter IV4 (the inverted signal of the transition signal TxR4), and output the signal selected, as the transition signal TxR14. The selector SEL5 may select, on the basis of the mode signal Smode1, either the transition signal TxR5 or an output signal of the inverter IV5 (the inverted signal of the transition signal TxR5), and output the signal selected, as the transition signal TxR15. The selector SEL6 may select, on the basis of the mode signal Smode1, either the transition signal TxR6 or an output signal of the inverter IV6 (the inverted signal of the transition signal TxR6), and output the signal selected, as the transition signal TxR16.

The transmission symbol generator unit 70 may generate the symbol signals Tx10 to Tx16, Tx20 to Tx26, and Tx30 to Tx36, on the basis of the transition signals TxF0 to TxF6, TxR10 to TxR16, and TxP0 to TxP6 and on the basis of the clock CK.

FIG. 26 illustrates one configuration example of the transmission symbol generator unit 70. The transmission symbol generator unit 70 may include a flip flop (F/F) 78. The flip flop 78 may perform, on the basis of the clock CK, samplings of the single set of the symbol signals Tx16, Tx26, and Tx36 (the symbol NS6), and output the results of the samplings respectively as the single set of the symbol signals D16, D26, and D36 (the symbol NS7), as with the flip flop 38 according to the first embodiment. Moreover, the flip flop 78 may set, on the basis of the mode signal Smode2, an initial value (an initial symbol) of the single set of the symbol signals D16, D26, and D36 (the symbol NS7).

FIG. 27 summarizes one operation example of the selector SEL0 and the flip flop 78. In the operation modes M1 to M3, the selector SEL0 may output the transition signal TxR0 as the transition signal TxR10. Moreover, in the operation modes M4 to M6, the selector SEL0 may output the inverted signal of the transition signal TxR0 as the transition signal TxR10. The flip flop 78 may set the initial symbol as the symbol "+x" in the operation mode M1, set the initial symbol as the symbol "+y" in the operation mode M2, and set the initial symbol as the symbol "+z" in the operation mode M3. Moreover, the flip flop 78 may set the initial symbol as the symbol "-x" in the operation mode M4, set the initial symbol as the symbol "-y" in the operation mode M5, and set the initial symbol as the symbol "-z" in the operation mode M6.

It is to be noted that in this example, description is made with the operation of the selector SEL0 given as an example. However, the same may apply to the selectors SEL1 to SEL6.

Here, the transition signal generator unit 20, the mode processor unit 61, the transmission symbol generator unit 70, and the serializers 11 to 13 correspond to one specific example of a "generator unit" in the disclosure. The mode processor unit 61 corresponds to one specific example of a "processor unit" in the disclosure. The transmission symbol generator unit 70 corresponds to one specific example of a "symbol generator unit" in the disclosure.

Description is given next in detail of the operation of the transmission device 60. In what follows, for a purpose of easier description, description is made with use of a transmission device 80 that is an equivalent of the transmission device 60 (FIG. 24), with the change of the order of the processing of the generation of the transmission symbol and the processing of the serialization.

FIG. 28 illustrates one configuration example of a main part of the transmission device 80. It is to be noted that in FIG. 28, the blocks in the rear stage of the output control unit 14 are omitted. The transmission device 80 may include serializers 81 to 83, a mode processor unit 84, and a transmission symbol generator unit 90.

The serializer 81 may serialize the transition signals TxF0 to TxF6 in this order, on the basis of the transition signals TxF0 to TxF6 and on the basis of the clock TxCK, to generate the transition signal TxF8. The serializer 82 may serialize the transition signals TxR0 to TxR6 in this order, on the basis of the transition signals TxR0 to TxR6 and on the basis of the clock TxCK, to generate the transition signal TxR8. The serializer 83 may serialize the transition signals TxP0 to TxP6 in this order, on the basis of the transition signals TxP0 to TxP6 and on the basis of the clock TxCK, to generate the transition signal TxP8.

The mode processor unit 84 may generate a transition signal TxR9, on the basis of the mode signal Smode1 and on the basis of the transition signal TxR8.

FIG. 29 illustrates one configuration example of the mode processor unit 84. The mode processor unit 84 may include an inverter 85 and a selector 86. The inverter 85 may generate an inverted signal of the transition signal TxR8. The selector 86 may select, on the basis of the mode signal Smode1, either the transition signal TxR8 or an output signal of the inverter 85 (the inverted signal of the transition signal TxR8), and output the signal selected, as the transition signal TxR9.

The transmission symbol generator unit 90 may generate the symbol signals Tx1, Tx2, and Tx3, on the basis of the transition signals TxF8, TxR9, and TxP8 and on the basis of the clock CK. The transmission symbol generator unit 90 may include a signal generator unit 91 and a flip flop (F/F) 92. The signal generator unit 91 may generate the symbol signals Tx1, Tx2, and Tx3, on the basis of the transition signals TxF8, TxR9, and TxP8 and on the basis of the symbol signals D1, D2, and D3, as with the signal generator unit 31, for example. In one specific example, the signal generator unit 91 may obtain the symbol NS21 after the transition as illustrated in FIG. 4, on the basis of the symbol NS22 indicated by the symbol signals D1, D2, and D3 and on the basis of the transition signals TxF8, TxR9, and TxP8. The signal generator unit 91 may output the symbol NS21, as the symbol signals Tx1, Tx2, and Tx3. The flip flop 92 may perform, on the basis of the clock TxCK, samplings of the symbol signals Tx1, Tx2, and Tx3. The flip flop 92 may output the results of the samplings respectively as the symbol signals D1, D2, and D3. Moreover, the flip flop 92 may set, on the basis of the mode signal Smode2, the initial value (the initial symbol) of the symbol signals D1, D2, and D3 (the symbol NS22).

As described, the transmission device 80 may be the equivalent of the transmission device 60 (FIG. 24), with the change of the order of the processing of the generation of the transmission symbol and the processing of the serialization. In other words, the serializers 81 to 83 correspond to the serializers 11 to 13 in the transmission device 60, while the mode processor unit 84 corresponds to the mode processor unit 61 in the transmission device 60. Moreover, the transmission symbol generator unit 90 corresponds to the transmission symbol generator unit 70 in the transmission device 60, while the flip flop 92 corresponds to the flip flop 78 (FIG. 26) in the transmission device 60.

FIG. 30 summarizes one operation example of the selector 86 and the flip flop 92. FIG. 30 corresponds to FIG. 27 in the case of the transmission device 60. The selector 86 may output the transition signal TxR8 as the transition signal TxR9 in the operation modes M1 to M3, and output the inverted signal of the transition signal TxR8 as the transition signal TxR9 in the operation modes M4 to M6. The flip flop 92 may set the initial symbol as the symbol "+x" in the operation mode M1, set the initial symbol as the symbol "+y" in the operation mode M2, set the initial symbol as the symbol "+z" in the operation mode M3, set the initial symbol as the symbol "−x" in the operation mode M4, set the initial symbol as the symbol "−y" in the operation mode M5, and set the initial symbol as the symbol "−z" in the operation mode M6.

FIG. 31A summarizes operation of the mode processor unit 84 and the transmission symbol generator unit 90 in the operation modes M1 to M3. FIG. 31B summarizes the operation of the mode processor unit 84 and the transmission symbol generator unit 90 in the operation modes M4 to M6. FIGS. 31A and 31B indicate the symbol NS21 (the transmission symbol) generated on the basis of the symbol NS22 indicated by the symbol signals D1, D2, and D3 and on the basis of the transition signals TxF8, TxR8, and TxP8. FIG. 31A corresponds to the state transition diagram illustrated in FIG. 4. In other words, in the operation modes M1 to M3, the mode processor unit 84 may output the transition signal TxR8 as the transition signal TxR9. Accordingly, the operation summarized in FIG. 31A may be the same as the operation of the transmission symbol generator unit 90. Moreover, FIG. 31B is an equivalent to FIG. 31A with the transition signal TxR8 being inverted. In other words, in the operation modes M4 to M6, the transition signal TxR8 may be inverted, in consideration that the mode processor unit 84 outputs the inverted signal of the transition signal TxR8 as the transition signal TxR9.

FIG. 32 summarizes one operation example of the communication system 2. In FIG. 32, the term "state on transmission side" indicates a current flow at the output terminals P0 to P2. In one specific example, the term "P0toP1" indicates the current flow from the output terminal P0 to the output terminal P1 through the reception device 50. The term "P1toP0" indicates the current flow from the output terminal P1 to the output terminal P0 through the reception device 50. The term "P1toP2" indicates the current flow from the output terminal P1 to the output terminal P2 through the reception device 50. The term "P2toP1" indicates the current flow from the output terminal P2 to the output terminal P1 through the reception device 50. The term "P2toP0" indicates the current flow from the output terminal P2 to the output terminal P0 through the reception device 50. The term "P0toP2" indicates the current flow from the output terminal P0 to the output terminal P2 through the reception device 50. Moreover, the term "state on reception side" indicates a current flow at the input terminals PA to PC. In one specific example, the term "AtoB" indicates the current flow from the input terminal PA to the input terminal PB. The term "BtoA" indicates the current flow from the input terminal PB to the input terminal PA. The term "BtoC" indicates the current flow from the input terminal PB to the input terminal PC. The term "CtoB" indicates the current flow from the input terminal PC to the input terminal PB. The term "CtoA" indicates the current flow from the input terminal PC to the input terminal PA. The term "AtoC" indicates the current flow from the input terminal PA to the input terminal PC.

In a case in which, for example, the transmission symbol (the symbol NS21) is "+x", the transmission device 80 may allow the signal SIG0 to be the high level voltage VH, allow the signal SIG1 to be the low level voltage VL, and allow the signal SIG2 to be the medium level voltage VM. Thus, the voltage at the output terminal P0 is the high level voltage VH, while the voltage at the output terminal P1 is the low level voltage VL. Accordingly, a state of the transmission device 80 (the state on the transmission side) may be "P0toP1". Similarly, in a case in which the transmission symbol is "−x", the state on the transmission side may be "P1toP0". In a case in which the transmission symbol is "+y", the state on the transmission side may be "P1toP2". In a case in which the transmission symbol is "−y", the state on the transmission side may be "P2toP1". In a case in which the transmission symbol is "+z", the state on the transmission side may be "P2toP0". In a case in which the transmission symbol is "−z", the state on the transmission side may be "P0toP2".

The reception device 50 may receive a symbol (a reception symbol) that corresponds to the operation modes M1 to M6 and to the state on the transmission side (the transmission symbol), as described below.

[Operation Mode M1]

FIG. 33 summarizes data transmission of the communication system 2 in the operation mode M1. In this example, the transmission device 80 may transmit 31 symbols to the reception device 50.

First, the flip flop 92 of the transmission symbol generator unit 90 may set the initial value (the initial symbol) of the transmission symbol (the symbol NS21) as the symbol "+x". Thereafter, the mode setting unit 84 and the transmission symbol generator unit 90 may be sequentially supplied with 30 sets of the transition signals TxF8, TxR8, and TxP8. The mode setting unit 84 and the transmission symbol generator unit 90 may sequentially generate the transmission symbol (the symbol NS21), on the basis of the transition signals TxF8, TxR8, and TxP8 and on the basis of the preceding transmission symbol (the symbol NS22). In one specific example, when the first set of the transition signals is supplied, the symbol NS22 may be "+x", and the transition signals TxF8, TxR8, and TxP8 may be "0", "0", and "0". Accordingly, as summarized in FIG. 31A, the transmission symbol NS21 may become "+z". Moreover, when the second set of the transition signals is supplied, the symbol NS22 may be "+z", and the transition signals TxF8, TxR8, and TxP8 may be "0", "0", and "0". Accordingly, as summarized in FIG. 31A, the transmission symbol NS21 may become "+y". The same may apply hereafter. The state on the transmission side may be as summarized in FIG. 33, corresponding to the transmission symbol.

In the operation mode M1, as illustrated in FIG. 1, the input terminals of the reception device 50 may be arranged in the order: the input terminals PA, PB, and PC. Accordingly, as summarized in FIG. 32, in a case in which the state on the transmission side is "P0toP1", the state on the reception side may become "AtoB" (the reception symbol "+x"). In a case in which the state on the transmission side is "P1toP0", the state on the reception side may become "BtoA" (the reception symbol "−x"). In a case in which the state on the transmission side is "P1toP2", the state on the reception side may become "BtoC" (the reception symbol "+y"). In a case in which the state on the transmission side is "P2toP1", the state on the reception side may become "CtoB" (the reception symbol "−y"). In a case in which the state on the transmission side is "P2toP0", the state on the reception side may become "CtoA" (the reception symbol "+z"). In a case in which the state on the transmission side is "P0toP2", the state on the reception side may become "AtoC" (the reception symbol "−z"). Accordingly, the state on the reception side (the reception symbol) may be as summarized in FIG. 33, corresponding to the state on the transmission side (the transmission symbol). As a result, as summarized in FIG. 33, the transmission symbol may become equal to the reception symbol.

[Operation Mode M2]

FIG. 34 summarizes the data transmission of the communication system 2 in the operation mode M2.

First, the flip flop 92 of the transmission symbol generator unit 90 may set the initial value (the initial symbol) of the transmission symbol (the symbol NS21) as the symbol "+y". Thereafter, the mode setting unit 84 and the transmission symbol generator unit 90 may be sequentially supplied with, in this example, 30 sets of the transition signals TxF8, TxR8, and TxP8. The transition signals TxF8, TxR8, and TxP8 may be the same as those of the case of the operation mode M1 (FIG. 33). The mode setting unit 84 and the transmission symbol generator unit 90 may sequentially generate the transmission symbol (the symbol NS21), on the basis of the transition signals TxF8, TxR8, and TxP8 and on the basis of the preceding transmission symbol (the symbol NS22). In one specific example, when the first set of the transition signals is supplied, the symbol NS22 may be "+y", and the transition signals TxF8, TxR8, and TxP8 may be "0", "0", and "0". Accordingly, as summarized in FIG. 31A, the transmission symbol NS21 may become "+x". Moreover, when the second set of the transition signals is supplied, the symbol NS22 may be "+x", and the transition signals TxF8, TxR8, and TxP8 may be "0", "0", and "0". Accordingly, as summarized in FIG. 31A, the transmission symbol NS21 may become "+z". The same may apply hereafter. The state on the transmission side may be as summarized in FIG. 34, corresponding to the transmission symbol.

In the operation mode M2, as illustrated in FIG. 7A, the input terminals of the reception device 50 may be arranged in the order: the input terminals PC, PA, and PB. Accordingly, as summarized in FIG. 32, in a case in which the state on the transmission side is "P0toP1", the state on the reception side may become "CtoA" (the reception symbol "+z"). In a case in which the state on the transmission side is "P1toP0", the state on the reception side may become "AtoC" (the reception symbol "−z"). In a case in which the state on the transmission side is "P1toP2", the state on the reception side may become "AtoB" (the reception symbol "+x"). In a case in which the state on the transmission side is "P2toP1", the state on the reception side may become "BtoA" (the reception symbol "−x"). In a case in which the state on the transmission side is "P2toP0", the state on the reception side may become "BtoC" (the reception symbol "+y"). In a case in which the state on the transmission side is "P0toP2", the state on the reception side may become "CtoB" (the reception symbol "−y"). Accordingly, the state on the reception side (the reception symbol) may be as summarized in FIG. 34, corresponding to the state on the transmission side (the transmission symbol). As a result, as summarized in FIG. 34, the reception symbol may become equal to the reception symbol in the operation mode M1 (FIG. 33).

FIGS. 35A to 35D illustrate the operation in the operation mode M2 with utilization of the state transition diagrams. FIG. 35A provides the state transition diagram in FIG. 4, in a more simplified way. Moreover, FIG. 35A also indicates the state on the reception side in addition to the symbol. FIG. 35B is an equivalent of FIG. 35A, with the state on the reception side being replaced with the state on the transmission side, in consideration of the order of the input terminals of the reception device 50 in the operation mode M1. In FIG. 35B, marked is the symbol "+x", in consideration that the initial symbol is the symbol "+x" in the operation mode M1. FIG. 35C is an equivalent of FIG. 35B, with 120° counterclockwise rotation. In FIG. 35C, marked is the symbol "+y" disposed at a position where the symbol "+x" is disposed in FIG. 35B. FIG. 35D is an equivalent of FIG. 35C, with the state on the transmission side being replaced with the state on the reception side disposed at a corresponding position in FIG. 35A. The replacement means that the output terminal P0 corresponds to the input terminal PC, the output terminal P1 corresponds to the input terminal PA, and the output terminal P2 corresponds to the input terminal PB. Moreover, in FIG. 35D, the initial symbol may become "+y".

[Operation Mode M3]

FIG. 36 summarizes the data transmission of the communication system 2 in the operation mode M3.

First, the flip flop 92 of the transmission symbol generator unit 90 may set the initial value (the initial symbol) of the transmission symbol (the symbol NS21) as the symbol "+z". The mode setting unit 84 and the transmission symbol generator unit 90 may sequentially generate the transmission symbol (the symbol NS21), on the basis of the transition signals TxF8, TxR8, and TxP8 and on the basis of the preceding transmission symbol (the symbol NS22). In one specific example, when the first set of the transition signals is supplied, the symbol NS22 may be "+z", and the transition signals TxF8, TxR8, and TxP8 may be "0", "0", and "0". Accordingly, as summarized in FIG. 31A, the transmission symbol NS21 may become "+y". Moreover, when the second set of the transition signals is supplied, the symbol NS22 may be "+y", and the transition signals TxF8, TxR8, and TxP8 may be "0", "0", and "0". Accordingly, as summarized in FIG. 31A, the transmission symbol NS21 may become "+x". The same may apply hereafter. The state on the transmission side may be as summarized in FIG. 36, corresponding to the transmission symbol.

In the operation mode M3, as illustrated in FIG. 7B, the input terminals of the reception device 50 may be arranged in the order: the input terminals PB, PC, and PA. Accordingly, as summarized in FIG. 32, in a case in which the state on the transmission side is "P0toP1", the state on the reception side may become "BtoC" (the reception symbol "+y"). In a case in which the state on the transmission side is "P1toP0", the state on the reception side may become "CtoB" (the reception symbol "−y"). In a case in which the state on the transmission side is "P1toP2", the state on the reception side may become "CtoA" (the reception symbol "+z"). In a case in which the state on the transmission side is "P2toP1", the state on the reception side may become "AtoC" (the reception symbol "−z"). In a case in which the state on the transmission side is "P2toP0", the state on the reception side may become "AtoB" (the reception symbol "+x"). In a case in which the state on the transmission side is "P0toP2", the state on the reception side may become "BtoA" (the reception symbol "−x). Accordingly, the state on the reception side (the reception symbol) may be as summarized in FIG. 36, corresponding to the state on the transmission side (the transmission symbol). As a result, as summarized in FIG. 36, the reception symbol may become the same as the reception symbol in the operation mode M1 (FIG. 33).

[Operation Mode M4]

FIG. 37 summarizes the data transmission of the communication system 2 in the operation mode M4.

First, the flip flop 92 of the transmission symbol generator unit 90 may set the initial value (the initial symbol) of the transmission symbol (the symbol NS21) as the symbol "−x". The mode setting unit 84 and the transmission symbol generator unit 90 may sequentially generate the transmission symbol (the symbol NS21), on the basis of the transition signals TxF8, TxR8, and TxP8 and on the basis of the preceding transmission symbol (the symbol NS22). In one specific example, when the first set of the transition signals is supplied, the symbol NS22 may be "−x", and the transition signals TxF8, TxR8, and TxP8 may be "0", "0", and "0". Accordingly, as summarized in FIG. 31B, the transmission symbol NS21 may become "−y". Moreover, when the second set of the transition signals is supplied, the symbol NS22 may be "−y", and the transmission signals TxF8, TxR8, and TxP8 may be "0", "0", and "0". Accordingly, as summarized in FIG. 31B, the transmission symbol NS21 may become "−z". The same may apply hereafter. The state on the transmission side may be as summarized in FIG. 37, corresponding to the transmission symbol.

In the operation mode M4, as illustrated in FIG. 7C, the input terminals of the reception device 50 may be arranged in the order: the input terminals PB, PA, and PC. Accordingly, as summarized in FIG. 32, in a case in which the state on the transmission side is "P0toP1", the state on the reception side may become "BtoA" (the reception symbol "−x"). In a case in which the state on the transmission side is "P1toP0", the state on the reception side may become "AtoB" (the reception symbol "+x"). In a case in which the state on the transmission side is "P1toP2", the state on the reception side may become "AtoC" (the reception symbol "−z"). In a case in which the state on the transmission side is "P2toP1", the state on the reception side may become "CtoA" (the reception symbol "+z"). In a case in which the state on the transmission side is "P2toP0", the state on the reception side may become "CtoB" (the reception symbol "−y"). In a case in which the state on the transmission side is "P0toP2", the state on the reception side may become "BtoC" (the reception symbol "+y"). Accordingly, the state on the reception side (the reception symbol) may be as summarized in FIG. 37, corresponding to the state on the transmission side (the transmission symbol). As a result, as summarized in FIG. 37, the reception symbol may be the same as the reception symbol in the operation mode M1 (FIG. 33).

FIGS. 38A to 38D illustrate the operation in the operation mode M4 with the utilization of the state transition diagrams. FIGS. 38A and 38B may be similar to FIGS. 35A and 35B. FIG. 38C may be an equivalent to FIG. 38B, with the symbols "+x", "+y", and "+z" and the symbols "−x", "−y", and "−z" changing over, and with the symbols "+y" and "−y" and the symbols "+z" and "−z" changing over. In FIG. 38C, marked is the symbol "−x" disposed at a position where the symbol "+x" is disposed in FIG. 38B. FIG. 38D is an equivalent of FIG. 38C, with the state on the transmission side being replaced with the state on the reception side disposed at a corresponding position in FIG. 38A. The replacement means that the output terminal P0 corresponds to the input terminal PB, the output terminal P1 corresponds to the input terminal PA, and the output terminal P2 corresponds to the input terminal PC. Moreover, in FIG. 38D, the initial symbol may be "−x".

[Operation Mode M5]

FIG. 39 summarizes the data transmission of the communication system 2 in the operation mode M5.

First, the flip flop 92 of the transmission symbol generator unit 90 may set the initial value (the initial symbol) of the transmission symbol (the symbol NS21) as the symbol "−y". The mode setting unit 84 and the transmission symbol generator unit 90 may sequentially generate the transmission symbol (the symbol NS21), on the basis of the transition signals TxF8, TxR8, and TxP8 and on the basis of the preceding transmission symbol (the symbol NS22). In one specific example, when the first set of the transition signals is supplied, the symbol NS22 may be "−y", and the transition signals TxF8, TxR8, and TxP8 may be "0", "0", and "0". Accordingly, as summarized in FIG. 31B, the transmission symbol NS21 may be "−z". Moreover, when the second set of the transition signals is supplied, the symbol NS22 may be "−z", and the transition signals TxF8, TxR8, and TxP8 may be "0", "0", and "0". Accordingly, as summarized in FIG. 31B, the transmission symbol NS21 may be "−x". The same may apply hereafter. The state on the transmission side may be as summarized in FIG. 39, corresponding to the transmission symbol.

In the operation mode M5, as illustrated in FIG. 7D, the input terminals of the reception device 50 may be arranged in the order: the input terminals PC, PB, and PA. Accordingly, as summarized in FIG. 32, in a case in which the state on the transmission side is "P0toP1", the state on the reception side may be "CtoB" (the reception symbol "−y"). In a case in which the state on the transmission side is "P1toP0", the state on the reception side may be "BtoC" (the reception symbol "+y"). In a case in which the state on the transmission side is "P1toP2", the state on the reception side may be "BtoA" (the reception symbol "−x"). In a case in which the state on the transmission side is "P2toP1", the state on the reception side may be "AtoB" (the reception symbol "+x"). In a case in which the state on the transmission side is "P2toP0", the state on the reception side may be "AtoC" (the reception symbol "−z"). In a case in which the state on the transmission side is "P0toP2", the state on the reception side may be "CtoA" (the reception symbol "+z"). Accordingly, the state on the reception side (the reception symbol) may be as summarized in FIG. 39, corresponding to the state on the transmission side (the transmission symbol). As a result, as summarized in FIG. 39, the reception symbol may become the same as the reception symbol in the operation mode M1 (FIG. 33).

[Operation Mode M6]

FIG. 40 summarizes the data transmission of the communication system 2 in the operation mode M6.

First, the flip flop 92 of the transmission symbol generator unit 90 may set the initial value (the initial symbol) of the transmission symbol (the symbol NS21) as the symbol "−z". The mode setting unit 84 and the transmission symbol generator unit 90 may sequentially generate the transmission symbol (the symbol NS21), on the basis of the transition signals TxF8, TxR8, and TxP8 and on the basis of the preceding transmission symbol (the symbol NS22). In one specific example, when the first set of the transition signals is supplied, the symbol NS22 may be "−z", and the transition signals TxF8, TxR8, and TxP8 may be "0", "0", and "0". Accordingly, as summarized in FIG. 31B, the transmission symbol NS21 may be "−x". Moreover, when the second set of the transition signals is supplied, the symbol NS22 may be "−x", and the transition signals TxF8, TxR8, and TxP8 may be "0", "0", and "0". Accordingly, as summarized in FIG. 31B, the transmission symbol NS21 may be "−y". The same may apply hereafter. The state on the transmission side may be as summarized in FIG. 40, corresponding to the transmission symbol.

In the operation mode M6, as illustrated in FIG. 7E, the input terminals of the reception device 50 may be arranged in the order: the input terminals PA, PC, and PB. Accordingly, as summarized in FIG. 32, in a case in which the state on the transmission side is "P0toP1", the state on the reception side may be "AtoC" (the reception symbol "−z"). In a case in which the state on the transmission side is "P1toP0", the state on the reception side may be "CtoA" (the reception symbol "+z"). In a case in which the state on the transmission side is "P1toP2", the state on the reception side may be "CtoB" (the reception symbol "−y"). In a case in which the state on the transmission side is "P2toP1", the state on the reception side may be "BtoC" (the reception symbol "+y"). In a case in which the state on the transmission side is "P2toP0", the state on the reception side may be "BtoA" (the reception symbol "−x"). In a case in which the state on the transmission side is "P0toP2", the state on the reception side may be "AtoB" (the reception symbol "+x"). Accordingly, the state on the reception side (the reception symbol) may be as summarized in FIG. 40, corresponding to the state on the transmission side (the transmission symbol). As a result, as summarized in FIG. 40, the reception symbol may become the same as the reception symbol in the operation mode M1 (FIG. 33).

With the forgoing configuration as well, it is possible to perform the signal transmission without the crossing of the wirings between the transmission device and the reception device. Hence, it is possible to increase the transmission capacity.

Modification Example 2-1

In the forgoing embodiment, as illustrated in FIG. 24, the transmission symbol may be generated, and thereafter, the symbol signal may be serialized. However, this is non-limiting. As illustrated in FIG. 28, the transition signal may be serialized, and thereafter, the transmission symbol may be generated.

Modification Example 2-2

In the forgoing embodiment, the mode processing may be carried out in the transmission device 60 (the transmission device 80). However, this is non-limiting. In an alternative, the mode processing may be carried out in the reception device.

3. APPLICATION EXAMPLE

Description is given next of an application example of the communication systems described in the forgoing embodiments and modification examples.

FIG. 41 illustrates an external appearance of a smartphone 300 (a multifunction mobile phone) to which the communication systems according to the forgoing example embodiments are applied. The smartphone 300 may be equipped with various devices. The communication systems according to the forgoing example embodiments may be applied to a communication system that performs data exchange among the devices.

FIG. 42 illustrates one configuration example of an application processor 310 utilized in the smartphone 300. The application processor 310 may include a CPU (Central Processing Unit) 311, a memory control unit 312, a power supply control unit 313, an external interface 314, a GPU (Graphics Processing Unit) 315, a media processor unit 316, a display control unit 317, and an MIPI (Mobile Industry Processor Interface) interface 318. The CPU 311, the memory control unit 312, the power supply control unit 313, the external interface 314, the GPU 315, the media processor unit 316, and the display control unit 317 may be coupled to a system bus 319 in this example, and be able to perform the data exchange with one another through the system bus 319.

The CPU 311 may process various pieces of information handled by the smartphone 300 in accordance with a program. The memory control unit 312 may control a memory 501 which the CPU 311 uses in performing information processing. The power supply control unit 313 may control a power supply of the smartphone 300.

The external interface 314 may be an interface provided for communication with an external device. In this example, the external interface 314 may be coupled to a wireless communication unit 502 and an image sensor 410. The wireless communication unit 502 may perform wireless communication with a base station of mobile phones. The wireless communication unit 502 may be so constituted that the wireless communication unit 502 includes a baseband unit and an RF (Radio Frequency) front end unit, without limitation. The image sensor 410 may acquire an image. The image sensor 410 may be so constituted that the image sensor 410 includes a CMOS sensor, without limitation.

The GPU 315 may perform image processing. The media processor unit 316 may process information such as sound, characters, and figures. The display control unit 317 may control a display 504 through the MIPI interface 318. The MIPI interface 318 may transmit an image signal to the display 504. As the image signal, for example, a signal of a YUV system, an RGB system, or other systems may be used. In one example, the communication system according to the forgoing example embodiments may be applied to a communication system between the MIPI interface 318 and the display 504.

FIG. 43 illustrates one configuration example of the image sensor 410. The image sensor 410 may include a sensor unit 411, an ISP (Image Signal Processor) 412, a JPEG (Joint Photographic Experts Group) encoder 413, a CPU 414, a RAM (Random Access Memory) 415, a ROM (Read Only Memory) 416, a power supply control unit 417, an I$^2$C (Inter-Integrated Circuit) interface 418, and an MIPI interface 419. These blocks may each be coupled to a system bus 420 in this example, and be able to perform the data exchange with one another through the system bus 420.

The sensor unit 411 may acquire the image, and be constituted by, for example, the CMOS sensor. The ISP 412 may perform predetermined processing on the image acquired by the sensor unit 411. The JPEG encoder 413 may encode the image processed by the ISP 412, to generate an image of a JPEG form. The CPU 414 may control each block of the image sensor 410 in accordance with a program. The RAM 415 may be a memory which the CPU 414 uses in performing image processing. The ROM 416 may store the program to be executed in the CPU 414. The power supply control unit 417 may control a power supply of the image sensor 410. The I$^2$C interface 418 may receive a control signal from the application processor 310. Moreover, although not illustrated, the image sensor 410 may receive, from the application processor 310, a clock signal in addition to the control signal. In one specific example, the image sensor 410 may be configured to be able to operate on the basis of the clock signals having various frequencies. The MIPI interface 419 may transmit the image signal to the application processor 310. As the image signal, for example, the signal of the YUV system, the RGB system, or other systems may be used. In one example, the communication system according to the forgoing example embodiments may be applied to a communication system between the MIPI interface 419 and the application processor 310.

Although description has been made by giving the embodiments and the modification examples, and the application example to the electronic apparatus as mentioned above, the contents of the technology are not limited to the above-mentioned example embodiments and may be modified in a variety of ways.

For example, in the forgoing example embodiments, the transition signal generator unit 20 may generate the seven sets of the transition signals TxF, TxR, and TxP. However, this is non-limiting. In one alternative example, the transition signal generator unit 20 may generate a plurality of, but six or less, sets of the transition signals. In another alternative, the transition signal generator unit 20 may generate eight or more sets of the transition signals. In one exemplary case in which the transition signal generator unit 20 has generated eight sets of the transition signals, the following may be desirable. The divider circuit 18 may perform division operation by eight, to generate the clock CK. The transmission symbol generator unit 30 may generate eight sets of the symbol signals on the basis of the eight sets of the transition signals.

Moreover, for example, in the forgoing example embodiments, the transistors MU and MD may be both turned off in the case in which, for example, the voltage of the output terminal is set as the medium level voltage VM. However, this is non-limiting. In one alternative, the transistors MU and MD may be both turned on. This provides Thevenin termination, making it possible to set the voltage of the output terminal as the medium level voltage VM.

Furthermore, for example, in the forgoing example embodiments, the transmission device may transmit the three signals to the reception device. However, this is non-limiting. Instead, for example, as illustrated in FIG. 44, a plurality of sets (four sets in this example) of the three signals may be transmitted. A communication system 600 includes a transmission device 610 and a reception device 620. The transmission device 610 may transmit data to the reception device 620 through four data lanes DL1 to DL4. In each of the data lanes DL1 to DL4, the transmission device 610 may transmit the three signals SIG0 to SIG2. At this occasion, for example, the transmission device 610 may include the mode processor unit as with the transmission devices 10 and 60 (FIGS. 3 and 24), to allow the three signals SIG0 to SIG2 to exchange the signal patterns with one another, in each of the data lanes DL1 to DL4. It is to be noted that this is non-limiting. The reception device 620 may include the mode processor unit as with the reception device 50G (FIG. 19). In this case as well, it is possible to perform the signal transmission without the crossing of the wirings between the transmission device 610 and the reception device 620. Hence, it is possible to increase the transmission capacity. Furthermore, in the case in which the transmission device 610 includes the mode processor unit, it is possible to utilize the reception device of various specifications that differ in, for example, pin arrangement. Moreover, in designing the reception device, it is possible to design without concern about the pin arrangement. This allows for higher design freedom. The same may apply to the case in which the reception device 620 includes the mode processor unit.

It is to be noted that effects described herein are merely exemplified. Effects of the technology are not limited to the effects described herein. Effects of the technology may further include other effects than the effects described herein.

Moreover, the technology may have the following configurations.

(1) A transmission device, including:

a generator unit that generates, on a basis of a control signal, a transmission symbol signal that indicates a sequence of transmission symbols;

an output control unit that generates an output control signal on a basis of the transmission symbol signal; and a driver unit that generates, on a basis of the output control signal, a first output signal, a second output signal, and a third output signal, the generator unit generating the transmission symbol signal on the basis of the control signal, to allow the first output signal, the second output signal, and the third output signal to exchange signal patterns with one another.

(2) The transmission device according to (1), in which the generator unit includes:

a processor unit that generates, on a basis of a predetermined number of first symbol signals and on the basis of the control signal, second symbol signals that are equal in number to the predetermined number; and a serializer unit that serializes the predetermined number of the second symbol signals, to generate the transmission symbol signal.

(3) The transmission device according to (2), in which the predetermined number of the second symbol signals are respectively associated with the predetermined number of the first symbol signals, each of the predetermined number of the first symbol signals includes three signals, each of the predetermined number of the second symbol signals includes three signals, and the processor unit performs, on the basis of the control signal, rearrangement of the three signals included in one first symbol signal out of the predetermined number of the first symbol signals, or rearrangement of inverted signals of the three signals included in the relevant one first symbol signal, to generate one of the second symbol signals that is associated with the relevant one first symbol signal.

(4) The transmission device according to (3), in which the transmission symbol signal includes three signals, and the serializer unit serializes the predetermined number of the second symbol signals, with respect to each of the three signals included in the predetermined number of the second symbol signals, to generate each of the three signals included in the transmission symbol signal.

(5) The transmission device according to any one of (2) to (4), in which the generator unit further includes a symbol generator unit that generates the predetermined number of the first symbol signals, on a basis of transition signals that are equal in number to the predetermined number, the transition signals each indicating a transition in the sequence of the transition symbols.

(6) The transmission device according to (1), in which the generator unit includes a processor unit that generates the transmission symbol signal on a basis of a first symbol signal and on the basis of the control signal.

(7) The transmission device according to (6), in which the first symbol signal includes three signals, the transmission symbol signal includes three signals, and the generator unit performs, on the basis of the control signal, rearrangement of the three signals included in the first symbol signal, or rearrangement of inverted signals of the three signals included in the first symbol signal, to generate the transmission symbol signal.

(8) The transmission device according to (6) or (7), in which the generator unit further includes a serializer unit that serializes the predetermined number of second symbol signals, to generate the first symbol signal.

(9) The transmission device according to (6) or (7), in which the generator unit further includes:

a serializer unit that serializes a predetermined number of first transition signals each of which indicates a transition in the sequence of the transmission symbols, to generate a second transition symbol; and a symbol generator unit that generates the first symbol signal on a basis of the second transition signal.

(10) The transmission device according to (1), in which the generator unit includes:

a symbol generator unit that generates, on a basis of a predetermined number of first transition signals each of which indicates a transition in the sequence of the transmission symbols, first symbol signals that are equal in number to the predetermined number, the symbol generator unit being configured to be able to set the transmission symbol at a head of the sequence; and a serializer unit that serializes the predetermined number of the first symbol signals, to generate the transmission symbol signal.

(11) The transmission device according to (10), in which the generator unit further includes a processor unit that generates the predetermined number of the first transition signals, on a basis of second transition signals that are equal in number to the predetermined number and on the basis of the control signal.

(12) The transmission device according to (11), in which the predetermined number of the first transition signals are respectively associated with the predetermined number of the second transition signals, each of the predetermined number of the second transition signals include three signals, each of the predetermined number of the first transition signals include three signals, and the processor unit controls, on the basis of the control signal, whether or not to invert one of the three signals included in one second transition signal out of the predetermined number of the second transition signals, to generate one of the first transition signals that is associated with the relevant one second transition signal.

(13) The transmission device according to (1), in which the generator unit includes a symbol generator unit that generates the transmission symbol signal, on a basis of a first transition signal that indicates a transition in the sequence of the transmission symbols, the symbol generator unit being configured to be able to set, on the basis of the control signal, the transmission symbol at a head of the sequence.

(14) The transmission device according to (14), in which the generator unit further includes:

a serializer unit that serializes a predetermined number of second transition signals to generate a third transition signal; and a processor unit that generates the predetermined number of the first transition signals, on a basis of the third transition signal and on the basis of the control signal.

(15) A transmission device, including:

a symbol generator unit that generates a symbol signal on a basis of a transition signal that indicates a transition in a sequence of transmission symbols, the symbol generator unit being configured to be able to set the transmission symbol at a head of the sequence; and an output unit that generates, on a basis of the symbol signal, a first output signal, a second output signal, and a third output signal.

(16) A reception device, including:

a receiver unit that generates, on a basis of a first input signal, a second input signal, and a third input signal, a first symbol signal that indicates a sequence of symbols; and a processor unit that generates, as a second symbol signal, on a basis of a control signal and on a basis of the first symbol signal, the first symbol signal that would be generated on a condition that the first input signal, the second input signal, and the third input signal exchange signal patterns with one another.

(17) The reception device according to (16), in which the first symbol signal includes a first signal, a second signal, and a third signal, the second symbol signal includes a fourth signal, a fifth signal, and a sixth signal, the receiver unit generates the first signal on a basis of the first input signal and the second input signal, generates the second signal on a basis of the second input signal and the third input signal, and generates the third signal on a basis of the first input signal and the third input signal, and the processor unit performs, on the basis of the control signal, rearrangement of the first signal, the second signal, and the third signal, or rearrangement of an inverted signal of the first signal, an inverted signal of the second input signal, and an inverted signal of the third input signal, to generate the fourth signal, the fifth signal, and the sixth signal.

(18) A communication system, including:

a transmission device that generates, on a basis of a control signal, a plurality of sets of three output signals; and a reception device that receives the plurality of sets of the output signals, the transmission device being configured to be able to allow, on the basis of the control signal, the three output signals to exchange signal patterns with one another, in each of the plurality of sets of the output signals.

(19) The communication system according to (18), in which the reception device generates the control signal.

(20) The communication system according to (18) or (19), in which the transmission device is an image sensor, and the reception device is a processor that processes an image acquired by the image sensor.

This application claims the benefit of Japanese Priority Patent Application JP2014-249340 filed on Dec. 9, 2014, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A reception device, comprising:

a first input terminal configured to receive a first input signal, a second input terminal configured to receive a second input signal, and a third input terminal configured to receive a third input signal;

a receiver unit configured to receive an output control signal from a transmission device, the output control signal being generated on a basis of a transmission symbol signal, the transmission symbol signal being generated on a basis of a mode control signal and indicating a sequence of transmission symbols, wherein the transmission symbol signal allows a first output signal, a second output signal, and a third output signal to exchange signal patterns with one another, the mode control signal indicates an operation mode on a basis of an arrangement order of the first, second, and third input terminals of the reception device, and the receiver unit generates a first symbol signal on the basis of the first input signal, the second input signal and the third input signal; and a processor configured to generate a second symbol signal on a basis of the output control signal and the first symbol signal.

2. The reception device according to claim 1, wherein
on a basis of a predetermined number of first symbol signals and on the basis of the mode control signal, second symbol signals that are equal in number to the predetermined number are generated, and
the predetermined number of the second symbol signals are serialized to generate the transmission symbol signal.

3. The reception device according to claim 2, wherein
the predetermined number of the second symbol signals are respectively associated with the predetermined number of the first symbol signals,
each of the predetermined number of the first symbol signals includes three signals,
each of the predetermined number of the second symbol signals includes three signals, and
on the basis of the mode control signal, rearrangement of the three signals included in one first symbol signal out of the predetermined number of the first symbol signals, or rearrangement of inverted signals of the three signals included in the relevant one first symbol signal, is performed to generate one of the second symbol signals that is associated with the relevant one first symbol signal.

4. The reception device according to claim 3, wherein
the transmission symbol signal includes three signals, and
the predetermined number of the second symbol signals are serialized with respect to each of the three signals included in the predetermined number of the second symbol signals, to generate each of the three signals included in the transmission symbol signal.

5. The reception device according to claim 2, wherein
the predetermined number of the first symbol signals are generated on a basis of transition signals that are equal in number to the predetermined number, the transition signals each indicating a transition in the sequence of the transition symbols.

6. The reception device according to claim 1, wherein
the transmission symbol signal is generated on a basis of the first symbol signal and on the basis of the mode control signal.

7. The reception device according to claim 6, wherein
the first symbol signal includes three signals,
the transmission symbol signal includes three signals, and
on the basis of the mode control signal, rearrangement of the three signals included in the first symbol signal is performed, or rearrangement of inverted signals of the three signals included in the first symbol signal is performed, to generate the transmission symbol.

8. The reception device according to claim 6, wherein
the predetermined number of second symbol signals are serialized to generate the first symbol signal.

9. The reception device according to claim 6, wherein
a predetermined number of first transition signals, each of which indicates a transition in the sequence of the transmission symbols, are serialized to generate a second transition symbol, and
the first symbol signal is generated on a basis of the second transition signal.

10. The reception device according to claim 1, wherein
on a basis of a predetermined number of first transition signals each of which indicates a transition in the sequence of the transmission symbols, first symbol signals that are equal in number to the predetermined number are generated, wherein the transmission symbol is set at a head of the sequence; and
the predetermined number of the first symbol signals are serialized to generate the transmission symbol signal.

11. The reception device according to claim 10, wherein
the predetermined number of the first transition signals are generated, on a basis of second transition signals that are equal in number to the predetermined number and on the basis of the mode control signal.

12. The reception device according to claim 11, wherein
the predetermined number of the first transition signals are respectively associated with the predetermined number of the second transition signals,
each of the predetermined number of the second transition signals include three signals,
each of the predetermined number of the first transition signals include three signals, and
on the basis of the mode control signal, control is performed as to whether or not to invert one of the three signals included in one second transition signal out of the predetermined number of the second transition signals, to generate one of the first transition signals that is associated with the relevant one second transition signal.

13. The reception device according to claim 1, wherein
the transmission symbol signal is generated on a basis of a first transition signal that indicates a transition in the sequence of the transmission symbols, with the transmission symbol configurable to be set, on the basis of the mode control signal, at a head of the sequence.

14. The reception device according to claim 13, wherein
a predetermined number of second transition signals are serialized to generate a third transition signal; and
the predetermined number of the first transition signals are generated on a basis of the third transition signal and on the basis of the mode control signal.

15. The reception device according to claim 1, wherein
the first symbol signal includes a first signal, a second signal, and a third signal,
the second symbol signal includes a fourth signal, a fifth signal, and a sixth signal,
the receiver unit generates the first signal on a basis of the first input signal and the second input signal, generates the second signal on a basis of the second input signal and the third input signal, and generates the third signal on a basis of the first input signal and the third input signal, and
the processor performs, on the basis of the output control signal, rearrangement of the first signal, the second signal, and the third signal, or rearrangement of an inverted signal of the first signal, an inverted signal of the second input signal, and an inverted signal of the third input signal, to generate the fourth signal, the fifth signal, and the sixth signal.

* * * * *